(12) United States Patent
Lopez-Mejias et al.

(10) Patent No.: US 11,713,331 B2
(45) Date of Patent: Aug. 1, 2023

(54) BENZENE 1,4-BIS(BISPHOSPHONIC ACID)-BASED METAL COMPLEXES, METHOD OF SYNTHESIS AND APPLICATIONS THEREOF

(71) Applicants: Vilmali Lopez-Mejias, San Juan, PR (US); Lesly Y. Carmona-Sarabia, San Juan, PR (US); Andrea M. Escalera Joy, San Juan, PR (US); Darilys Mojica Vazquez, San Juan, PR (US)

(72) Inventors: Vilmali Lopez-Mejias, San Juan, PR (US); Lesly Y. Carmona-Sarabia, San Juan, PR (US); Andrea M. Escalera Joy, San Juan, PR (US); Darilys Mojica Vazquez, San Juan, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 17/228,629

(22) Filed: Apr. 12, 2021

(65) Prior Publication Data
US 2021/0317149 A1 Oct. 14, 2021

Related U.S. Application Data

(60) Provisional application No. 63/008,810, filed on Apr. 12, 2020.

(51) Int. Cl.
*C07F 9/38* (2006.01)
(52) U.S. Cl.
CPC .......... *C07F 9/386* (2013.01); *C07B 2200/13* (2013.01)

(58) Field of Classification Search
CPC ........ C07B 2200/13; C07F 9/386; C07F 3/02; C07F 3/04; C07F 3/06; C07F 9/3852
See application file for complete search history.

(56) References Cited

PUBLICATIONS

Teixeira et al. (Nation phosphonic acid composite membranes for proton exchange membranes fuel cells, Applied Surface Science, 487, pp. 889-897, Published 2019) (Year: 2019).*

* cited by examiner

*Primary Examiner* — Yevgeny Valenrod
*Assistant Examiner* — Blaine G Doletski
(74) *Attorney, Agent, or Firm* — Hoglund & Pamias, PSC; Roberto J. Rios

(57) ABSTRACT

The invention provides extended bisphosphonate-based metal complexes using benzene1,4-bis(bisphosphonic acid) (BBPA), an analog of benzene 1,4-dicarboxylic acid (BDC). Hydrothermal synthesis of BBPA with the bioactive metals $Ca^{2+}$, $Zn^{2+}$, and $Mg^{2+}$ leads to four crystals phases, namely, BBPA-Ca forms I and II, BBPA-Zn form I, and BBPA-Mg form I. Out of the three structures, BBPA-Ca form II presents large channels (8 Å×12 Å), potentiating the use of this framework to load drugs. Cytotoxicity effects of BBPA was elucidated in a human breast cancer MDA-MB-231 and a normal osteoblast hFOB 1.19 cell lines. The half-maximal inhibitory concentration ($IC_{50}$) for BBPA used to treat both cell lines were >200 μM at 24, 48, and 72 h of treatment. The BBPA in the range of concentration employed (0-200 μM) was not cytotoxic against these cell lines.

21 Claims, 43 Drawing Sheets

Benzene 1,4-dicarboxylic acid (BDC)

Benzene 1,4-bis(bisphosphonic acid) (BBPA)

(b)

BENZENE 1,4-BIS(BISPHOSPHONIC ACID)-BASED METAL COMPLEXES, METHOD OF SYNTHESIS AND APPLICATIONS THEREOF

GOVERNMENT INTEREST

This invention was made with government support under grants CHE-1626103 and GM127223-02 awarded by the National Science Foundation (NSF) and the National Institutes of Health (NIH), respectively. The Government has certain rights in this invention.

BACKGROUND OF THE INVENTION

Cancer has become a public health concern in the last decades, expecting to be the leading cause of death worldwide in the 21$^{st}$ century. In 2018, new cases and cancer deaths were estimated at approximately 18.1 M and 9.6 M, respectively. Breast cancer is the second most frequently diagnosed cancer affecting males, females, and the elderly (2.1 M cases as of 2018) and leading to about 626,679 cancer deaths. Breast cancer commonly spreads to the bone causing bone loss or excess of bone deposition, these are classified as osteolytic or osteoblastic bone metastases, correspondingly. The majority of metastatic breast cancer induces bone loss leading to osteolytic bone metastases.

Treatments for osteolytic metastases include chemotherapy, radiotherapy, hormone therapy, and anti-resorptive agents to delay disease progression. Bisphosphonates (BPs) are a class of anti-resorptive agents that are commonly prescribed to stimulate sclerosis leading to increased bone density. BPs can resist enzymatic hydrolysis due to the presence of the P—C—P bond analogous to the P—O—P bond present in pyrophosphates. The P—C—P backbone structure provides BPs with a high affinity to $Ca^{2+}$ ions in the bone microenvironment. Additionally, the substituent hydroxyl group in the geminal carbon (P—C(OH)—P) increases the affinity of BPs to the bone. FIG. 1 illustrates the molecular structure of the most common BPs employed to treat osteolytic metastases. However, orally administered BPs are poorly absorbed (1-2%) and require high drug concentration doses in the treatments, leading to decrease life patient quality due to the undesirable side effects.

Interest in the potential of metal complexes for biological applications has been increasing over the decades. These materials are attractive because of their high surface area and large pore sizes.

These compounds have been investigated as drug carriers, encapsulating, and releasing guest molecules from their framework. For example, benzene 1,4-dicarboxylic acid (BDC, FIG. 2) can coordinate with diverse metal clusters to form metal complexes such as MOF-5(Zn), UiO-66(Zr), MIL-53(Fe), and BDC-Zr. Particularly, MIL-53 (1000 m$^2$/g, 8.6 Å pore size) was loaded with caffeine (30 wt. %) and its release took about 6 h.

Therefore, the assessment of new strategies for the treatment and prevention of osteolytic metastases based on the design of bone-selective drug delivery systems (DDSs) is needed.

SUMMARY OF THE INVENTION

The present invention provides an analog of BDC containing the BP moiety that will lead to porous extended metal complexes capable of encapsulating drugs and binding to the bone microenvironment, thus, enabling the application of these materials as DDSs.

According to an aspect of the invention, benzene 1,4-bis (bisphosphonic acid), (BBPA) was synthesized.

According to another aspect of the invention, the BBPA ligand was used to obtain BBPA-based metal complexes in coordination with bioactive metals.

According to still another aspect of the invention, three essential metals ($Ca^{2+}$, $Zn^{2+}$, and $Mg^{2+}$) were used because of their crucial roles in osteoblastic bone formation and mineralization processes. These essential metals are involved in numerous physiological processes and present low toxicity with $LD_{50}$ of 0.35, 1.0, and 8.1 g/kg, correspondingly.

According to yet another aspect of the invention, hydrothermal synthesis of BBPA with the bioactive metals $Ca^{2+}$, $Zn^{2+}$, and $Mg^{2+}$ leads to four crystals phases, namely, BBPA-Ca forms I and II, BBPA-Zn form I, and BBPA-Mg form I.

According to one aspect of the invention, the crystal structures for BBPA-Ca form I ($P2_1/c$), BBPA-Ca form II (I2/a), BBPA-Zn form I ($P2_1/n$), and BBPA-Mg form I ($P2_1/c$) were elucidated by single-crystal X-ray diffraction (SCXRD).

According to another aspect of the invention, out of the three structures, BBPA-Ca form II presents large channels (8 Å×12 Å), potentiating the use of this framework to load drugs.

According to still another aspect of the invention, dissolution profiles were conducted to investigate the release of BBPA from BBPA-based metal complexes under physiological conditions (phosphate-buffered saline, PBS). These results show that <50% of BBPA was released from the BBPA-based metal complexes after 72 h.

According to yet another aspect of the invention, about 99% of the BBPA could bind to HA in 10 days.

According to an aspect of the invention, the half-maximal inhibitory concentration ($IC_{50}$) for BBPA used to treat MDA-MB-231 and a normal osteoblast hFOB 1.19 cell lines were >200 µM at 24, 48, and 72 h of treatment. The BBPA in the range of concentration employed (0-200 µM) was no cytotoxic against these cell lines.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Experimental Section a) Materials

Thionyl chloride [$SOCl_2$, 99% pure], tris(trimethylsilyl) phosphite [$(CH_3)_3SiO]_3P$, 92% pure] were bought from Fisher Scientific (Hampton, N.H.). Benzene 1,4-dicarboxylic acid [$C_6H_4$-1,4-$(COOH)_2$, 98% pure], calcium nitrate tetrahydrate [$Ca(NO_3)_2 \cdot 4H_2O$, 99% pure], zinc nitrate hexahydrate [$Zn(NO_3)_2 \cdot 6H_2O$, 98% pure], magnesium nitrate hexahydrate [$Mg(NO_3)_2 \cdot 6H_2O$, 99% pure], sodium hydroxide (NaOH, 0.1M), (NaCl, ACS reagent >99.0% pure) and hydrochloric acid (HCl, 37%) were acquired from Sigma-Aldrich (St. Louis, Mo.). Nano pure water was obtained from an ARIES Filter Works Gemini High purity water system (18.23 M-Ohm/cm).

Hydroxyapatite ($Ca_5(OH)(PO_4)_3$, synthetic powder) and Phosphate buffered saline (PBS, tablets) were purchased from Sigma-Aldrich (Milwaukee, Wis.). Human breast cancer MDA-MB-231 (ATCC® HTB-26™) and normal osteoblast-like hFOB 1.19 (ATCC® CRL-11372™) cell lines were purchased from ATCC (Manassas, Va.). Dulbecco's Modified Eagle's Medium (DMEM) was obtained from Sigma-Aldrich (Milwaukee, Wis.). Penicillin-streptomycin (Pen-Strep) and fetal bovine serum (FBS) were obtained from Sigma-Aldrich (St. Louis, Mo.). The 1:1 mixture of Ham's F-12 Medium/Dulbecco's Modified Eagle's Medium (1:1 DMEM:F-12) and geneticin (G418) were purchased from Bioanalytical Instruments (San Juan, PR).

b) Synthesis of BBPA

BBPA was synthesized following previously reported procedures. Benzene 1,4-dicarboxylic acid was refluxed in $SOCl_2$ at 70-80° C. for 10 h, after this period; the excess of solvent was removed by roto evaporation. The product obtained (an acyl chloride) was utilized to carry out the second step of the reaction, in which 7 mL of tris(trimethylsilyl) phosphite at 0° C. were added to the acyl chloride. The reaction was left to reach room temperature for 1 h, and then left undisturbed under constant stirring for 3 d at 50° C. Roto evaporation was employed to remove the excess of tris(trimethylsilyl) phosphite. Then 25 mL of methanol was added to the ester product and the reaction was left for 1 d under stirring at room temperature. The excess of methanol was removed by roto evaporation. The final product was washed first with methanol and then with diethyl ether, and dry under vacuum. The final product was characterized through Raman spectroscopy, nuclear magnetic resonance (NMR), differential scanning calorimetric (DSC), powder X-ray diffraction (PXRD), and thermogravimetric analysis (TGA) to confirm that BBPA had been synthesized.

Characterization of BBPA

Figure 8:
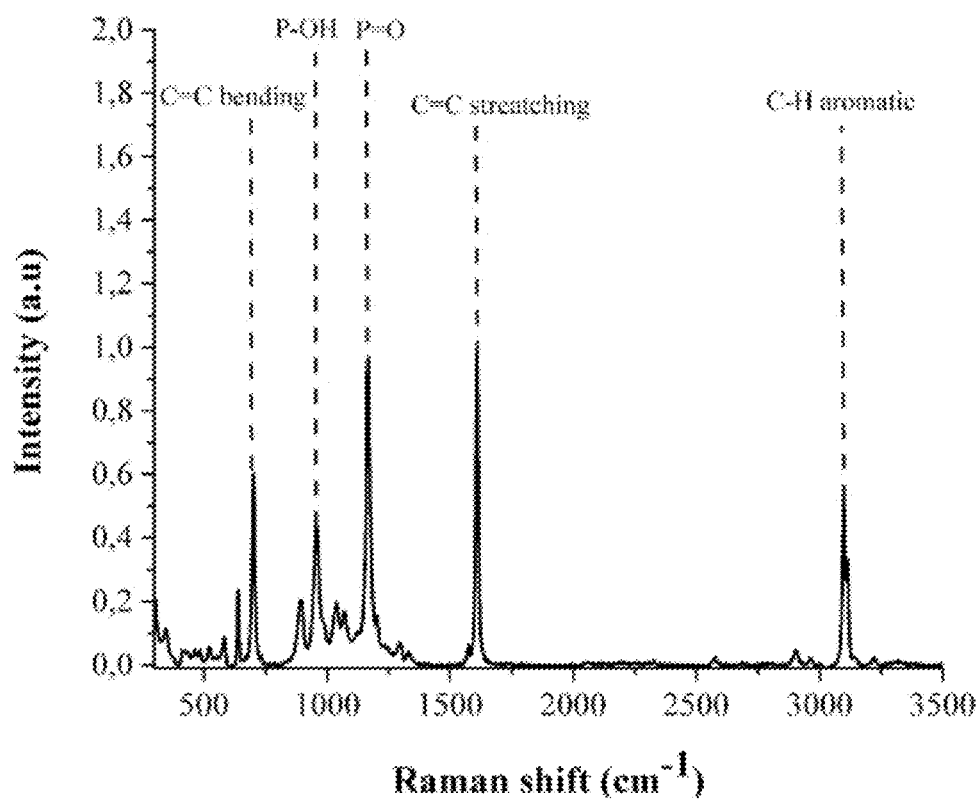
FIG. 8 shows Raman spectra of synthesized BBPA. The data collection for the spectrum was from 3,500 to 250 cm$^{-1}$.

Raman Vibrational Spectroscopy. The Raman spectra was recorded using a Thermo Scientific DXR Raman microscope, with a laser of 532 nm, a slit of 50 μm and a grating of 400 lines/nm. The data was collected by averaging 32 scans (exposure time 5 s). The collection range was from 3,500 to 250 cm$^{-1}$. The OMNIC for Dispersive Raman Software version 9.2.0 was utilized to record the experiment and data analysis. FIG. 8 shows the Raman spectra for BBPA, which presents characteristic Raman shifts for the principal vibrational modes of the ligand. Raman shifts (υ max, cm$^{-1}$): >3,200 (ν OH/$H_2O$), 3,089 (CH aromatic), 1.610 (C=C, stretching), 1,163 (ν P=O/δ$^\pi$ POH, stretching), 980 ($v^{as}$ P—O(H), stretching), 953 (δ PO—H, bending), 886 (benzene p-substituted), and 698 (C=C, bending). These Raman shifts have been observed in previous accounts.

Figure 5:
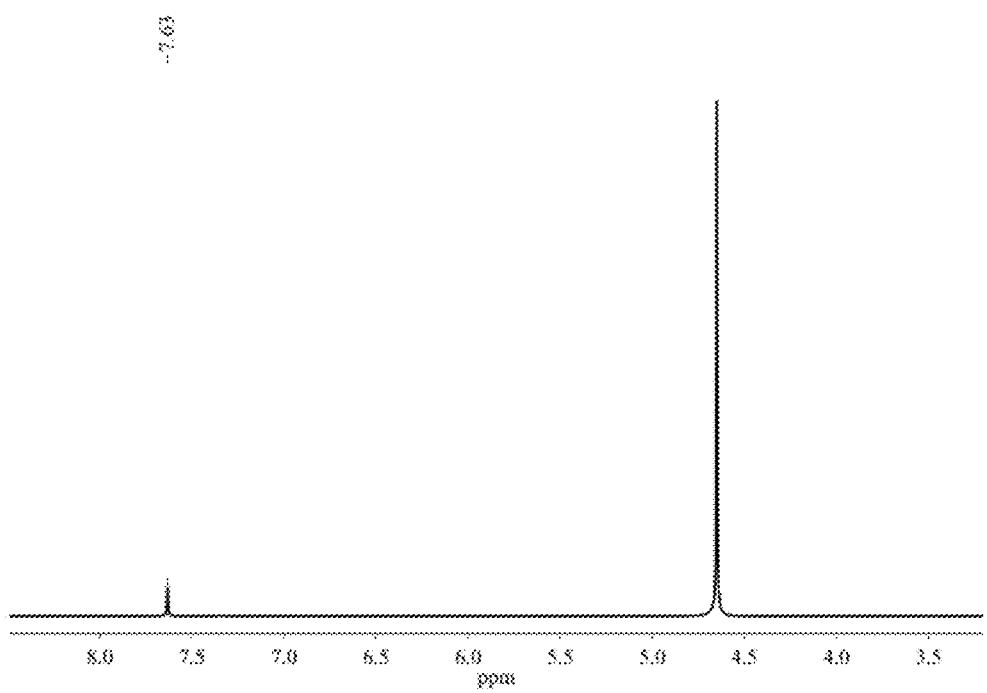
FIG. 5 shows $^1$H-NMR spectrum for the synthesized BBPA. The experiment was carried out at room temperature. Signal about 7.63 ppm corresponds to the aromatic hydrogens presented in the molecular structure of the BBPA ligand. The signal of $H_2O$ in the $D_2O$ solvent appears around 4.8 ppm, this value is in accordance with chemical shift reported previously in literature.
Figure 6:
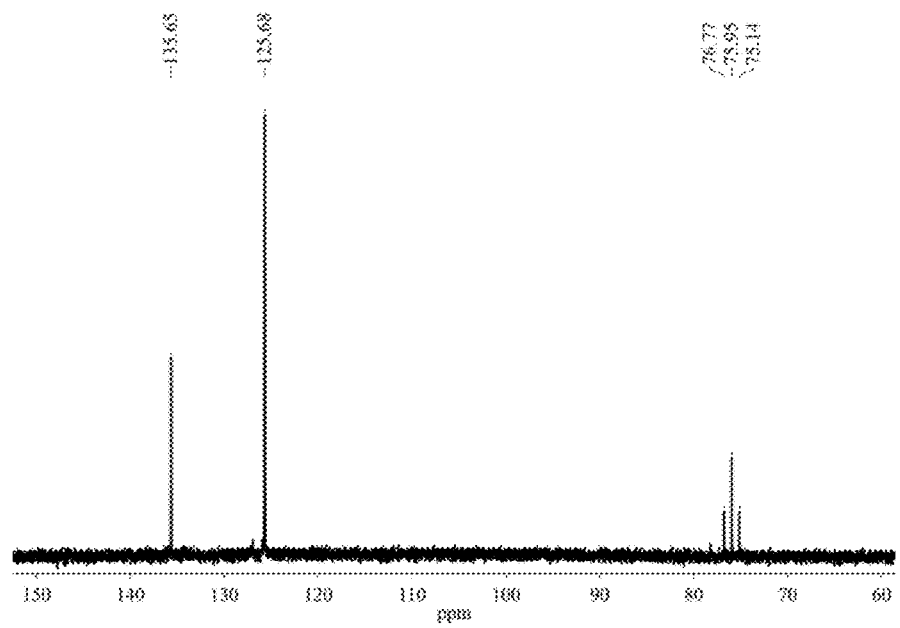
FIG. 6 shows $^{13}$C-NMR spectrum for the synthesized BBPA. The experiment was carried out at room temperature. The solvent used during the analysis was $D_2O$. The signals corresponding to the aromatic carbons appear ~120 ppm. A triplet around 76 ppm was observed corresponding to the carbon in the bisphosphonic functional group of this molecule, these values are in accordance with chemical shift reported previously in literature.
Figure 7:
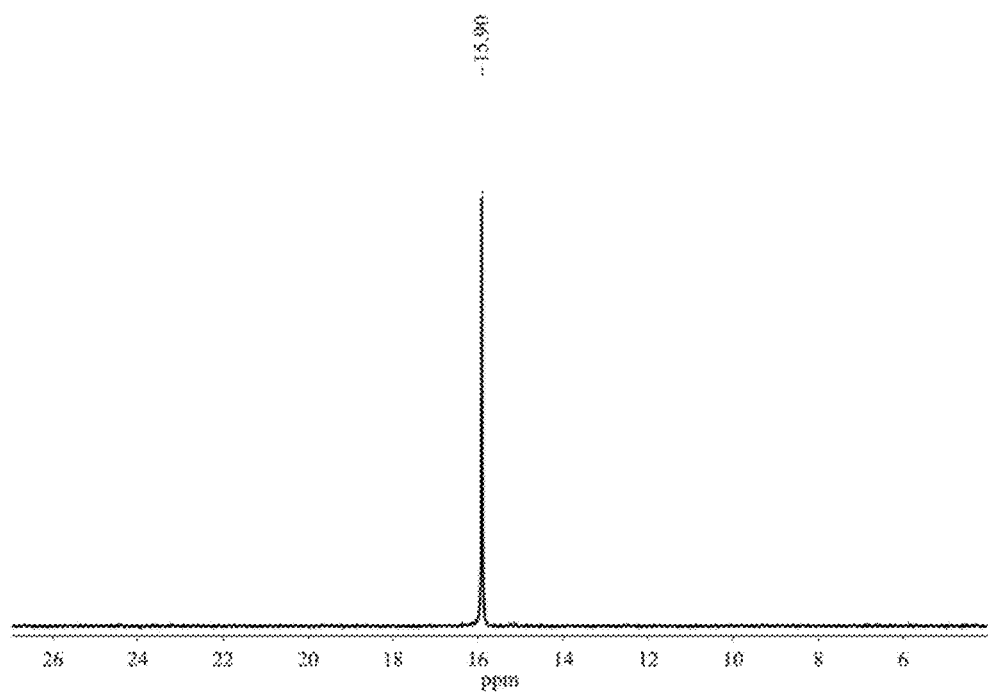
FIG. 7 shows $^{31}$P-NMR spectrum for the synthesized BBPA. The experiment was carried out at room temperature. The solvent used during the analysis was $D_2O$. The signal of the symmetric phosphorus of the BBPA molecule appears at 15.90 ppm, this value is in accordance with chemical shift reported previously in literature.

Nuclear magnetic resonance (NMR). $^1$H NMR, $^{13}$C NMR, $^{31}$P NMR were recorded with Bruker Ascend Aeon 700 MHz NMR equipped with multinuclear, variable temperature, and cross-polarization magnetic angle spinning. Samples were run at room temperature. Deuterated water was employed as a solvent. FIGS. 5-7 illustrate the $^1$H NMR, $^{13}$C NMR, and $^{31}$P NMR for the BBPA ligand. Chemical shifts (δ) were registered in ppm. Principal signals are described as follows: $^1$H NMR (700 MHz, $D_2O$): δ (ppm)=7.63 (s, 4H, aromatic H). $^{13}$C NMR (700 MHz, $D_2O$): δ (ppm)=135.65 (s, 2C), 125.68 (s, 4C), and 75.95 (t, 2C, coupled with phosphorus). $^{31}$P NMR (700 MHz, $D_2O$): δ (ppm)=15.9 (s, 4P). Signals observed in all NMR spectra for the BBPA produced were similar to previous reports were the synthesis and characterization of BBPA has been described.

Figure 11:
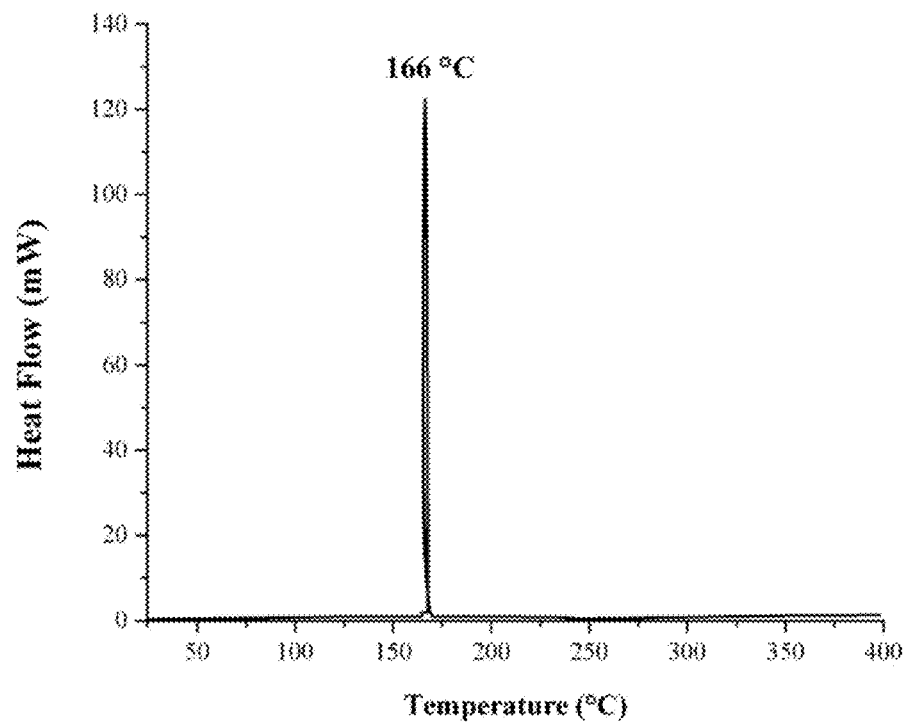
FIG. 11 shows DSC thermogram of the synthesized BBPA. The DSC analysis identifies the melting point of the ligand at 166° C.
Figure 12:
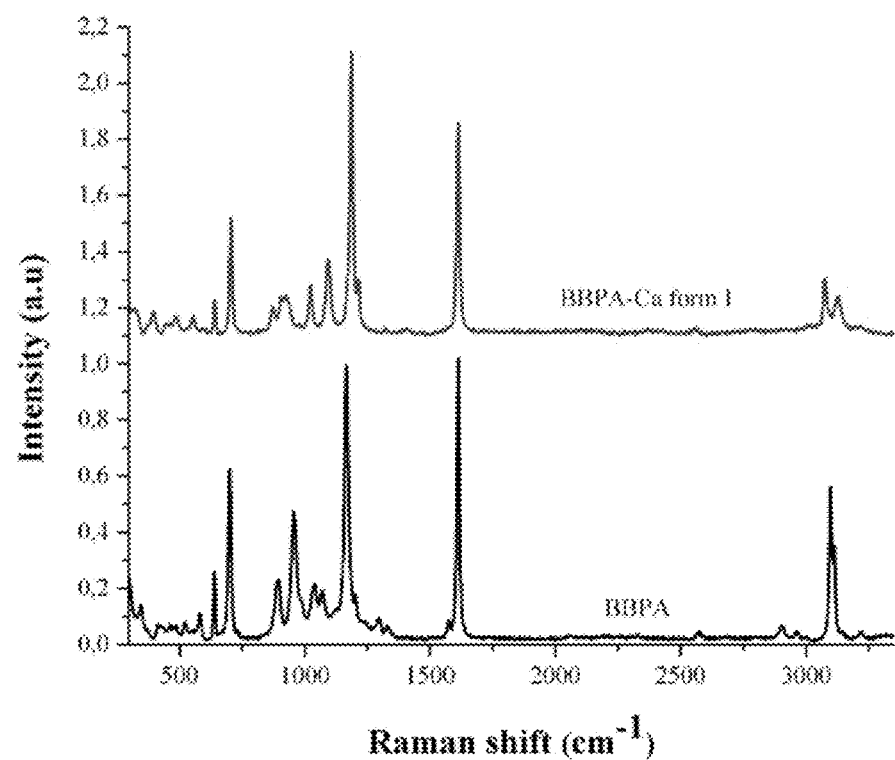
FIG. 12 shows Raman Spectra overlay of BBPA-Ca form I (red) and BBPA (black). The data collection for the spectrum was from 3,500 to 250 cm$^{-1}$.
Figure 13:
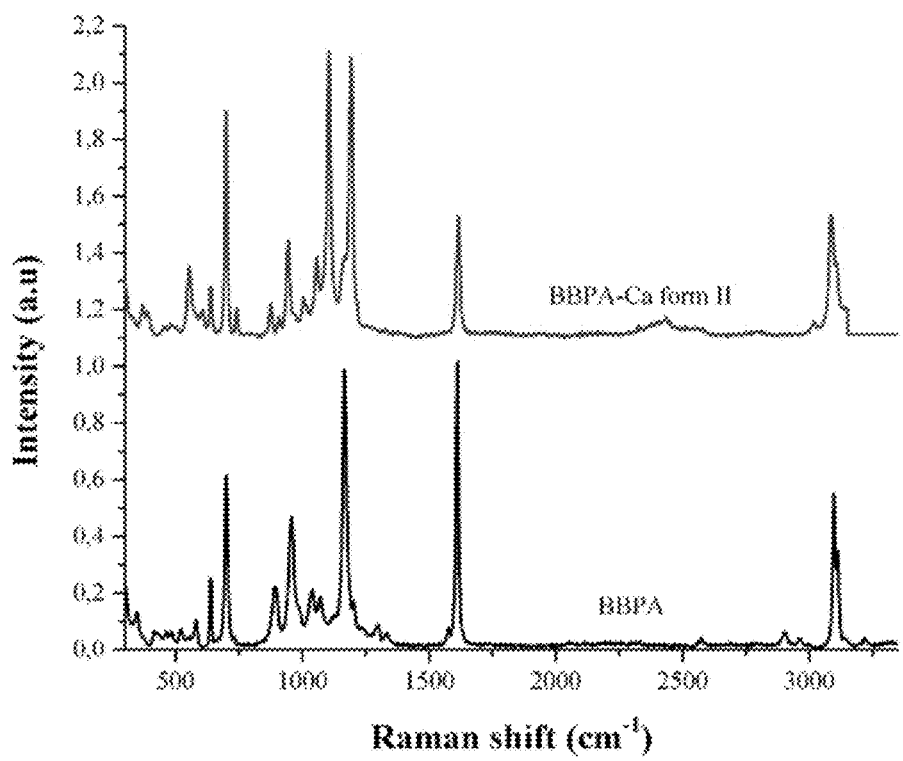
FIG. 13 shows Raman Spectra for BBPA-Ca form II (red) and BBPA (black). The data collection for the spectrum was from 3,500 to 250 cm$^{-1}$.
Figure 14:
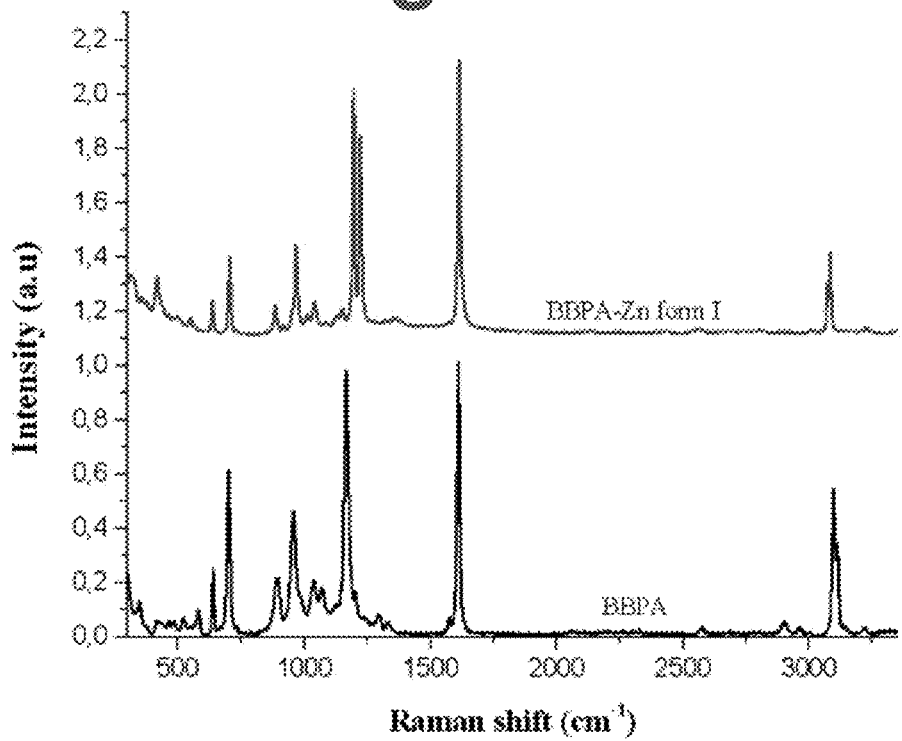
FIG. 14 shows Raman Spectra for BBPA-Zn form I (red) and BBPA (black). The data collection for the spectrum was from 3,500 to 250 cm$^{-1}$.
Figure 15:
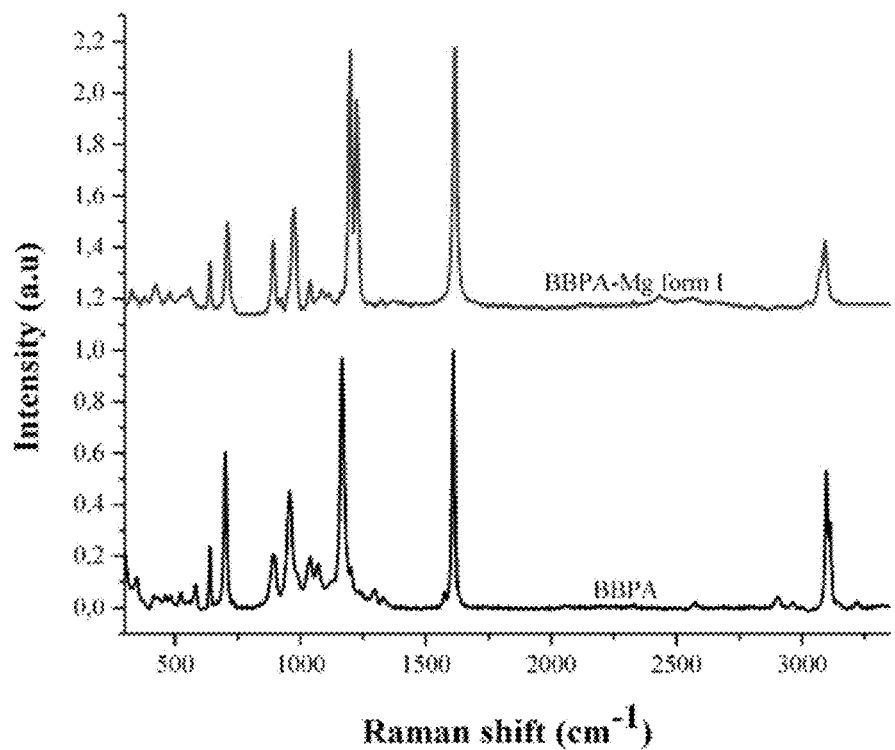
FIG. 15 shows Raman Spectra for BBPA-Mg form I (red) and BBPA (black). The data collection for the spectrum was from 3,500 to 250 cm$^{-1}$.
Figure 16:
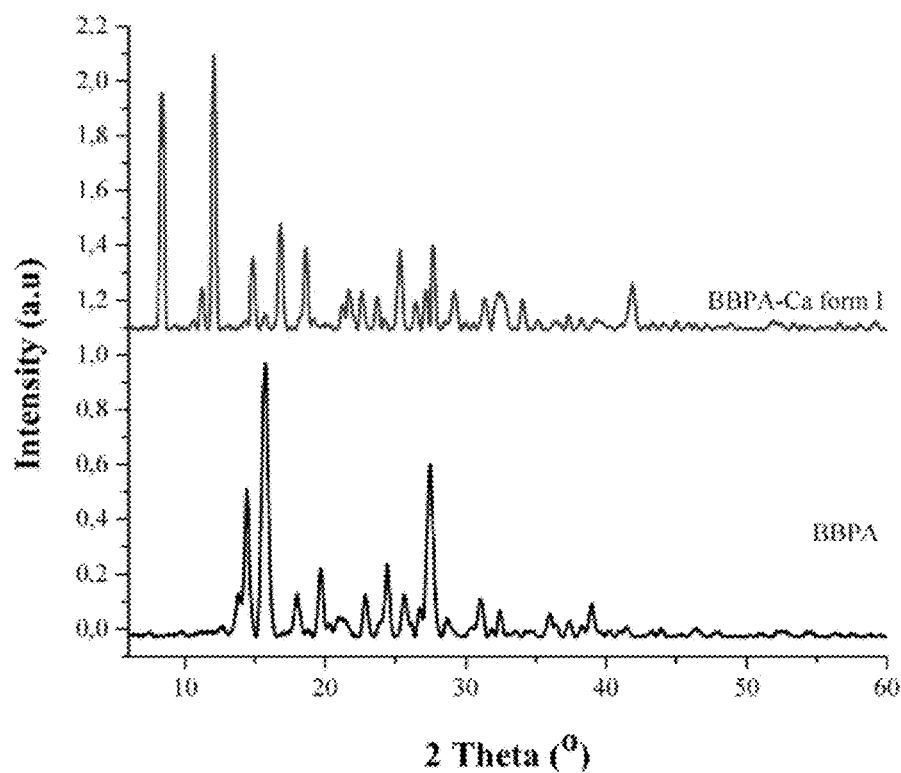
FIG. 16 shows Powder X-ray diffractogram for BBPA (black) and BBPA-Ca form I (red). The experiment was carried out in fast phi mode for powder at 300 K using a 90 s exposure.
Figure 17:
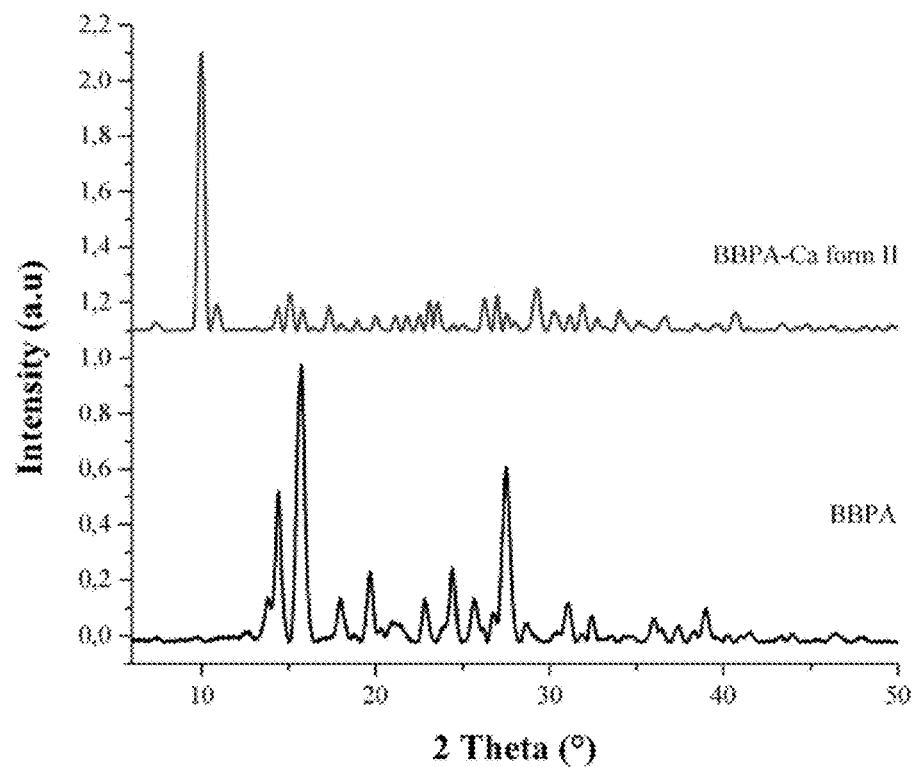
FIG. 17 shows Powder X-ray diffractogram for BBPA (black) and BBPA-Ca form II (red). The experiment was carried out in fast phi mode for powder at 300 K using a 90 s exposure.
Figure 18:
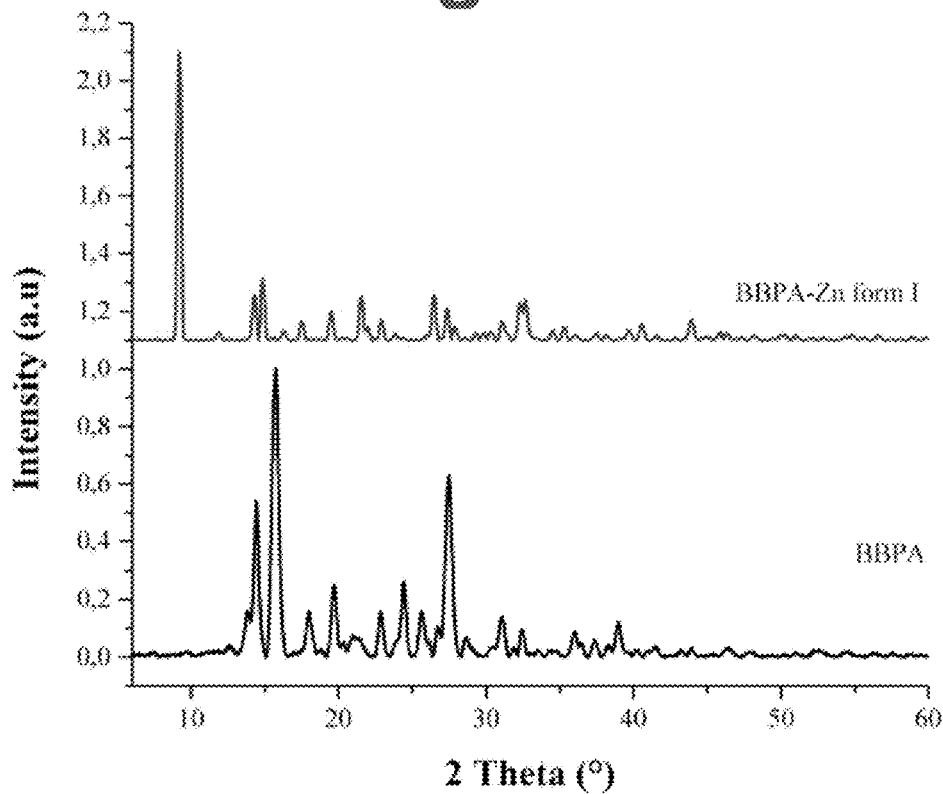
FIG. 18 shows Powder X-ray diffractogram for BBPA (black) and BBPA-Zn form I (red). The experiment was carried out in fast phi mode for powder at 300 K using a 90 s exposure.
Figure 19:
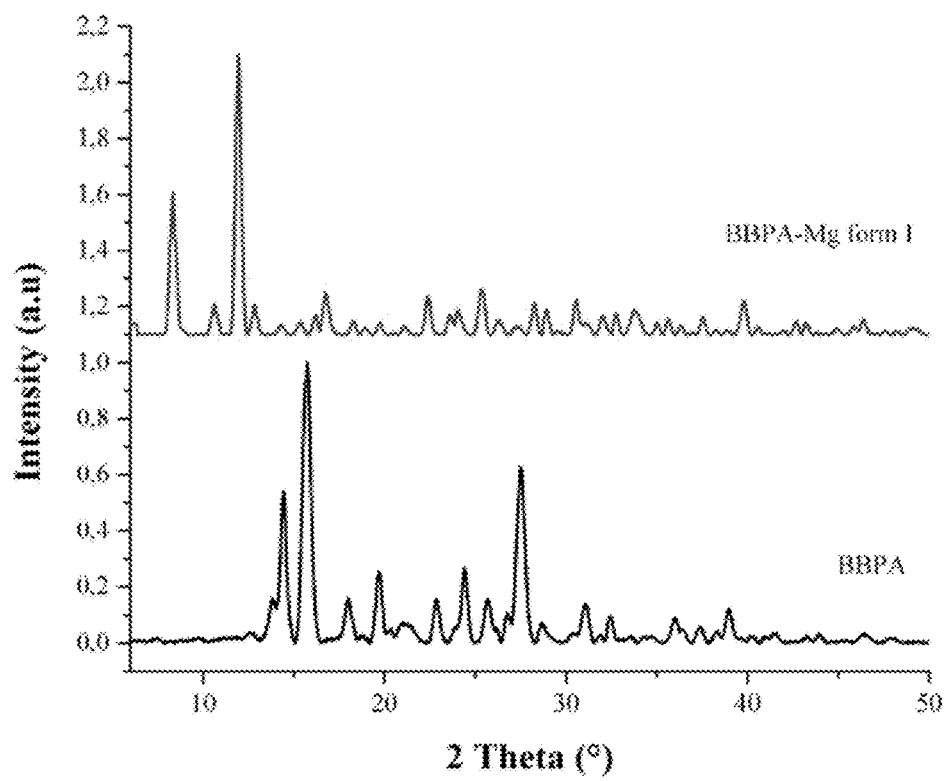
FIG. 19 shows Powder X-ray diffractogram for BBPA (black) and BBPA-Mg form I (red). The experiment was carried out in fast phi mode for powder at 300 K using a 90 s exposure.
Figure 20:
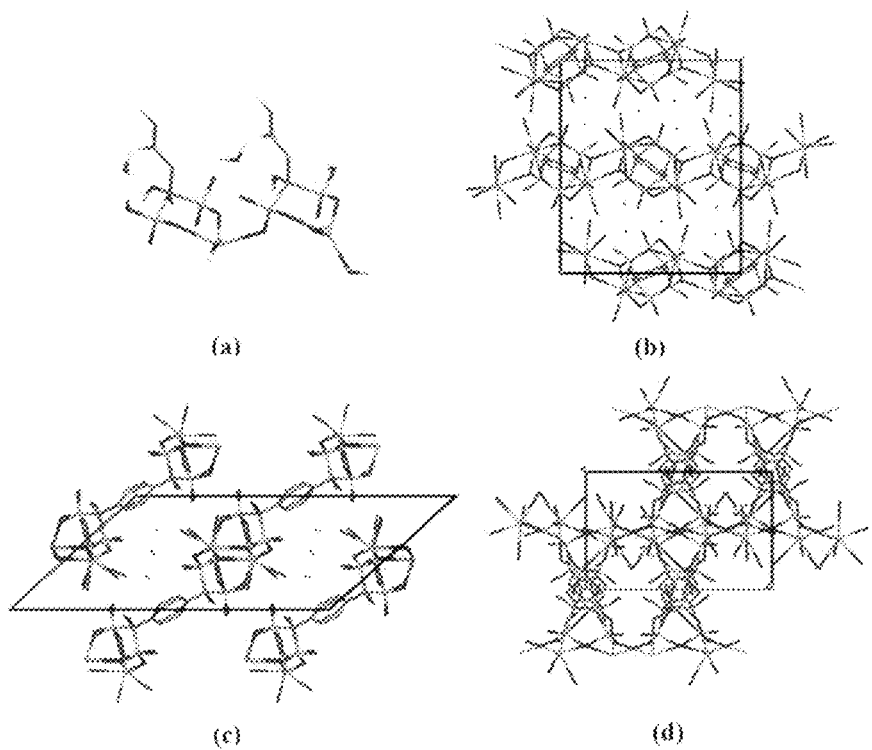
FIG. 20 shows the crystalline structure of BBPA-Ca form I. (a) the asymmetric unit of BBPA-Ca form I, and its packing along (b) a-axis, (c) b-axis, and (d) c-axis.
Figure 21:
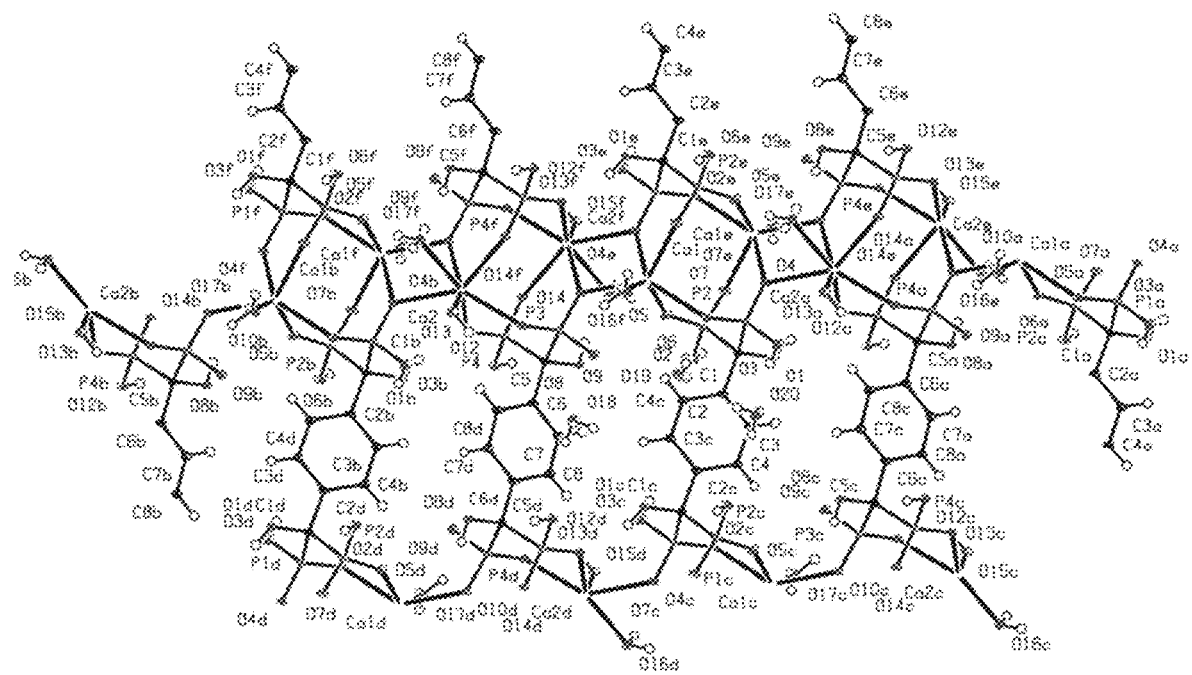
FIG. 21 shows a Ball-stick representation (atoms labeled) showing the connectivity between Ca atom and BBPA to form BBPA-Ca form I.
Figure 22:
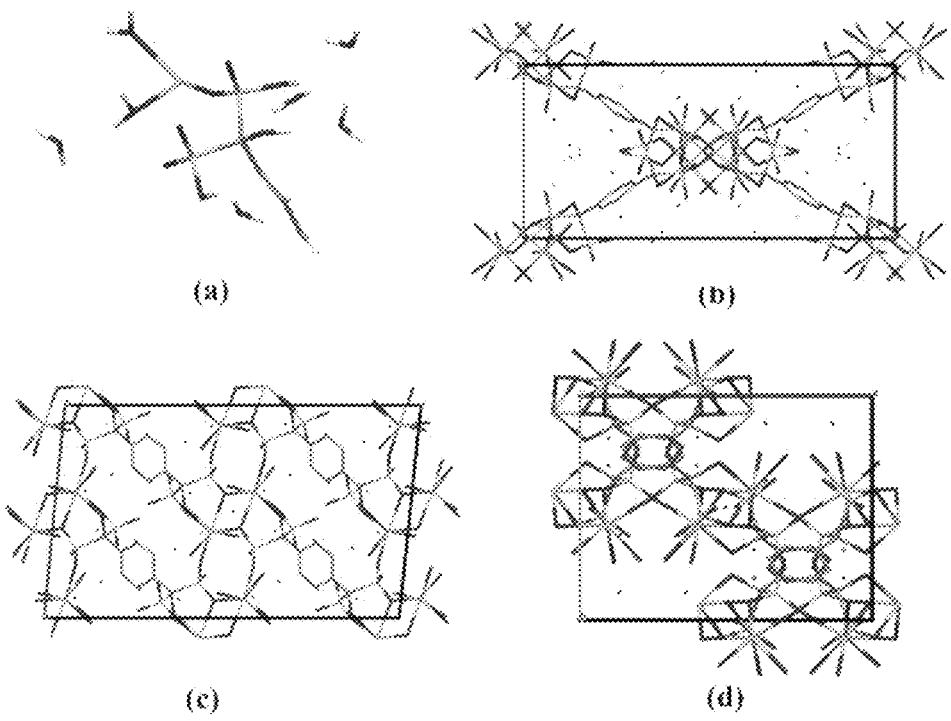
FIG. 22 shows the crystalline structure of BBPA-Ca form II. (a) the asymmetric unit of BBPA-Ca form II and its packing along (b) a-axis, (c) b-axis, and (d) c-axis.
Figure 23:
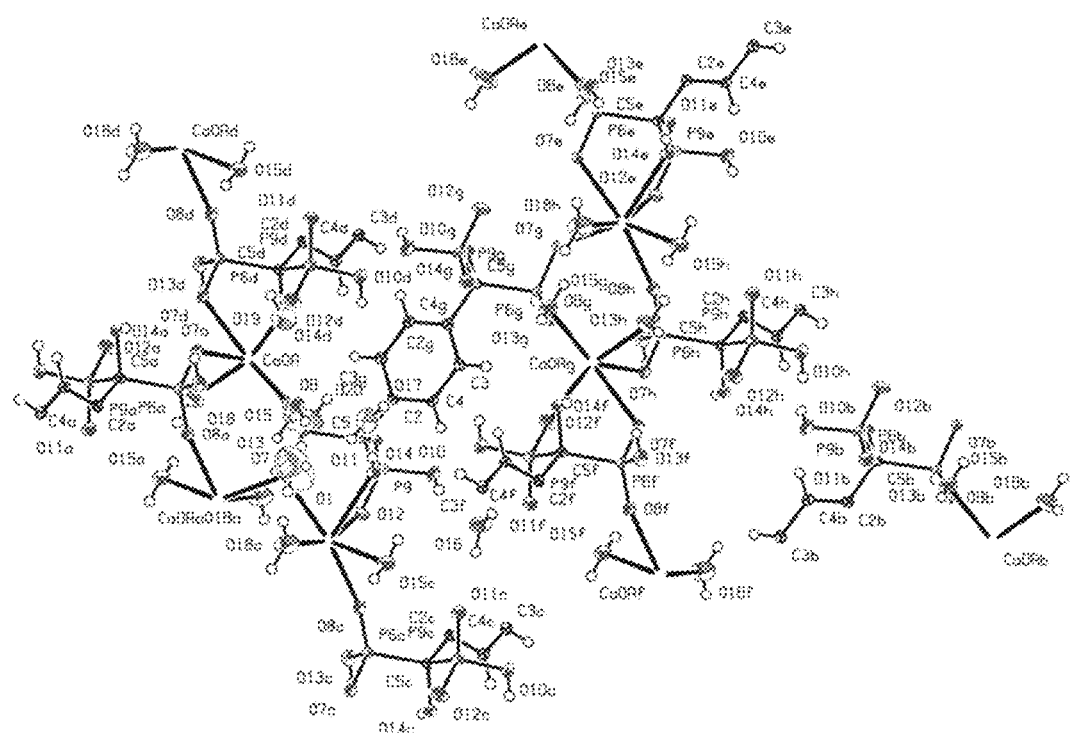
FIG. 23 shows a Ball-stick representation showing the connectivity between Ca atom and BBPA to form BBPA-Ca form II.
Figure 24:
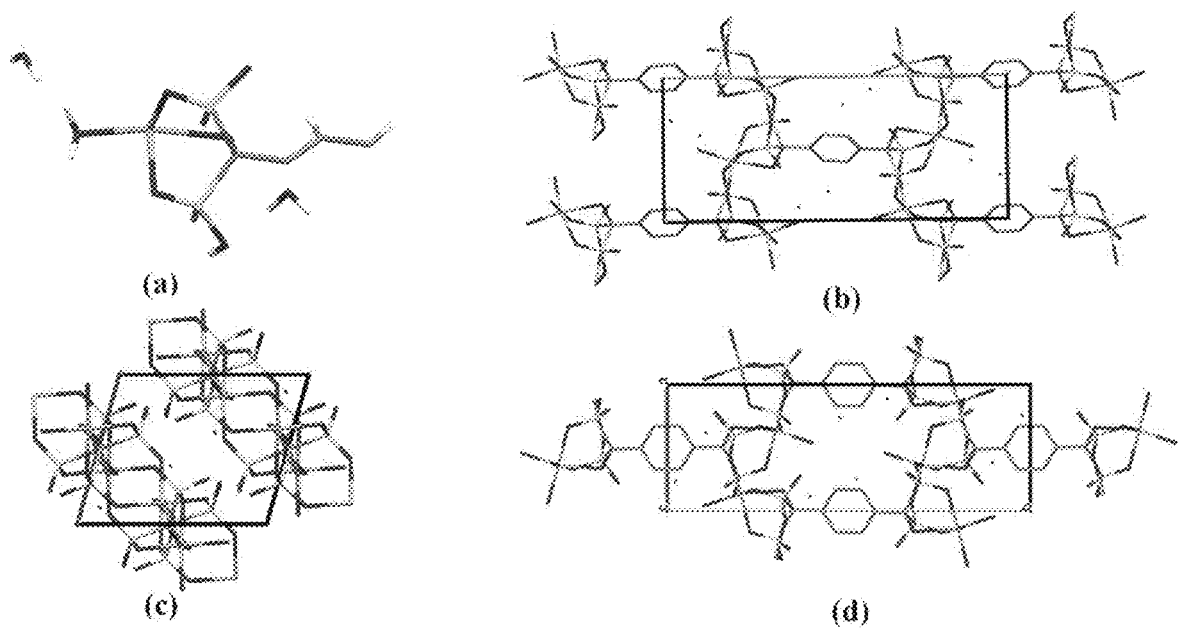
FIG. 24 shows the crystalline structure of BBPA-Zn form I. (a) the asymmetric unit of BBPA-Zn form I, and its packing along (b) a-axis, (c) b-axis, and (d) c-axis.
Figure 25:
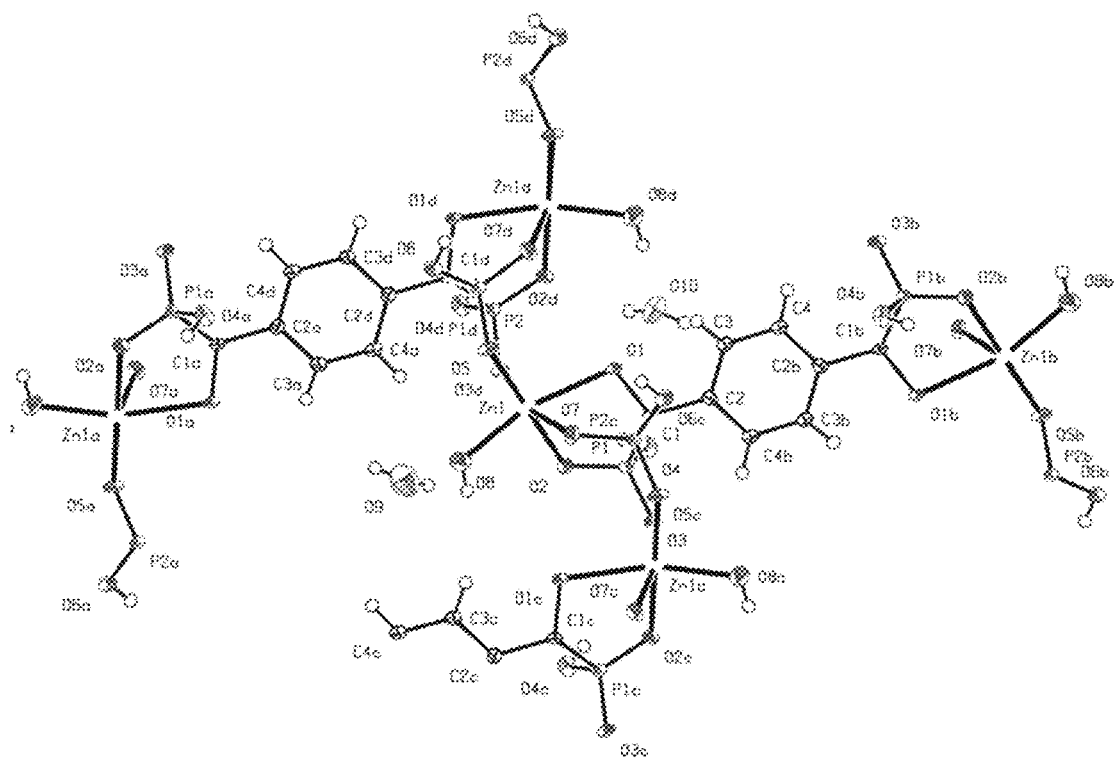
FIG. 25 shows a Ball-stick representation showing the connectivity between Zn atom and BBPA to form BBPA-Zn form I.
Figure 26:
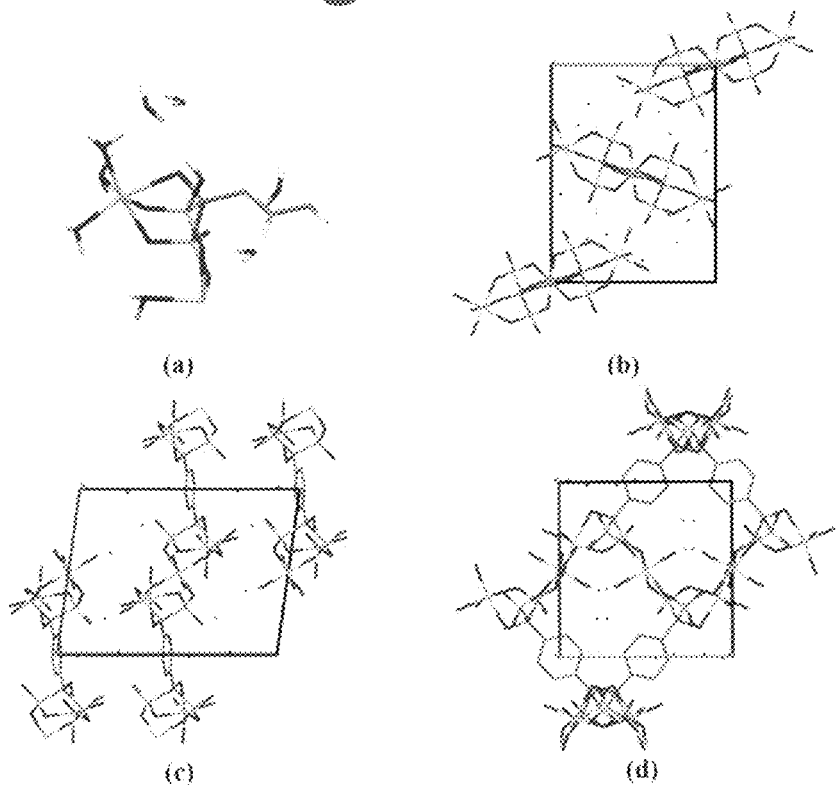
FIG. 26 shows the crystalline structure of BBPA-Mg form I. (a) the asymmetric unit of BBPA-Mg form I, and its packing along (b) a-axis, (c) b-axis, and (d) c-axis.
Figure 27:
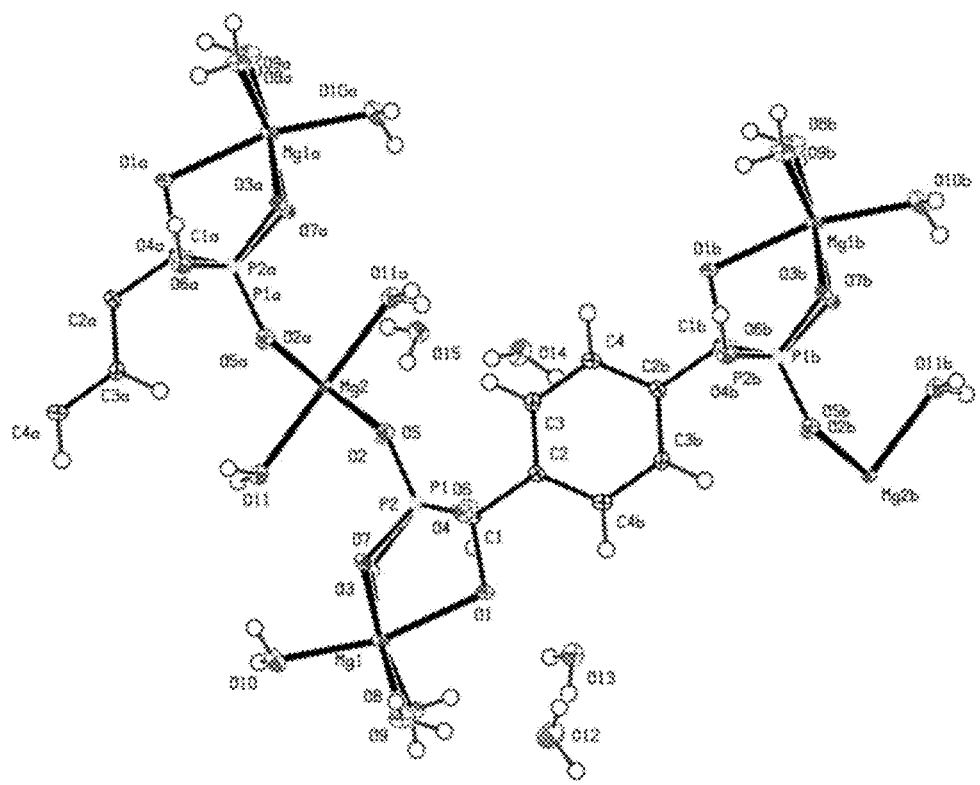
FIG. 27 shows an ORTEP representation showing the connectivity between Mg atom and BBPA to form BBPA-Mg form I complex.
Figure 28:
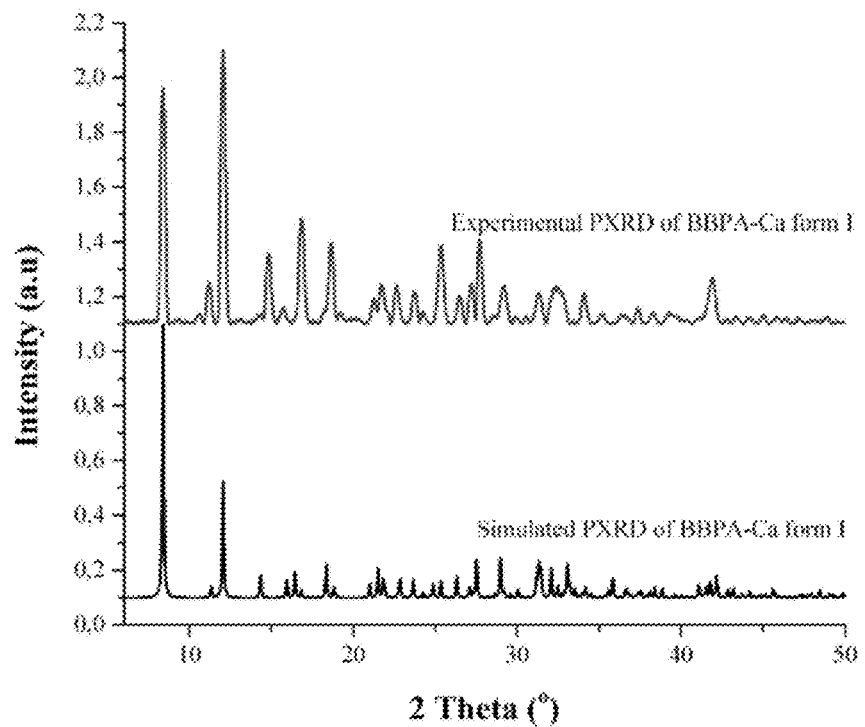
FIG. 28 shows experimental (top) and simulated (bottom) PXRD for BBPA-Ca form I at 100 K. The experimental PXRD of BBPA-Ca form I is equal to the simulated PXRD from the solved crystal structure.
Figure 29:
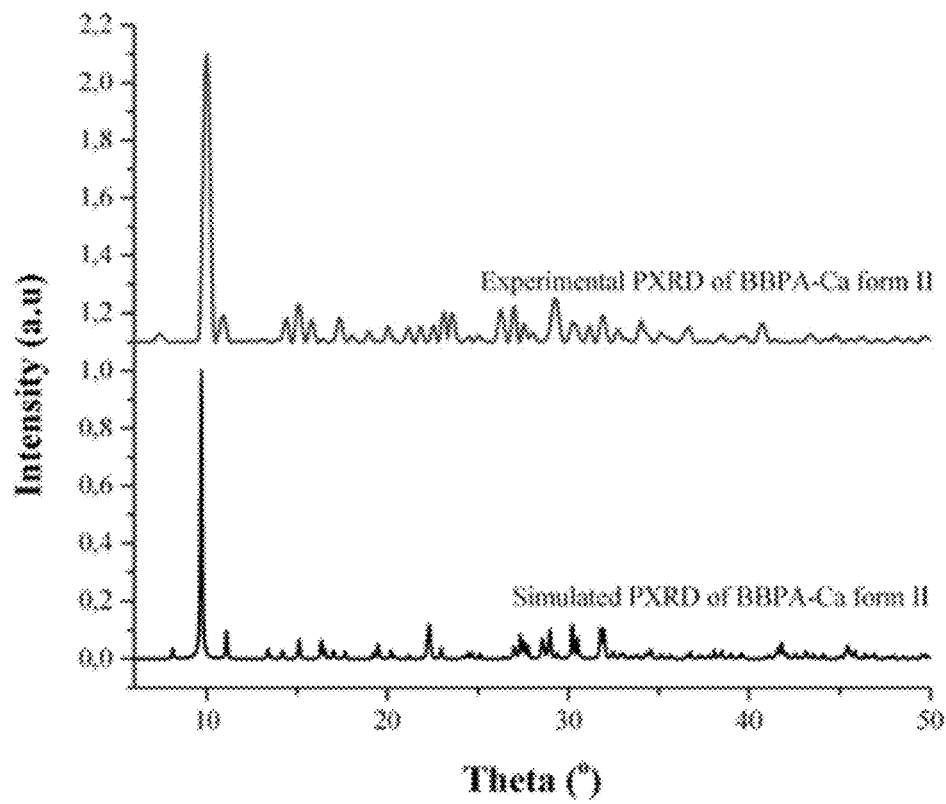
FIG. 29 shows experimental (top) and simulated (bottom) PXRD for BBPA-Ca form II at 100 K. The experimental PXRD of BBPA-Ca form II is equal to the simulated PXRD from the solved crystal structure.
Figure 30:
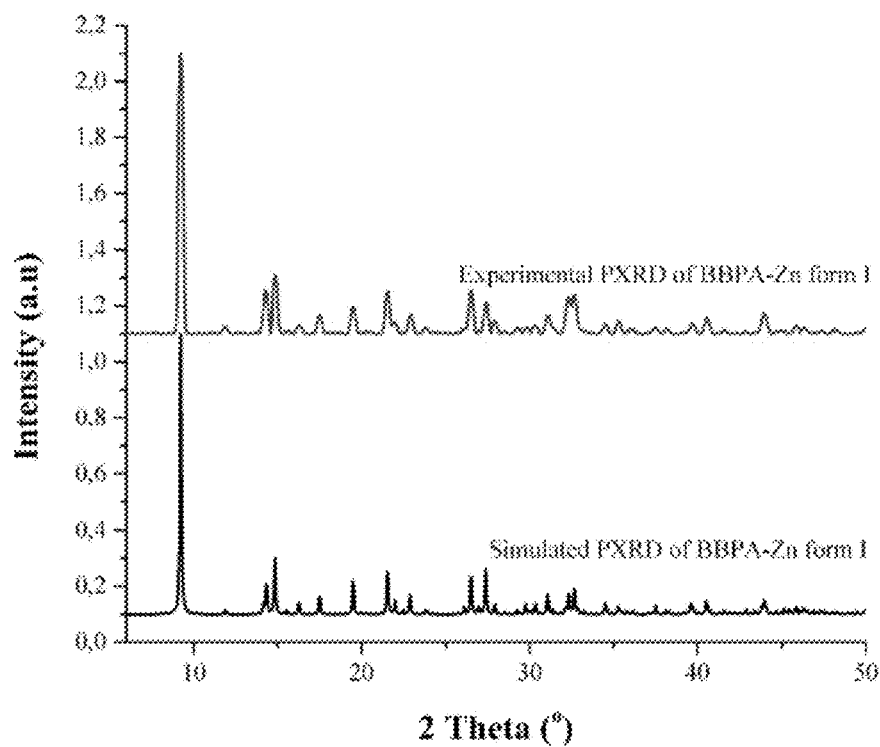
FIG. 30 shows experimental (top) and simulated (bottom) PXRD for BBPA-Zn form I at 100 K. The experimental PXRD of BBPA-Zn form I is equal to the simulated PXRD from the solved crystal structure.
Figure 31:
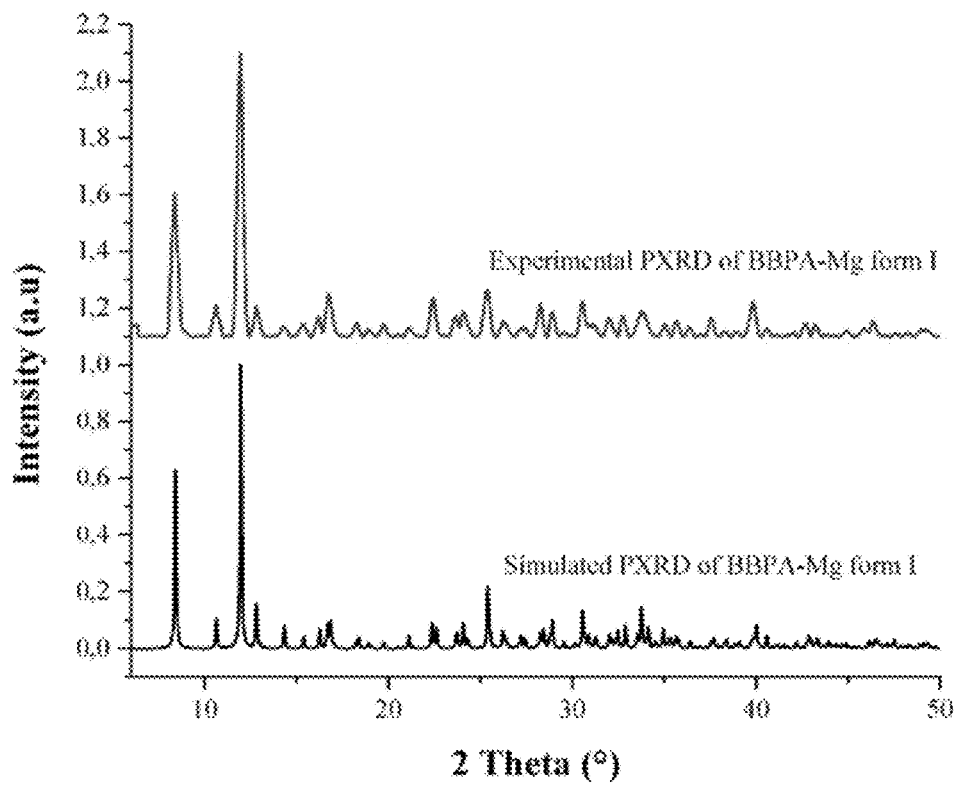
FIG. 31 shows experimental (top) and simulated (bottom) PXRD for BBPA-Mg form I at 100K. The experimental PXRD of BBPA-Mg form I is equal to the simulated PXRD from the solved crystal structure.

Differential Scanning Calorimeter (DSC). A DSC Q2000 (TA Instruments Inc.) was employed to collect the DSC thermograph of BBPA. The instrument was equipped with a refrigerated cooling system (RCS40) and a 50-position autosampler. An indium standard (Tm=156.6° C. and ΔHf=28.54 J/g) was used for the calibration of the instrument. About 1-2 mg of powder BBPA was utilized to perform the experiment. Samples were prepared using hermetically sealed aluminum pans. DSC thermograph of BBPA was collected in a temperature range of 30-400° C. under $N_2$ atmosphere (50 mL/min) at a rate of 5° C./min. Data were analyzed with TA Universal Analysis software v 4.5 Å. The melting point determined through DSC for BBPA was 166° C. (FIG. 11). The melting point of BBPA has not been previously reported in the literature for this compound.

Figure 9:
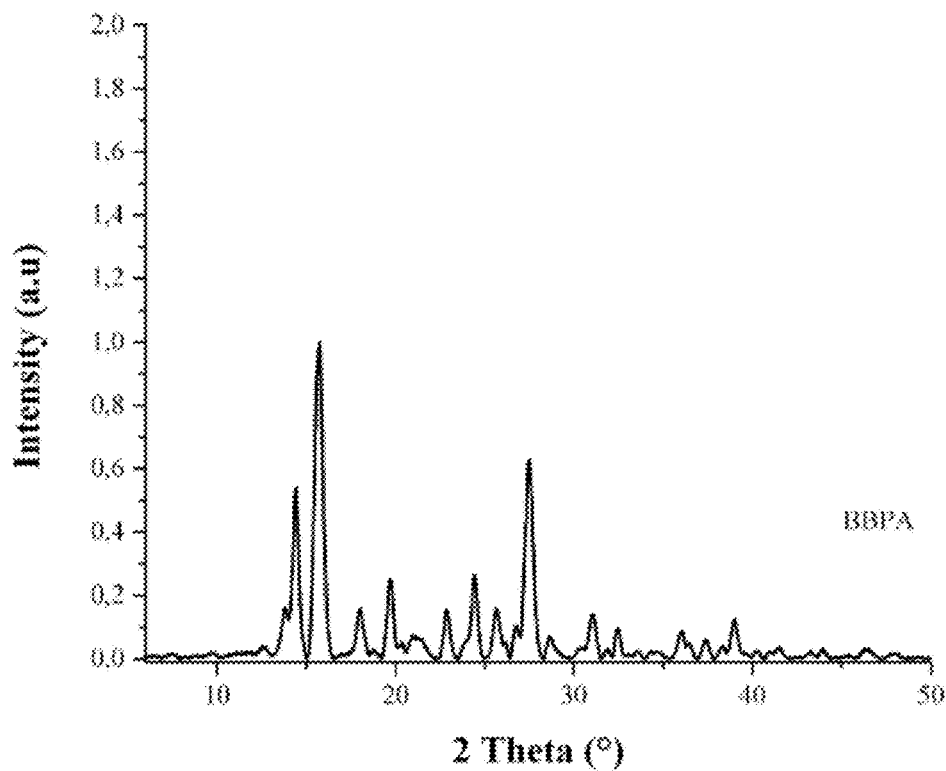
FIG. 9 shows PXRD diffractogram of synthesized BBPA. The experiment was carried out in fast phi mode for powder at 300 K using a 90 s exposure.

Micro-powder X-ray diffraction (PXRD). A Rigaku Xta-LAB SuperNova X-ray diffractometer with micro-focus Cu-Kα radiation (λ=1.5417 Å) source was used for the analysis. The diffractometer was equipped with a HyPix3000 X-ray detector. Experiments were carried out in transmission mode operating at 50 kV and 1 mA. The powdered sample was mounted with paratone oil on MiTe-Gen micro-loops. The powder X-ray diffractogram of BBPA was accumulated at 300 K using an Oxford Cryosystem Cryostream 800 cooler, in a 2θrange (6-60°) using the fast phi mode for powder during 90 s. The CrystAllis$^{PRO}$ software (1.171.3920a version) was applied to analyze the data shown in FIG. 9.

Figure 10:
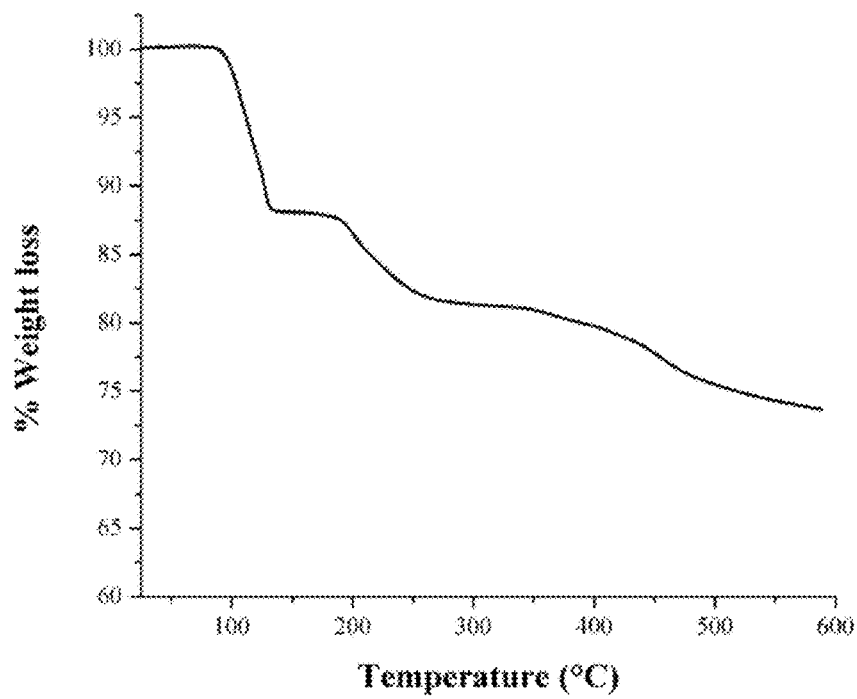
FIG. 10 shows TGA thermogram of synthesized BBPA. The experiment was conducted at 5° C./min in a temperature range between 30-700° C. Weight loss for water molecules (13 wt. %) was observed at 100° C. The decomposition (12 wt. %) started at 200° C.

Thermogravimetric analysis (TGA). The thermal decomposition of BBPA was determined using a TGA Q500 (TA Instruments Inc.). TGA thermograph of BBPA was recorded between 30-700° C. at a heating rate of 5° C./min under $N_2$ (60 mL/min). About 2-5 mg of the powder sample of BBPA was utilized for each TGA analysis (FIG. 10). Data collected was analyzed using the TA Universal Analysis software v 4.5 Å.

c) Synthesis of BBPA-based metal complexes Individual solutions of BBPA (0.002 and 0.004 mmol), $Ca(NO_3)_2 \cdot 4H_2O$ (0.002 mmol), $Zn(NO_3)_2 \cdot 6H_2O$ (0.002 mmol), and $Mg(NO_3)_2 \cdot 6H_2O$ (0.004 mmol) were prepared as follows. In a vial, 10.0 to 20.0 mg of BBPA were diluted in 10.0 mL of nano pure water. Separately, 5.5 mg of $Ca(NO_3)_2 \cdot 4H_2O$, 6.7 mg of $Zn(NO_3)_2 \cdot 6H_2O$ and 11.19 mg of $Mg(NO_3)_2 \cdot 6H_2O$ were dissolved with 10.0 mL of nano pure water to produce the metal salt solution. Then, 5.0 mL of the prepared metal solution was added to 5 mL of BBPA solution in separate vials. The mixtures were left in a heating block for 5 d at 60° C. (BBPA-Ca form I, BBPA-Zn form I, and BBPA-Mg form I) and 25° C. (BBPA-Ca form II). After crystals were visually detected, the vials were removed from the heating source and left undisturbed. The crystals were collected after they reached room temperature by vacuum filtration and air-dried.

BBPA-Ca form I. Individual solutions of BBPA (0.002 mmol) and $Ca(NO_3)_2 \cdot 4H_2O$ (0.002 mmol) were prepared as follows. In a vial, 10.0 mg of BBPA were diluted in 10.0 mL of nano pure water. Separately, 5.5 mg of $Ca(NO_3)_2 \cdot 4H_2O$ were dissolved with 10.0 mL of nano pure water to produce the metal salt solution. The BBPA solution was divided into two vials, each containing 5.0 mL. Then, 5.0 mL of the prepared metal solution was added to the BBPA solution in each vial. The mixture was left in a heating block for 5 d at 60° C. After crystals were visually detected, the vials were removed from the heating source and left undisturbed. The crystals were collected after these reached room temperature by vacuum filtration and air-dried.

BBPA-Ca form II. Individual solutions of BBPA (0.002 mmol) and $Ca(NO_3)_2 \cdot 4H_2O$ (0.002 mmol) were prepared as follows. In a vial, 10.0 mg of BBPA were diluted in 10.0 mL of nano pure water. Separately, 5.5 mg of $Ca(NO_3)_2 \cdot 4H_2O$ were dissolved with 10.0 mL of nano pure water to produce the metal salt solution. The BBPA solution was divided into two vials, each containing 5.0 mL. Then, 5.0 mL of the prepared metal solution was added to the BBPA solution in each vial. The mixture was left in a heating block for 5 d at 25° C. After crystals were visually detected, the vials were removed from the heating source and left undisturbed. The crystals were collected after these reached room temperature by vacuum filtration and air-dried.

BBPA-Zn form I. Individual solutions of BBPA (0.002 mmol) and $Zn(NO_3)_2 \cdot 6H_2O$ (0.002 mmol) were prepared as follows. In a vial, 10.0 mg of BBPA were diluted in 10.0 mL of nano pure water. Separately, 6.7 mg of $Zn(NO_3)_2 \cdot 6H_2O$ were dissolved with 10.0 mL of nano pure water to produce the metal salt solution. The BBPA solution was divided into two vials, each containing 5.0 mL. Then, 5.0 mL of the prepared metal solution was added to the BBPA solution in each vial. The mixture was left in a heating block for 5 d at 60° C. After crystals were visually detected, the vials were removed from the heating source and left undisturbed. The crystals were collected after these reached room temperature by vacuum filtration and air-dried.

BBPA-Mg form I. Individual solutions of BBPA (0.004 mmol) and $Mg(NO_3)_2 \cdot 6H_2O$ (0.004 mmol) were prepared as follows. In a vial, 20.0 mg of BBPA were diluted in 10.0 mL of nano pure water. Separately, 11.19 mg of $Mg(NO_3)_2 \cdot 6H_2O$ were dissolved with 10.0 mL of nano pure water to produce the metal salt solution. The BBPA solution was divided into two vials, each containing 5.0 mL. Then, 5.0 mL of the prepared metal solution was added to the BBPA solution in each vial. The mixture was left in a heating block for 5 d at 60° C. After crystals were visually detected, the vials were removed from the heating source and left undisturbed. The crystals were collected after these reached room temperature by vacuum filtration and air-dried.

d) Characterization of BBPA-Based Metal Complexes

Scanning electron microscopy-energy dispersive spectroscopy (SEM-EDS). Micrographs and X-ray elemental microanalysis of BBPA-based complexes were collected employing a JEOL JSM-6480LV scanning electron microscope. The instrument was supplied with an Everhart Thomley secondary electron imagining (SEI) detector. The elemental analysis was recorded applying an energy dispersive X-ray analysis (EDAX) Genesis 2000 detector. Images of BBPA-Ca forms I and II, BBPA-Zn form I, and BBPA-Mg form I were recorded applying an acceleration voltage of 20 kV, and an electron beam with a spot size of 36- and 11-mm width in high vacuum mode.

Micro-powder X-ray diffraction (PXRD). A Rigaku Xta-LAB SuperNova X-ray diffractometer with micro-focus Cu-Kα radiation (λ=1.5417 Å) source was used for the analysis. The powder X-ray diffractograms were collected for BBPA-Ca form I, BBPA-Ca form II, BBPA-Zn form I, and BBPA-Mg form I. The X-ray diffractograms for BBPA-based complexes were obtained as was previously described for BBPA ligand. FIGS. 16-19 show overlays of BBPA and the resulting BBPA-based metal complexes (BBPA-Ca form I and II, BBPA-Zn form I, and BBPA-Mg form I).

Single-crystal X-ray diffraction (SCXRD). Single crystals of BBPA-Ca forms I and II, BBPA-Zn form I, and BBPA-Mg form I were observed under the polarized microscope (Nikon Eclipse Microscope LV100NPOL, with a Nikon DS-Fi2 camera) to assess their crystal quality. NIS Elements BR software version 4.30.01 was used to record optical micrographs of the BBPA-complexes. Appropriate single crystals for X-ray diffraction analysis were then mounted in MiTeGen micro-loops for structure determination at 100 K (Oxford Cryosystems Cryostream 800). Data collection was performed in a Rigaku XtalLAB SuperNova single microfocus Cu-Kα radiation (λ=1.5417 Å) source. The instrument was equipped with a HyPix3000 X-ray detector in transmission mode running at 50 kV and 1 mA (CrystAllis$^{PRO}$ software v1.171.39.45c). Crystal structures of BBPA-based complexes were solved using direct methods. The crystal structure refinements were accomplished employing Olex2 (v1.2) software in a full-matrix least-square on $F^2$ mode. Additionally, all non-hydrogen atoms were anisotropically refined. FIGS. 20, 22, 24, and 26 illustrate the crystalline structures (asymmetric units, unit cell packing along a, b, and c-axis) for the BBPA-based metal complexes. Furthermore, FIGS. 21, 23, 25, and 27 show the ORTEPS of the BBPA-based metal complexes. FIGS. 28-31 display the overlay of the simulated and experimental powder X-ray diffractograms at 100 K for all materials for which the structures were solved.

Raman Vibrational Spectroscopy. The Raman spectra was registered using a Thermo Scientific DXR Raman microscope. The vibrational modes for BBPA-Ca forms I and II, BBPA-Zn form I, and BBPA-Mg form I were determined as was previously described for BBPA ligand. FIGS. 12-15 illustrates the Raman spectra for BBPA-based complexes compared with BBPA.

Thermogravimetric analysis (TGA). TGA Q500 (TA Instruments Inc.) was used to record the thermal decomposition of BBPA-Ca form I, BBPA-Ca form II, BBPA-Zn form I, and BBPA-Mg form I was determined as was previously described for BBPA ligand. Samples sizes between 2-5 mg were utilized for analysis TGA in the case of each BBPA-based complex.

e) Dissolution Profiles

Calibration curve. A stock solution of 1 mg/mL of BBPA in PBS was prepared. Then, 2-fold serial dilutions were performed to obtain twelve solutions in concentrations of 0.5, 0.25, 0.13, 0.06, 0.03, 0.016, 0.008, 0.004, 0.002, 0.001, 0.0005, 0.0002 mg/mL. Absorbance was measured using UV-Vis spectroscopy (200-500 nm) and PBS was employed as blank. The lambda maximum ($\lambda_{(max)}$) identified was 231 nm.

Dissolution experiment. In a 250 mL beaker was transferred 100 mL of PBS, the solution was left in constant stirring 150 rpm at 37° C. An aliquot of 1 mL was taken prior to the addition of the BBPA-based metal complex to record the first point time (0 h). Subsequently, 15 mg of the BBPA-based metal complex was added to the PBS solution. Aliquots (1 mL) were taken out after each selected time point (0.25, 0.5, 1, 3, 5, 24, 48 and 72 h) and diluted with PBS in 5 mL volumetric flask. The absorbance was measured at 231 nm. The experiment was performed in duplicate for each BBPA-based metal complex.

f) Phase Inversion Temperature (PIT) and PIT-Nano-Emulsion Synthesis of Nano-Ca@BBPA The nano-emulsion synthesis of nano-Ca@BBPA form II was carried out in a Crystalline (Technobis, Crystallization Systems, Alkmaar, Netherlands). The homogenized emulsion (BBPA, heptane, Brij L4®) was transfer to 8 mL reaction vials. Subsequently, the reaction vials were left in the Crystalline reactors at 7° C. (1,250 rpm) for 30 min. Then, the reaction vials were transferred to a second Crystalline reactor at 30° C. (1,250 rpm), and left stirring for 30 min. Successively, the metal salt solution was added and left stirring for 5 h to allow the formation of nano-Ca@BBPA.

Dynamic light scattering (DLS) was employed to analyze the particle size distribution of the supernatant from the aqueous phase obtained from the PIT synthesis of nano-Ca@BBPA. The DLS measurements were recorded in a Malvern Panalytical Zetasizer NanoZS. The instrument is supplied with a He—Ne orange laser (633 nm, max 4 mW) (Spectris PLC, Surrey, England). The Malvern software version 7.12 was employed to analyze the data. The DLS samples were prepared applying a 1:20 dilution ratio, nano-Ca@BBPA:nanopure water, into disposable polystyrol/polystyrene cuvettes (Ref: 67.754 10×10×45 mm, Sarsted, Germany). A stock solution of BBPA (2.5 mg/mL) was used to determine the refractive index of BBPA, in a Mettler Toledo Refracto 30GS (Mettler Toledo, Columbus, Ohio). The refractive index of BBPA in water was determined to be 1.334.

g) Binding Assays

Calibration curve. The calibration curve prepared for the dissolution profile mentioned above was employed to determine the BBPA content in the binding assay experiment.

Hydroxyapatite (HA) treatment. Hydroxyapatite (HA) was used to investigate the affinity of BBPA and the BBPA-based metal complexes to the bone. To perform this experiment, 20 mg of HA were exposed to 5 mL of 0.5 mg/mL of BBPA and BBPA-based metal complexes for 0-12 days (experimental groups). As control groups were employed BBPA (5 mL, 0.03 and 0.5 mg/mL) and HA (20 mg in 5 mL of PBS). The experiment was carried out for 0-12 days, in stirring at 120 rpm. After the selected time points (1, 2, 3, 4, 7, 8, 9, 10, 11, 12 days), the supernatant was collected to determine the percentage of BBPA bound to HA. The supernatant was centrifuged for 8 min (500 rcf) and the absorbance was measured at 231 nm. Solid samples were characterized by SEM-EDS, TGA, and PXRD.

h) Cytotoxicity Assays

Cell Culture Methods. Media with DMEM, 5% FBS, and 1% Pen-Strep were used to incubate MDA-MB-231 cells at 37° C. with 5% $CO_2$. The osteoblast hFOB 1.19 cell line was incubated at 34° C., 5% $CO_2$, in 1:1 DMEM:F-12 supplemented with 0.3 mg/mL G418, and 10% FBS. Cell passages were performed weekly at 80.0% confluency. Media exchanges were carried out twice every 7 d.

Cell treatment. Both cell lines were treated with BBPA and nano-Ca@BBPA. First, Two-fold serial dilutions (0-200 µM) of BBPA were prepared for the treatment. Cells (MDA-MB-231, hFOB 1.19) were seeded in 96 well plates at a density of 2.5×10$^5$ cells/mL. The 96 well plates were incubated at 37° C. with 5% $CO_2$ for 24 h. Three 96 well plates were prepared per time point (24, 48, and 72 h). After 24 h of seeding, cells were treated with 100 µL of BBPA solutions. Cells were incubated at 37° C. and 5% $CO_2$ for 24, 48, and 72 h. Control groups were treated with media (MDA-MB-231 with DMEM, 1% Pen-Strep) and (hFOB 1.19 with 1:1 DMEM:F-12, 0.3 mg/mL G418). Cell proliferation was determined after each point time of treatment. A 10% AlamarBlue® solution was previously prepared using PBS. The media was removed from all 96 well plates and 100 µL of AlamarBlue® solution was added. The 96 well plates were incubated for 4 h (MDA-MB-231 at 37° C., 5% $CO_2$) and (hFOB 1.19 at 34° C., 5% $CO_2$). The fluorescence was measured at 560 nm of excitation and lambda max 590 nm of emission. The percentage of live cells was achieved taking into consideration the viability of the control group (100%) associated with the cells treated with BBPA solutions. Finally, the dose-response curves (% cell live vs concentration) were utilized to determine the half-maximal effective concentration ($IC_{50}$) values for both cells treated with BBPA. Additionally, the relative cell live (% RCL) for both cell lines employing nano-Ca@BBPA was achieved by treating the cells with concentrations of 1.9, 3.8, 7.5, and 15 μM of the nanocrystals, BBPA solutions with the same concentration were used as control groups. The experiments for the % RCL were performed employing the same conditions previously mentioned for the $IC_{50}$ determination. All experiments were accomplished in triplicate. The GraphPad Prism 8 vs 8.3.1 was utilized to generate the $IC_{50}$ curves and to plot the % RCL graphs.

Results and Discussion

Figure 1:
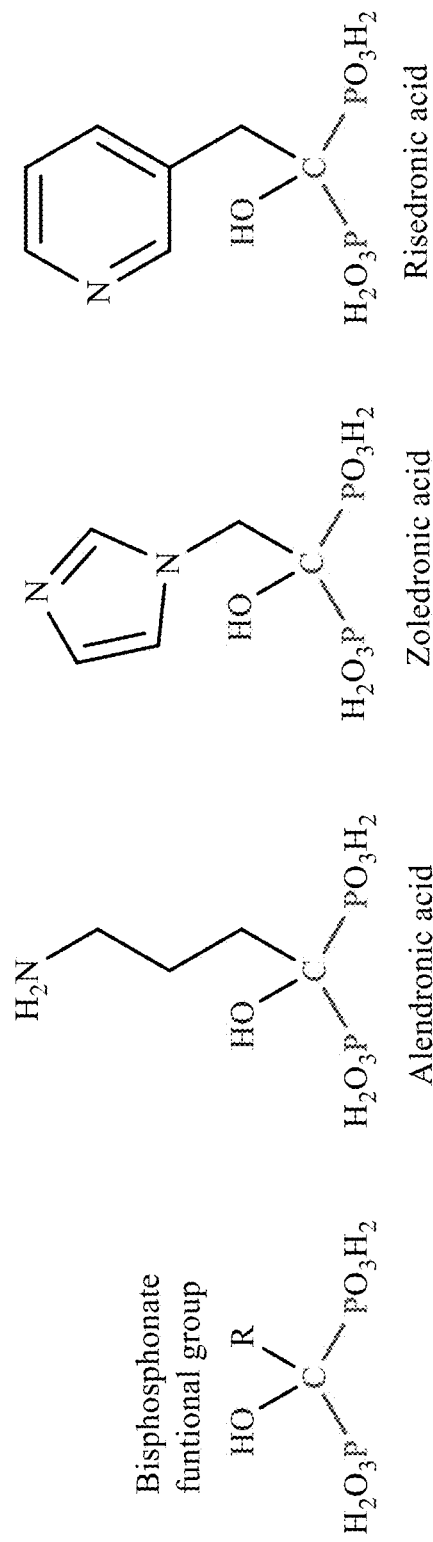
FIG. 1 shows molecular structures of the bisphosphonate functional groups and common bisphosphonates used to treat osteolytic metastases. P—C—P backbone in BPs (red) with a geminal hydroxyl group (blue). Being the R groups aliphatic or aromatic N-containing chains.
Figure 2:
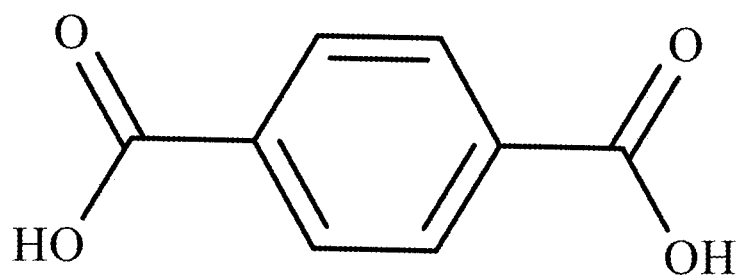
FIG. 2 shows molecular structure of benzene 1,4-dicarboxylic acid (BDC).
Figure 3:
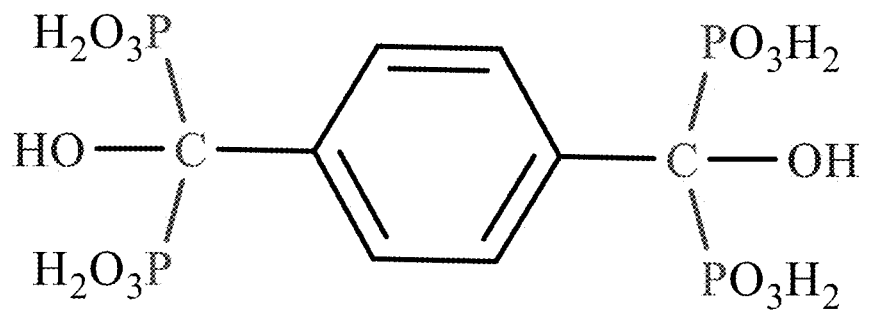
FIG. 3 shows molecular structure of bisphosphonate analog benzene 1,4-bis(bisphosphonic acid), (BBPA).
Figure 4:
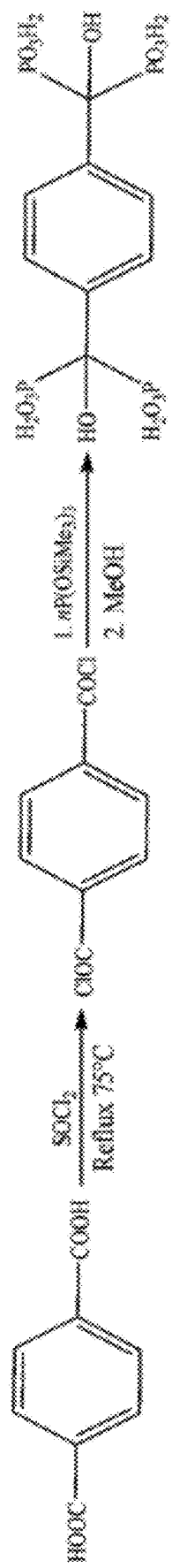
FIG. 4 shows the synthesis of BBPA employing the Lecouvey reaction. The starting material used was BDC.

To produce the BBPA a two-step synthesis was performed. The first step involved the halogenation of benzene 1,4-dicarboxylic acid (BDC), by refluxing using $SOCl_2$ at 75° C. A Lecouvey reaction was performed to the acyl chloride from the first step, yielding an ester intermediate. This intermediate was hydrolyzed with methanol to produce the BBPA as a white solid (FIG. 4). The procedure previously described has been employed to produced BBPA.

BBPA was characterized by Raman spectroscopy, NMR, DSC, TGA, and PXRD (FIGS. 5-11). The following results established the molecular structure and purity of the synthesized BBPA: $^{1}$HNMR (700 MHz, $D_2O$): δ (ppm)=7.63 (s, aromatic hydrogens); $^{13}$CNMR (700 MHz, $D_2O$): δ (ppm)=135.65 (s, 2C, quaternary carbons), 125.68 (s, 4C, ternary carbons), and 75.95 (t, 2C, bisphosphonate); $^{31}$PNMR (700 MHz, $D_2O$): δ (ppm)=15.9 (s, phosphorous). Similar chemical shifts for BBPA ($^{1}$HNMR, $^{13}$CNMR, and $^{31}$PNMR) have been earlier informed. Principal Raman shifts observed were: ($\upsilon_{max}$, $cm^{-1}$): 3089 (CH aromatic), 1610 (C=C, stretching), 1163 (ν P=O/$\delta^\pi$ POH, stretching), 1075 ($\nu^{as}$ P—O(H), stretching), and 980 (δ PO—H, bending). The presence of the previously mentioned bands are evidence of an aromatic ring and phosphonates groups in the BBPA ligand.

Synthesis and Solid-State Characterization of BBPA-Based Metal Complexes.

Figure 32:
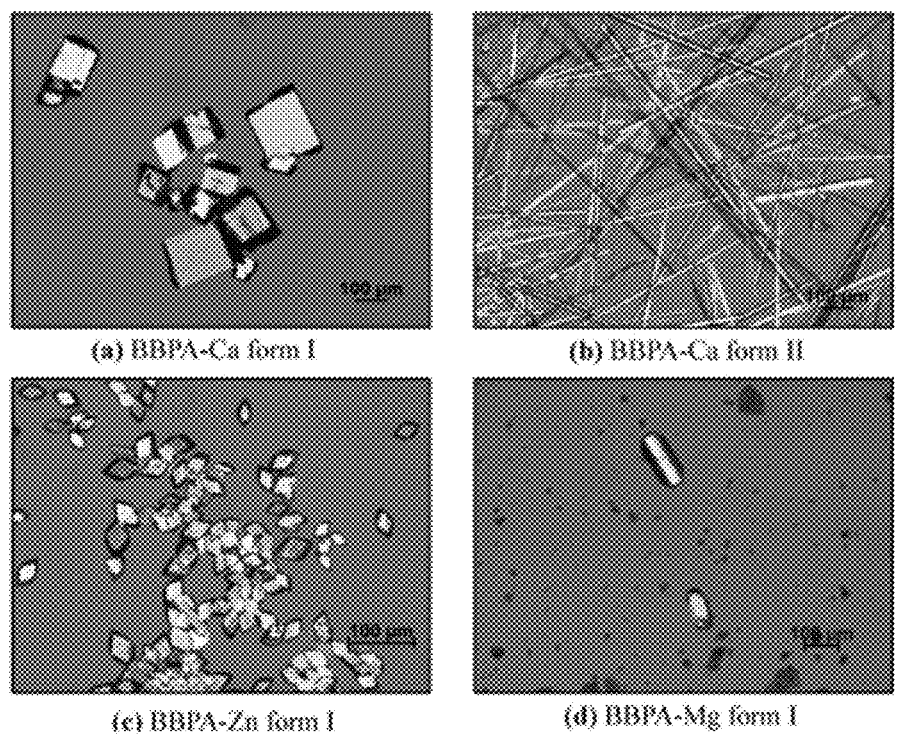
FIG. 32 shows polarized optical micrographs of the BBPA-based complexes. (a) BBPA-Ca form I (cubes), (b) BBPA-Ca form II (needle), (c) BBPA-Zn form I (prism), and (d) BBPA-Mg form I.

The synthesis of BBPA-based metal complexes was accomplished using the hydrothermal method, in the presence of the appropriate metal salts in nano pure water. A detailed description of the hydrothermal synthesis is described here. These conditions lead to four metal complexes namely, BBPA-Ca form I and II, BBPA-Zn form I, and BBPA-Mg form I. FIG. 32 illustrates the polarized optical micrographs of the resulting crystals for each BBPA-based metal complex produced. The structure, stability, dissolution, affinity, and cytotoxicity of these three materials were assessed to determine their potential as drug delivery carriers to treat bone-related diseases.

Scanning Electron Microscopy-Energy Dispersive X-Ray Spectroscopy (SEM-EDS) of BBPA-Based Metal Complexes.

Micrographs and X-ray elemental microanalysis of BBPA-based metal complexes were collected employing a JEOL JSM-6480LV scanning electron microscope. The instrument was supplied with an Everhart Thornley secondary electron imaging (SEI) and an energy dispersive X-ray analysis (EDAX) Genesis 2000 detectors. Images of BBPA-Ca forms I and II, BBPA-Zn form I, and BBPA-Mg form I were recorded applying an acceleration voltage of 20 kV, an electron beam of 11 mm width (spot size, 36). High vacuum mode and an SEI signal were utilized. FIGS. 33-36 illustrate the elemental composition of the BBPA-based metal complexes.

Figure 33:
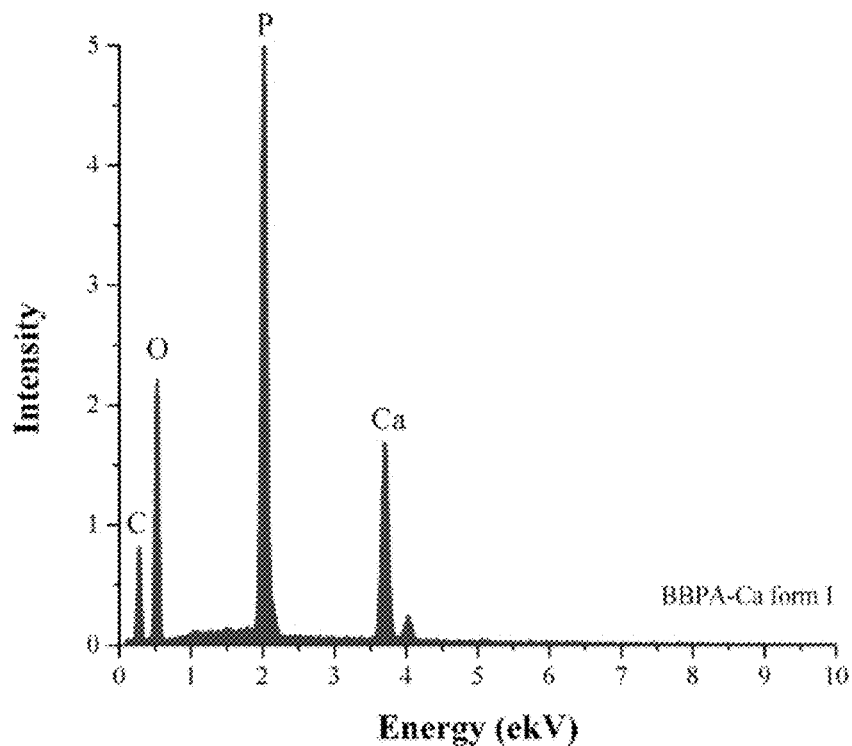
FIG. 33 shows an energy dispersive spectroscopy (EDS) analysis for BBPA-Ca form I. The EDS analysis shows the presence of carbon, oxygen, phosphorus, and calcium. These elements are part of the crystal lattice of BBPA-Ca form I.
Figure 34:
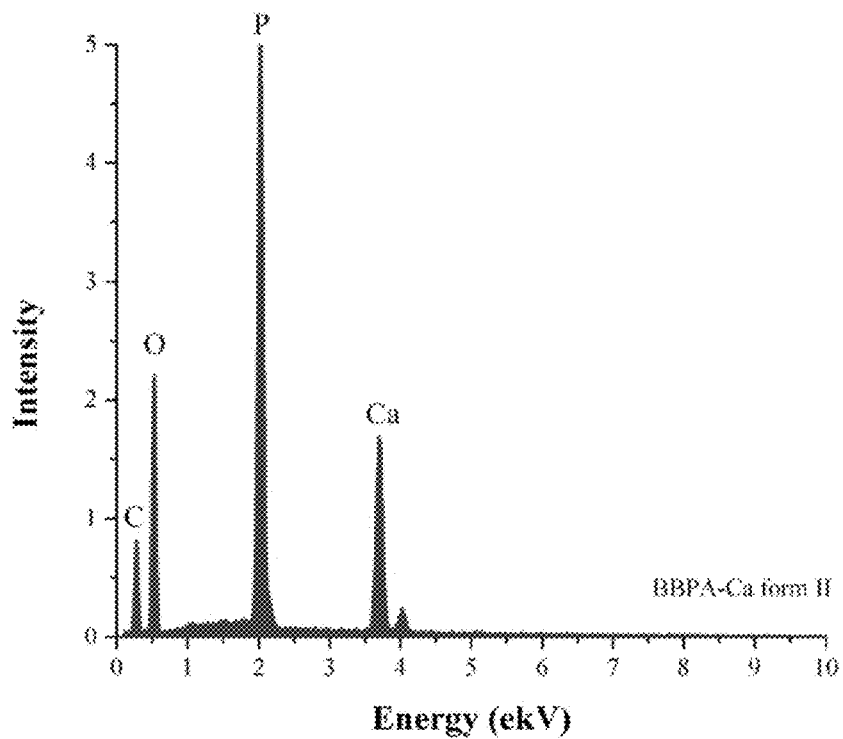
FIG. 34 shows and energy dispersive spectroscopy (EDS) analysis for BBPA-Ca form II. The EDS analysis shows the presence of carbon, oxygen, phosphorus, and calcium. These elements are part of the crystal lattice of BBPA-Ca form II.
Figure 35:
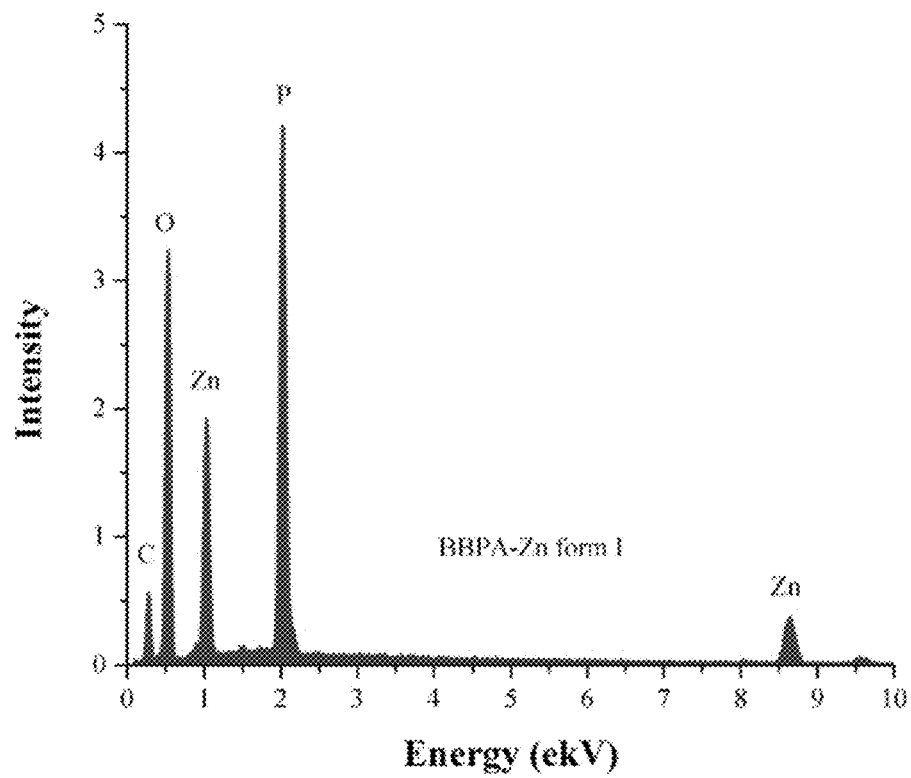
FIG. 35 shows an energy dispersive spectroscopy (EDS) analysis for BBPA-Zn form I. The EDS analysis shows the presence of carbon, oxygen, phosphorus, and zinc. These elements are part of the crystal lattice of BBPA-Zn form I.
Figure 36:
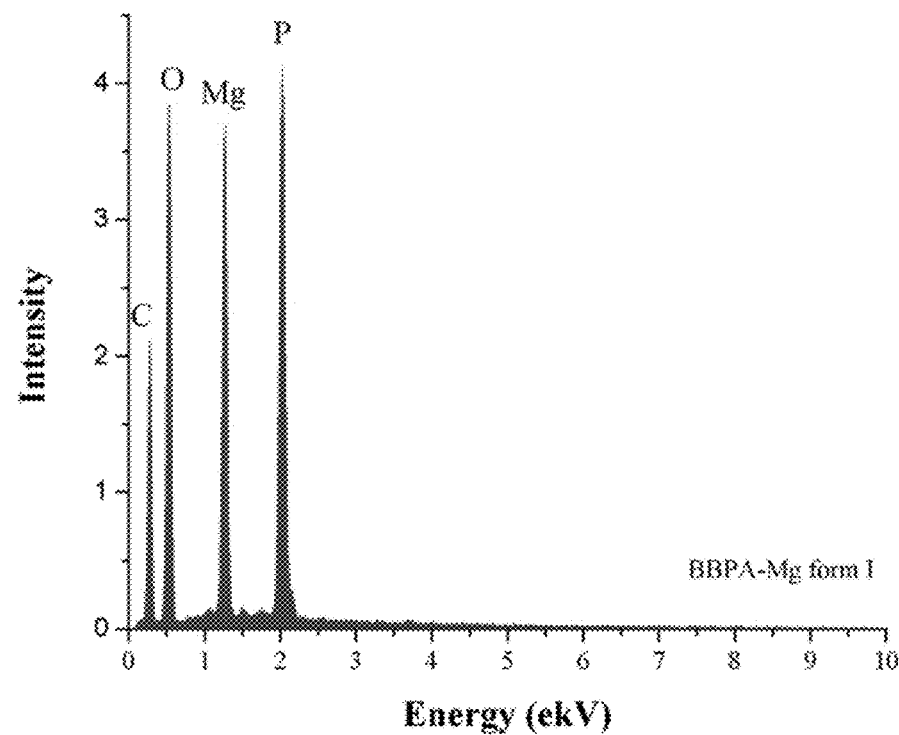
FIG. 36 shows an energy dispersive spectroscopy (EDS) analysis for BBPA-Mg form I. The EDS analysis shows the presence of carbon, oxygen, phosphorus, and magnesium. These elements are part of the crystal lattice of BBPA-Mg form I.
Figure 37:
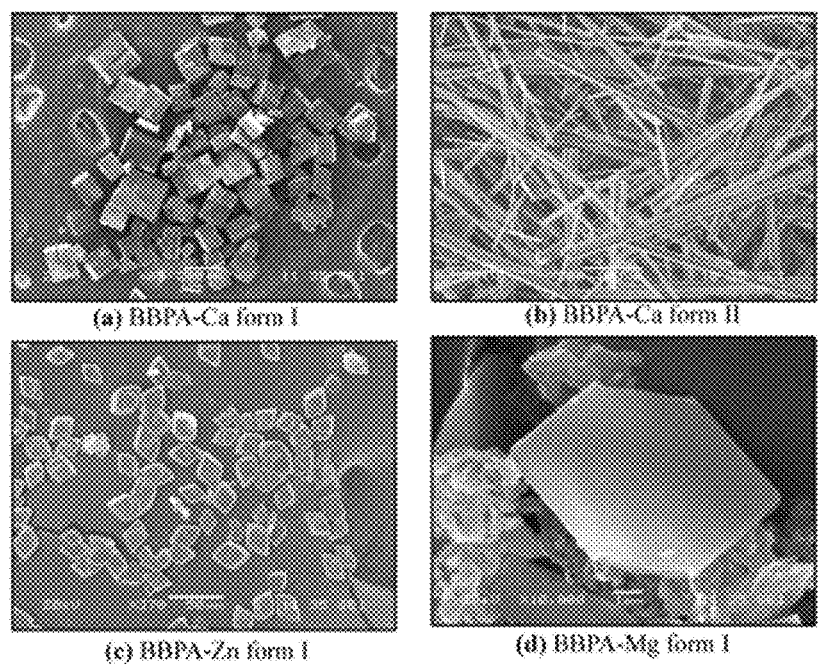
FIG. 37 shows SEM micrographs for (a) BBPA-Ca form I, (b) BBPA-Ca form II, (c) BBPA-Zn form I, and (d) BBPA-Mg form I. Samples were cover with 5 nm thick layer of Au.

SEM-EDS analysis was employed to corroborate the morphologies previously observed and to obtain the elemental composition of the BBPA-based metal complexes. Well-defined morphologies observed employing the polarized optical microscope were confirmed by the SEM micrographs (FIG. 37). In terms of the elemental analysis, the composition of these metal complexes was assessed employing the EDS analysis. The EDS spectra for BBPA-Ca forms I and II exhibit the characteristic signals corresponding to the metal ($Ca^{2+}$) and the BBPA ligand used for the synthesis of these materials (FIGS. 33 and 34). Additionally, the EDS spectra of BBPA-Zn form I and BBPA-Mg form I also display signals representative of the metal ions ($Zn^{2+}$ and $Mg^{2+}$) and other elements presented in the ligand structure (FIGS. 35 and 36). SEM-EDS analysis supports the formation of the BBPA-based metal complexes obtained through the hydrothermal synthesis.

Raman Vibrational Spectroscopy of BBPA-Based Metal Complexes

Raman spectroscopy was applied to determine and confirm the presence of the principal functional groups of the BBPA-based metal complexes. The characteristic Raman spectra for each material and BBPA was collected from 3400 to 100 $cm^{-1}$ and are shown in FIGS. 12-15. There are significant differences between the Raman spectra of the BBPA and the metal complexes in 1200 to 800 $cm^{-1}$ regions. This region is characteristic of the bisphosphonate functional groups. The differences arise because of the coordination bond between the BBPA and the bioactive metals ($Ca^{2+}$, $Zn^{2+}$, and $Mg^{2+}$) employed in the synthesis of these crystalline compounds. The main Raman shifts for the BBPA-based metal complexes are listed; BBPA-Ca form I: 1179 (ν P=O/$\delta^\pi$ POH, stretching), 1105 ($\nu^{as}$ P—O(H), stretching), and 931 (δ PO—H, bending), BBPA-Ca form II: 1190 (ν P=O/$\delta^\pi$ POH, stretching), 1100 ($\nu^{as}$ P—O(H), stretching), and 942 (δ PO—H, bending), BBPA-Zn form I; 1221 (ν P=O/$\delta^\pi$ POH, stretching), 1196 ($\nu^{as}$ P—O(H), stretching), and 966 (δ PO—H, bending), and BBPA-Mg form: 1230 (ν P=O/$\delta^\pi$ POH, stretching), 1195 ($\nu^{as}$ P—O(H), stretching), and 950 (δ PO—H, bending). Based on the Raman spectra presented above for the BBPA (ligand) and the BBPA-based metal complexes just discussed, it was verified the coordination bond established between the metal and the ligand.

Powder X-Ray Diffraction (PXRD) Analysis of BBPA-Based Metal Complexes.

The PXRD was employed to define and distinguish the crystalline phases of BBPA and each BBPA-based metal complexes. The X-ray diffractograms of the BBPA-based metal complexes are shown in FIGS. 16-19. Results demonstrated that the PXRD of the metal complexes displayed different reflections compared with the ligand, and among each other. This is an indication of the different crystal phases achieved individually for each BBPA-based metal complexes synthesized under specific conditions. Also, the defined reflections observed in these diffractograms indicated the crystallinity of these materials.

TABLE 1a

Powder X-ray Diffraction (PXRD) prominent 2θ peaks of coordination complexes

| Coordination Complex | Prominent 2θ peaks (°) | | | | | |
|---|---|---|---|---|---|---|
| | Peak 1 | Peak 2 | Peak 3 | Peak 4 | Peak 5 | Peak 6 |
| BBPA-Ca form I | 8.42 | 12.04 | 14.79 | 16.87 | 18.68 | 27.70 |
| BBPA-Ca form II | 10.05 | 10.98 | 14.45 | 15.18 | 23.04 | 29.36 |
| BBPA-Zn form I | 9.25 | 14.73 | 14.77 | 21.63 | 26.42 | 32.75 |
| BBPA-Mg form I | 8.36 | 10.69 | 11.96 | 12.89 | 16.84 | 25.27 |

Single Crystal X-Ray Diffraction (SCXRD) Analysis of BBPA-Based Metal Complexes.

Figure 38:
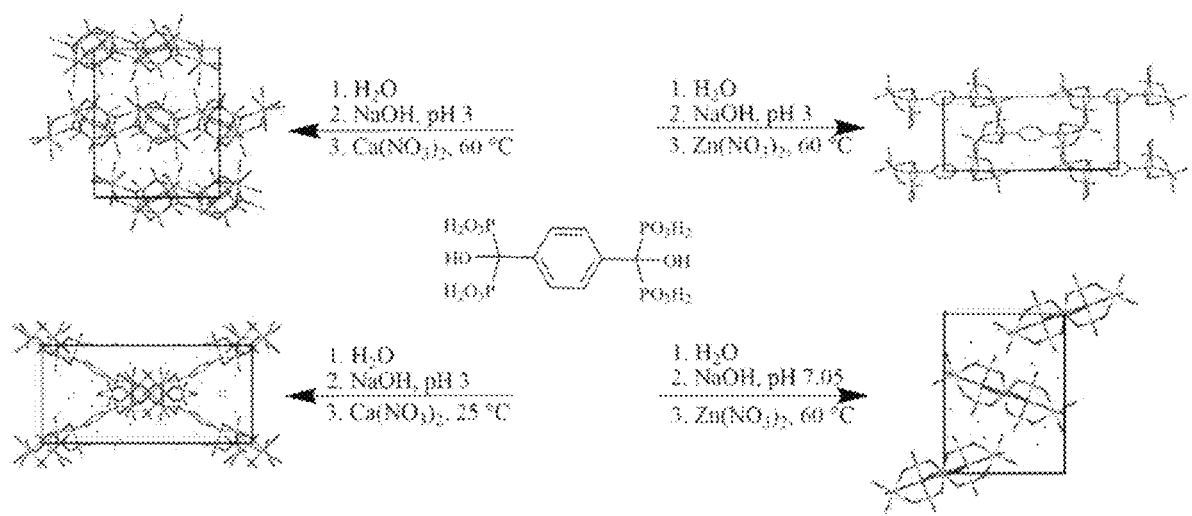
FIG. 38 shows crystal packing and synthesis conditions for BBPA-Ca form I, BBPA-Ca form II, BBPA-Zn form I, and BBPA-Mg form I. Crystal packing of BBPA-based metal complexes were analyzed using Mercury 4.1.0 software.
Figure 39:
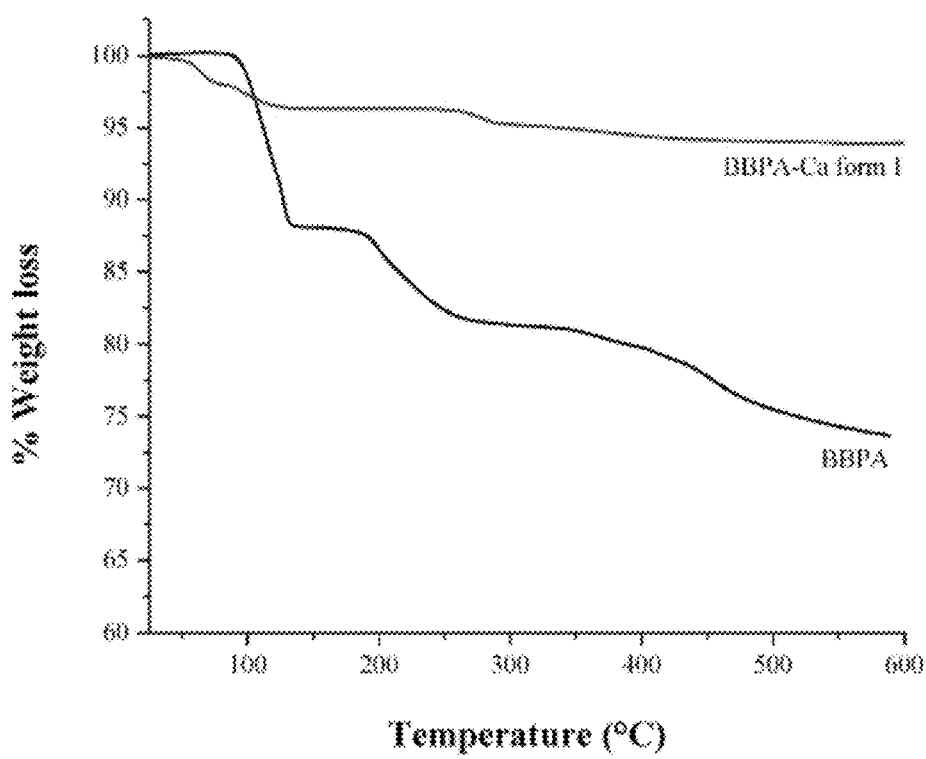
FIG. 39 shows a comparison of TGA thermograph of BBPA-Ca form I (red) and BBPA (black). The thermographs were recorded from 30° C. to 700° C. The TGA thermograph of BBPA-Ca form I present a low temperature (25-150° C.) weight loss of 4 wt. % (calculated, 8.44 wt %), due to the loss of water molecules.
Figure 40:
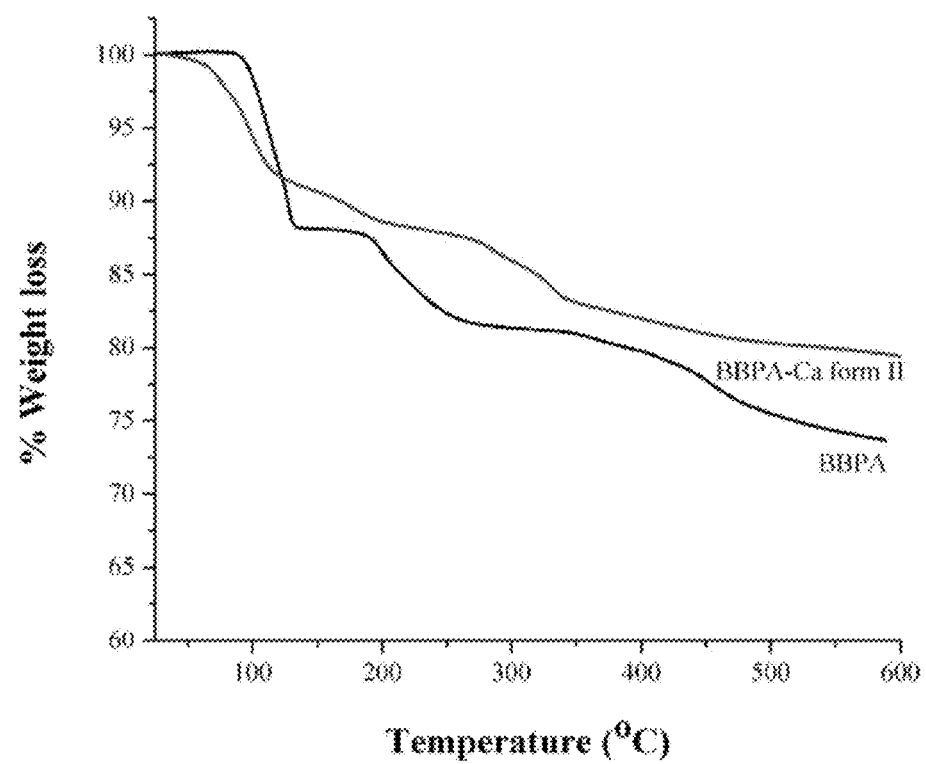
FIG. 40 shows a comparison of TGA thermograph of BBPA-Ca form II (red) and BBPA (black). The thermographs were recorded from 30° C. to 700° C. The TGA thermograph of BBPA-Ca form II presents a low temperature (25-150° C.) weight loss of 18.71 wt. % (calculated, 18.76 wt %) due to the loss of water molecules.
Figure 41:
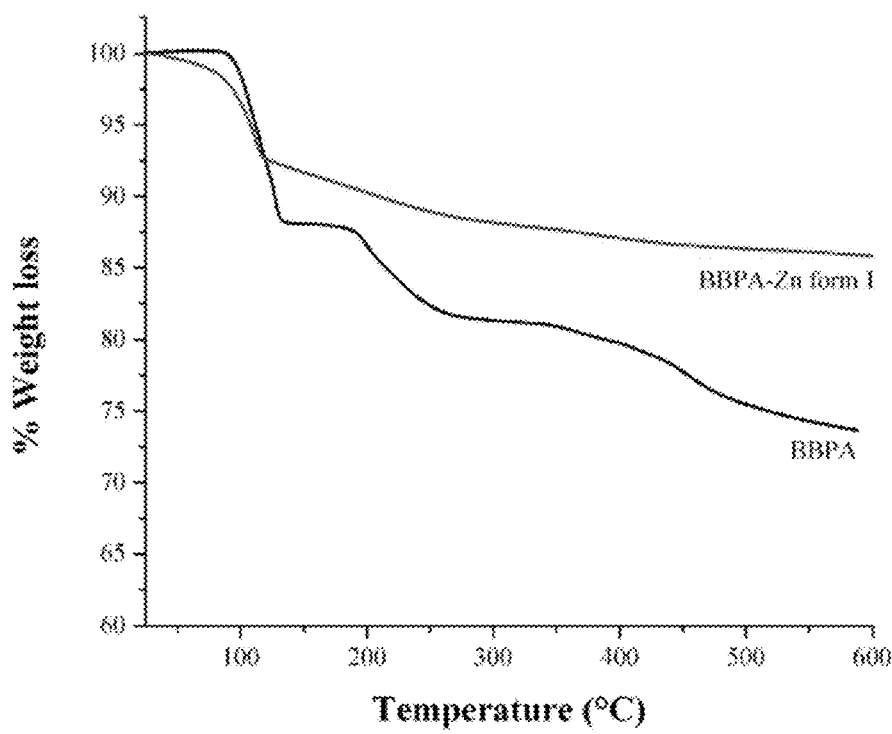
FIG. 41 shows a comparison of TGA thermograph of BBPA-Zn form I (red) and BBPA (black). The thermographs were recorded from 30° C. to 700° C. The TGA thermograph of BBPA-Zn form I presents a low temperature (25-150° C.) weight loss of 9.75 wt. % (calculated, 10.46 wt %), due to the loss of water molecules.
Figure 42:
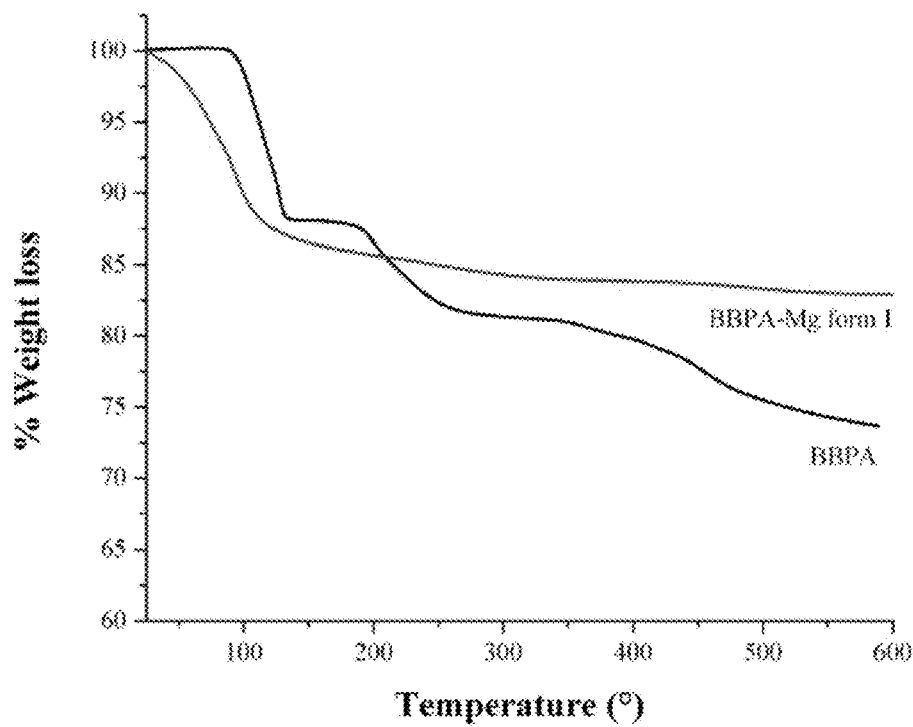
FIG. 42 shows a comparison of TGA thermograph of BBPA-Mg form I (red) and BBPA (black). The thermographs were recorded from 30° C. to 700° C. The TGA thermograph of BBPA-Mg form I present a low temperature (25-150° C.) weight loss of 13.92 wt. % (calculated, 17.77 wt %), due to the loss of water molecules.

The SCXRD was used to elucidate the crystal structures of the BBPA-based metal complexes. The experiments were carried out at low temperature (100 K). The crystal structures of the BBPA-based metal complexes were solved employing direct methods. The crystallographic structure parameters for the refined crystalline phases of BBPA-Ca form I ($P2_1/c$), BBPA-Ca form II (I 2/a), BBPA-Zn form I ($P2_1/n$), and BBPA-Mg form I ($P2_1/c$) are listed in Table 1b below. The crystal packings of these complexes are also shown in FIG. 38. Experimental and simulated powder X-ray diffraction overlays for all materials indicate that representative solutions were found for these crystalline phases. Close examination of the crystal structure of BBPA-Ca form II presents channels (8×12 Å), potentiating this framework to be used as a possible drug delivery system capable of loading drugs such as 5-fluorouracil, cyclophosphamide, or letrozole into these channels.

TABLE 1b

Crystal structure parameters of the BBPA-based metal complexes: BBPA-Ca form I, BBPA-Ca form II, BBPA-Zn form I, and BBPA-Mg form I.

| Compound | BBPA-Ca form I | BBPA-Ca form II | BBPA-Zn form I | BBPA-Mg form I |
|---|---|---|---|---|
| Empirical formula | $Ca_2C_8H_{14}O_{17}P_4$, $3(H_2O)$ | $2(CaC_4H_9O_9P_2)$, $9(H_2O)$ | $ZnC_4H_5O_8P_2$, $2(H_2O)$ | $Mg_3C_8H_{22}O_{11}P_4$, $8(H_2O)$ |
| FW (g/mol) | 640.28 | 768.41 | 344.44 | 811.19 |
| Space group | $P2_1/c$ | I2/a | $P2_1/n$ | $P2_1/c$ |
| Crystal system | Monoclinic | Monoclinic | Monoclinic | Monoclinic |
| Temperature (K) | 100 | 100 | 100 | 100 |
| a (Å) | 11.65839 (14) | 13.1217 (3) | 6.8687 (1) | 10.60620 (10) |
| b (Å) | 12.35838 (4) | 10.0502 (2) | 19.1708 (3) | 10.39300 (10) |
| c (Å) | 21.9782 (2) | 21.74.61 (3) | 8.3853 (2) | 13.9383 (2) |
| α (°) | 90 | 90 | 90 | 90 |
| β (°) | 138.112 (2) | 95.844 (2) | 105.689 (2) | 97.8330 (10) |
| γ (°) | 90 | 90 | 90 | 90 |
| V (Å³) | 2114.26 | 2852.88 (10) | 1062.98 (4) | 1522.09 |
| Z | 4 | 4 | 4 | 4 |
| $\rho_{calc}$ (g/cm³) | 2.011 | 1.789 | 2.152 | 1.769 |
| $R_1$ (%) | 2.59 | 4.10 | 4.06 | 3.81 |
| $wR_2$ (%) | 7.49 | 11.25 | 11.69 | 10.76 |

Structural description of BBPA-Ca form I: The empirical formula for the crystalline phase of BBPA-Ca form I is $Ca_2C_8H_{14}O_{17}P_4 \cdot 3(H_2O)$, and it crystallizes in the $P2_1/c$ space group. The coordination bond established between the BBPA and the metal ion ($Ca^{2+}$) is through the oxygen atoms present in the phosphonate groups. The BBPA molecules participate in both metal centers (Ca1 and Ca2) by their coordination through the phosphate groups in bidentate modes, forming a six-member chelate ring. The asymmetric unit contains two distinct $Ca^{2+}$ coordination centers, in which two distinct half molecules of the ligand participate in the coordination sphere through Ca—O bonds. One $Ca^{2+}$ ion presented a distorted trigonal prismatic geometry, with O-Ca1-O bond angle range between 73.78-87.37°, while the other metal center presented a distorted capped trigonal prismatic geometry, with O-Ca2-O bond angles range between 72.60-91.54°, this last being uncommon 7-fold coordination for $Ca^{2+}$ ions. Additionally, the asymmetric unit contains three uncoordinated water molecules and three coordinated water molecules with Ca—O bond lengths ranging between 2.321-2.435 Å. The two calcium atoms are bridge by one phosphonate group (Ca1-O8, 2.402 Å, and Ca2-O9, 2.382 Å).

Moreover, the BBPA coordinated with $Ca^{2+}$ ions generates an inorganic chain that is propagated along with the a and b-axis through the Ca1-O8 (2.402 Å) and Ca2-O1 (2.449 Å) bonds resulting in 2D sheets. The confirmation of the ligand is reinforced by intramolecular hydrogen bond interactions along the a-axis (O8 . . . O21, 2.440 Å; O8 . . . O14, 3.024 Å, and O11 . . . O13, 2.543 Å) and the b-axis (O8 . . . O9, 2.582 Å; O11 . . . O12, 2.556 Å). Furthermore, uncoordinated water molecules facilitate the propagation along the c-axis by extensive intermolecular hydrogen bond interactions (O3 . . . H19B-O19 . . . H16B-O16, O2-H2 . . . O20 . . . H15-O15, and O16 . . . H18B-O18 . . . O21). Propagation along with the c-axis is also reinforced by additional intermolecular hydrogen bonds (O13-H13 . . . O4, 2.723 Å; O11 . . . H6-O6, 2.578 Å; O15-H15B . . . O14, 2.783 Å, and O16-H16B . . . O7, 2.890).

Structural description of BBPA-Ca form II. This metal complex presents the empirical formula of $2(CaC_4H_9O_9P_2) \cdot 9(H_2O)$, crystallized in the monoclinic I2/a space group. The asymmetric unit of BBPA-Ca form II is established for one distinct calcium ion (Ca1), one-half molecule of the BBPA ligand, and four water molecules. The $Ca^{2+}$ ion is coordinated with BBPA in a monodentate mode through one oxygen atom from the bisphosphonate group (Ca1-O3, 2.283 Å). Two different water molecules coordinated with Ca1 are distinguished in the asymmetric unit (Ca1-O8, 2.366 Å and Ca1-O9, 2.489 Å). The metal center (Ca1) show a distorted pentagonal bipyramid geometry (O1-Ca1-O8, 99.13°; O2-Ca1-O8, 87.75°; O8-Ca1-O9, 77.86°, O8-Ca1-O3, 114.04°). The unit cell of this compound contains four BBPA ligands, presenting a rotation axis $C_2$ along with the a, b, and c-axis. Intramolecular interactions allow the propagation of this cluster forming a 3D framework, the structure is reinforced along with the a-axis (O2 . . . O3, 2.544 Å; O2 . . . O4, 2.508 Å; O6 . . . O7, 2.568 Å, O8-O9, 2.793 Å), b-axis (O1 . . . O5, 3.018 Å; O3 . . . O4, 2.512 Å), and c-axis (O5 . . . O7, 2.529 Å; O6 . . . O9, 2.823 Å). Furthermore, along with the a-axis are observed channels (8×12 Å) containing water molecules.

Structural description of BBPA-Zn forms I: The compound $ZnC_4H_5O_8P_2.2(H_2O)$ crystallizes in a monoclinic crystal system, presenting a $P2_1/n$ space group. The metal ions ($Zn^{2+}$) coordinate with the ligand through the bisphosphonate groups. The $Zn^{2+}$ ions presented a distorted octahedral geometry, which the BBPA ligand coordinates in both axial and equatorial positions. The asymmetric unit of this material is conformed by one distinct metal ion, one-half molecule of the ligand, and two water molecules. The BBPA ligand is coordinated with the zinc metal center in a tridentate mode (Zn1-O1, 2.318 Å (equatorial); Zn1-O2, 2.087 Å (axial); and Zn1-O7, 2.121 Å (equatorial)) forming a double five-member chelate ring, the Zn1-O bond distances range between 2.018-2.318 Å. The unit cell of BBPA-Zn form I is conformed by six BBPA ligands, presenting rotation axis $C_2$, inversion center, and mirror planes along with the a, b, and c-axis. A Cluster containing one ligand and four metal ions is identified in the unit cell, the propagation of this cluster along with the a, and c-axis through intramolecular interaction generating a 2D framework.

Structural description of BBPA-Mg form I: The compound $Mg_3C_8H_{22}O_{11}P_4.8(H_2O)$ crystallized in the $P2_1/c$ space group. The asymmetric unit is constituted by a one-half molecule of the BBPA ligand, two distinct $Mg^{2+}$ metal centers, four coordinates, and four uncoordinated water molecules.

Both metal centers are in a distorted octahedral geometry, with Mg—O distances range between 2.026-2.222 Å (Mg1-O) and 2.054-2.122 Å (Mg2-O). The BBPA participate with both metal center by its coordination through the bisphosphonate functional groups forming a six-member ring (bidentate mode). One $Mg^{2+}$ metal center presents O-Mg1-O bond angle distances between 79.48-101.16 Å, while the other presented O-Mg2-O bond angle distances ranges between 86.92-93.08 Å. Additionally, intramolecular (O7-O11, 2.906 Å) and intermolecular (H14B-O14 . . . O15, 2.669 Å; O15-H15A . . . O2, 2.704 Å; H13A-O13 . . . O1, 2.665 Å; O8-H8B-O12, 2.946 Å, and O13-H13B . . . O12, 2.841 Å) hydrogen bonds, identified in the asymmetric unit, reinforce the packing conformation of BBPA-Mg form I.

Thermogravimetric Analysis (TGA) of BBPA-Based Metal Complexes

TGA analysis was performed to investigate the thermal stability of the BBPA-based metal complexes. The thermal decomposition of BBPA-based metal complexes was determined using a TGA Q500 (TA Instruments Inc.) as previously described for BBPA. FIGS. 39-42 depict the overlay of TGA thermograms for the BBPA-based metal complexes compared with that obtained for BBPA.

For BBPA, a decomposition event was observed at a lower temperature (100° C.) due to the loss of water molecules. A second degradation step was detected (200° C.), which was involved in the decomposition of BBPA. The third event (450° C.) can be attributed to the degradation of the remaining organic fractions in this compound. Differentiation between the BBPA-based metal complexes and BBPA was assessed. For the BBPA-Ca form I, three degradation steps were recorded (70, 100, and 250° C.) corresponding to the loss of two different water molecules (uncoordinated and coordinated) in the crystal lattice followed by the decomposition of the ligand. Moreover, the BBPA-Ca form II presented the first step at about 100° C. as a consequence of the loss of the coordinated water molecules. Subsequently, the loss of water molecules entrapped in the channels of the crystal occurred, which required a higher temperature to evaporate (100-200° C.). The decomposition of the organic ligand started at about 250° C. In the BBPA-Zn form I presented the evaporation of water molecules about 100° C. as the first event. Then, the entrapped water in the channels of the crystal lattice was evaporated between 100-200° C. The negative slope observed after 250° C. corresponds to the decomposition of the BBPA. Finally, the BBPA-Mg form I showed the loss of water molecules (100° C.), the evaporation of the entrapped water in the channels of the crystal lattice (100-200° C.), and the decomposition of the BBPA (250° C., negative slope) as the first, second, and third decomposition even, correspondingly. The thermal analysis for the BBPA-based metal complexes identifies different thermal events corresponding to the loss of water molecules (uncoordinated, coordinated, and entrapped within channels). The decomposition of the ligand occurred at a higher temperature (250° C.) when it was coordinated compared to when it was not (200° C.). The metals in all of this coordination complexes were oxidized above 350° C. (negative slope in the TGA curves).

Figure 43:
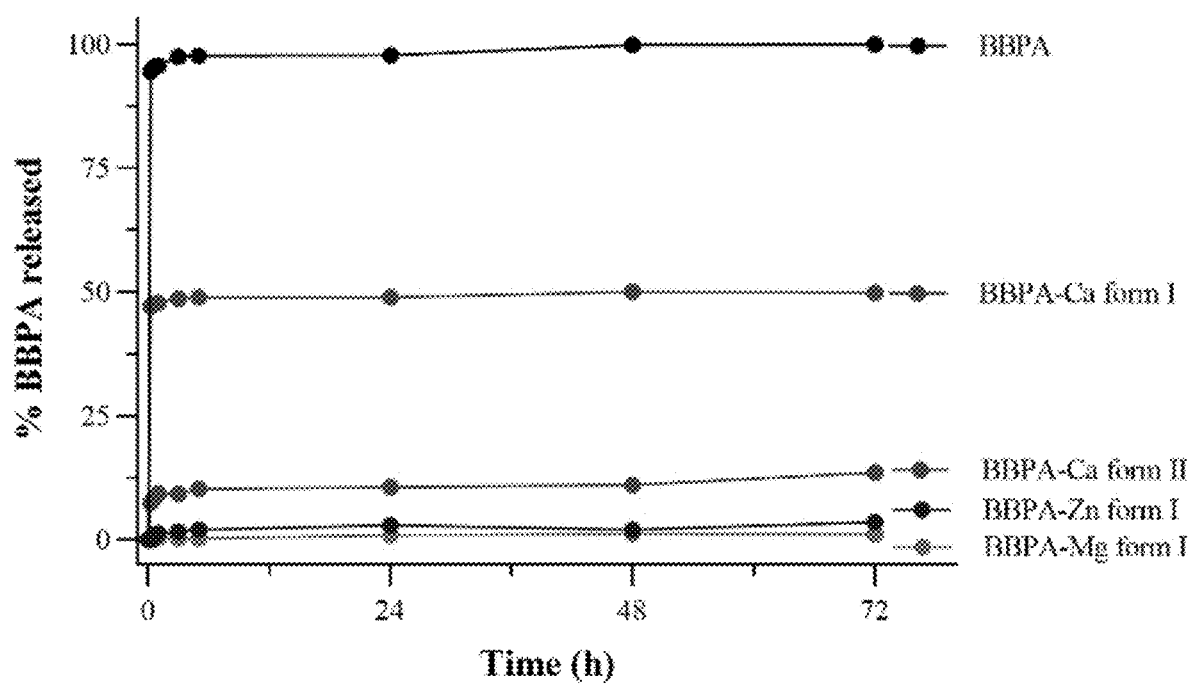
FIG. 43 shows a dissolution profile for BBPA (black), BBPA-Ca form I (red), BBPA-Ca form II (green), BBPA-Zn form I (dark blue), and BBPA-Mg form I (light blue) in phosphate-buffered saline (PBS) at 37° C. The experiment was performed in duplicate. Error bars are not observed due to the small coefficient of variation (% CV<5%).
Figure 44:
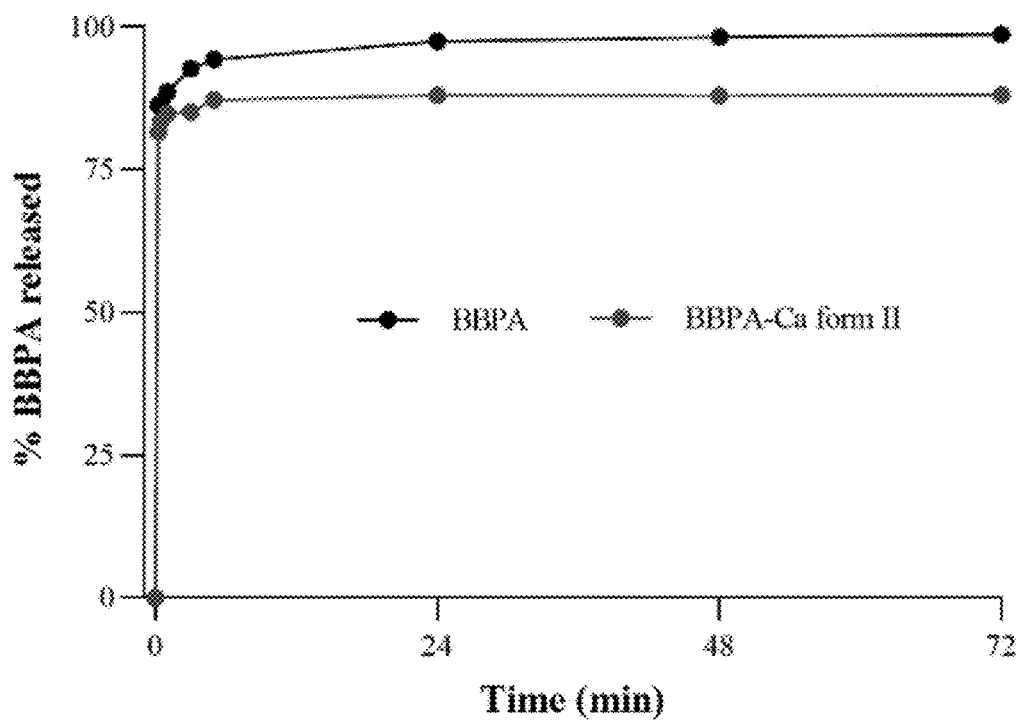
FIG. 44 shows a dissolution profile for BBPA (black) and BBPA-Ca form II (red) in FaSSGF at 37° C. The experiment was performed in duplicate. The percentage of BBPA released after 72 h was 88%. Error bars are not observed due to the small coefficient of variation (% CV<5%).

Dissolution Profiles in Phosphate-Buffered Saline Medium (PBS) and Fasted-State Simulated Gastric Fluids (FaSSGF) of BBPA-Based Metal Complexes The dissolution profiles were conducted to assess the release of BBPA from the BBPA-based metal complexes under the physiological environment. The dissolution profiles were performed in phosphate-buffered saline (PBS, pH=7.40) and fasted-state simulated gastric fluids (FaSSGF, pH=1.60) using continuous stirring at 150 rpm, and 37° C. for 72 h (FIGS. 43 and 44). The dissolution profile of BBPA was also determined for comparison in both media. The absorbance of the supernatant was measured to determine the percentage of the BBPA released from the complexes overtime at 231 nm (PBS) and 226 nm (FaSSGF). These results demonstrated that the free ligand is released 100% after 5 h in both media, as a consequence of its high solubility in aqueous solutions. The BBPA-based metal complexes released <50% of BBPA after 72 h in PBS. The BBPA-Ca forms I and II, and BBPA-Zn form I could release about 13, 50, and 4% of BBPA from its crystalline structures in PBS, respectively. Furthermore, it was found that the BBPA-Ca form II released about 88% of BBPA in FaSSGF after 72 h, releasing 80% of BBPA from its framework in the first 5 h. These results suggest the possibility that this material might be able to degrade at the metastatic side due to the acidic environment and released probable loaded drugs.

Dissolution Profiles in Phosphate Buffered Saline (PBS) for BBPA-Based Metal Complexes.

Figure 45:
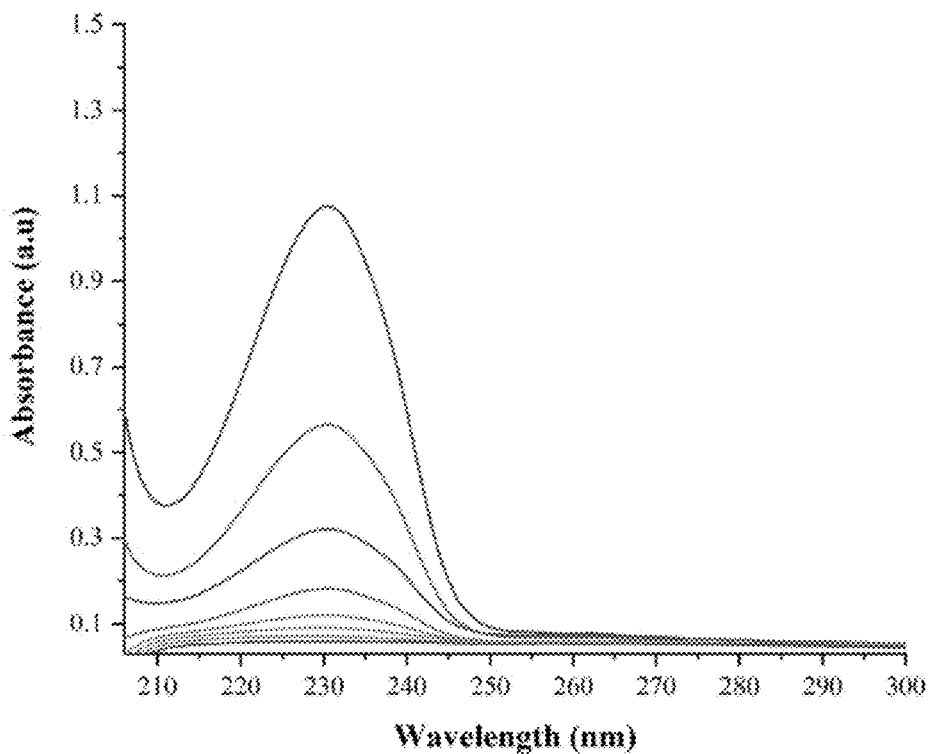
FIG. 45 shows absorption spectra (200-300 nm) for the BBPA standard solutions. The concentration range employed in the calibration curve is between 0.0025-0.035 mg/mL of BBPA in PBS.
Figure 46:
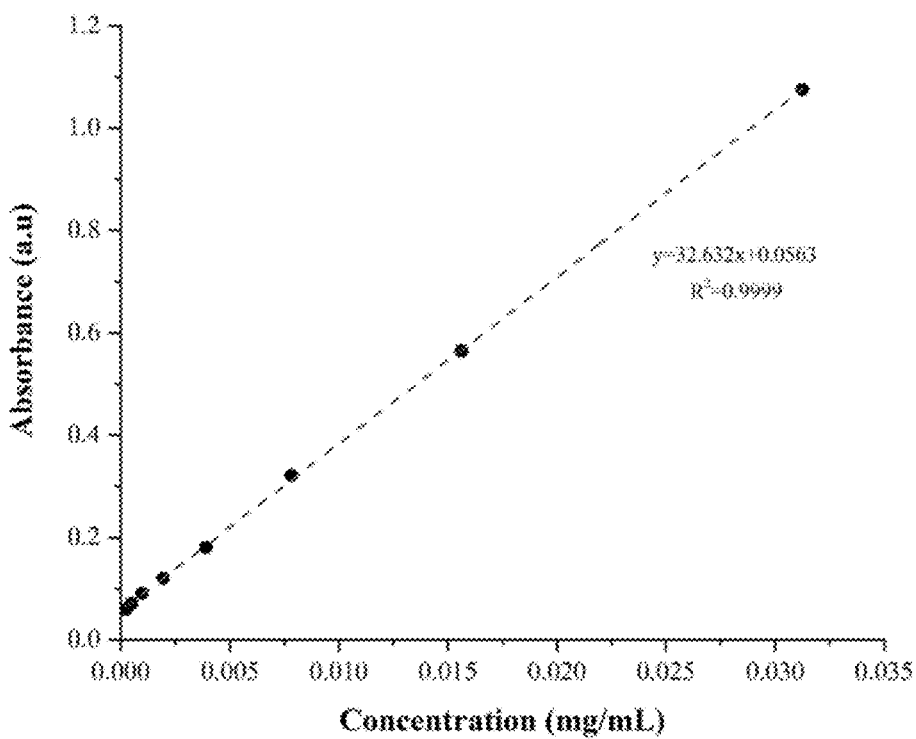
FIG. 46 shows a calibration curve of BBPA in PBS. The concentration range employed in the calibration curve is between 0.0025-0.035 mg/mL of BBPA in PBS.
Figure 47:
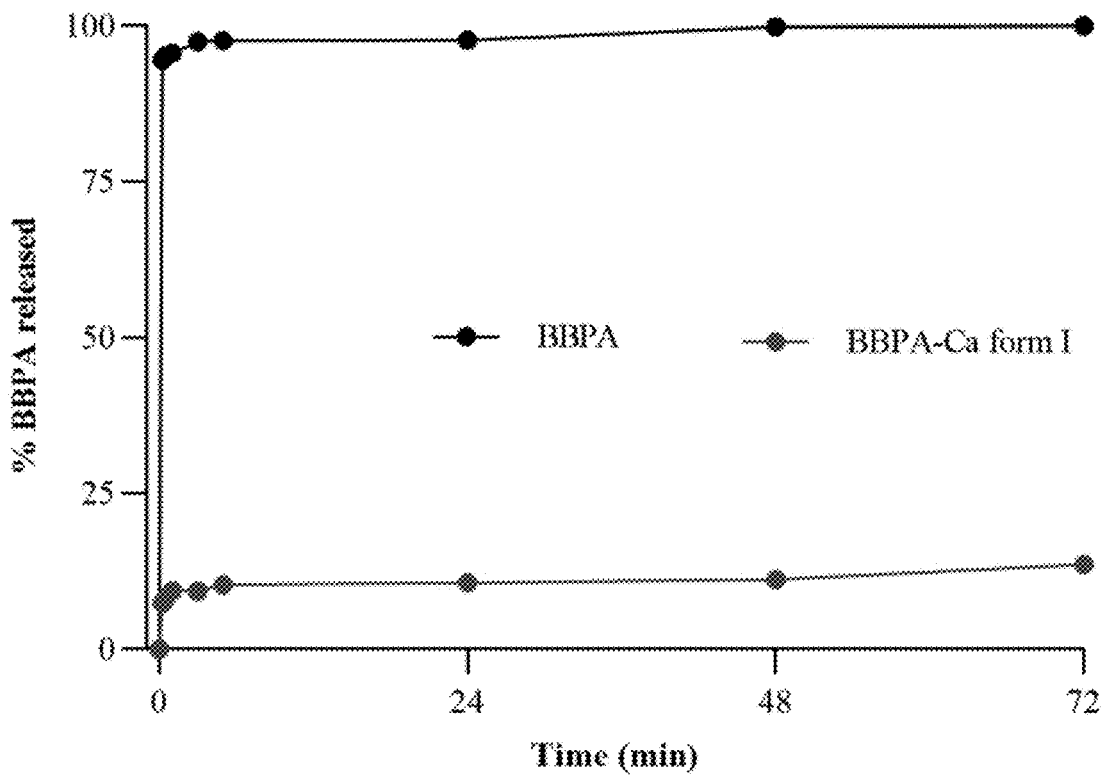
FIG. 47 shows a dissolution profile for BBPA-Ca form I (red) compared with BBPA (black) in PBS at 37° C. The experiment was performed in duplicate. About 14% of BBPA was released from the BBPA-Ca form I after 72 h.
Figure 48:
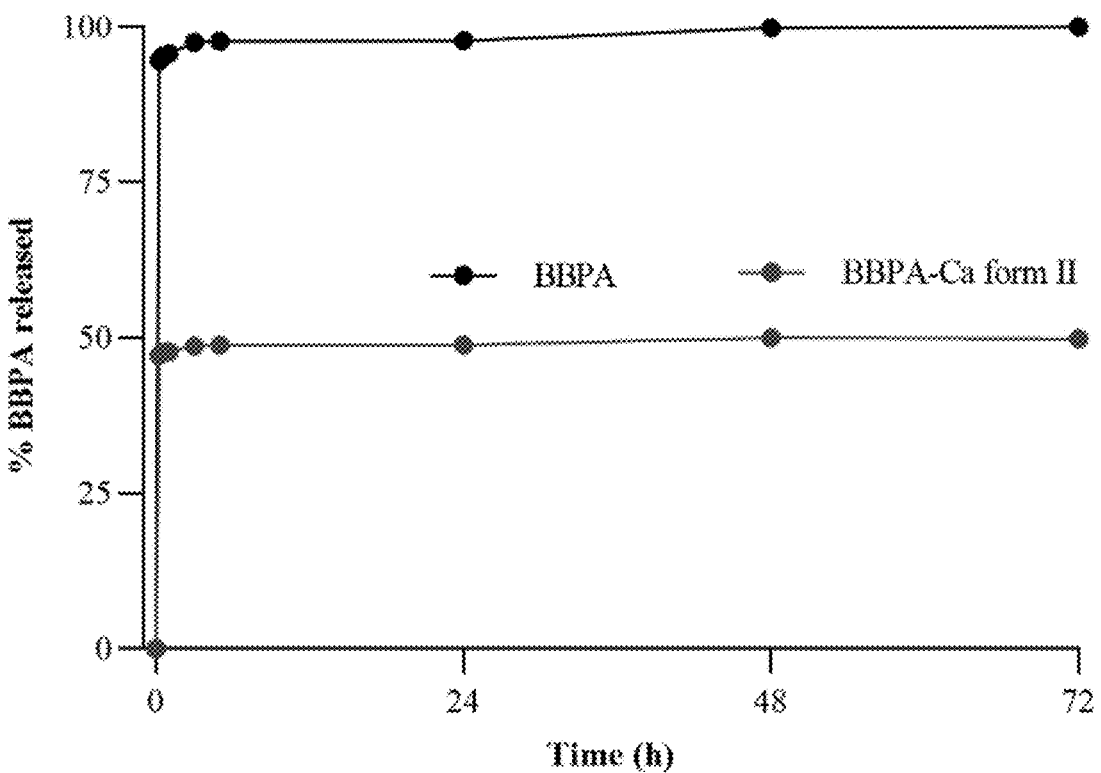
FIG. 48 shows a dissolution profile for BBPA-Ca form II (red) compared with BBPA (black) in PBS at 37° C. The experiment was performed in duplicate. About 50% of BBPA was released from the BBPA-Ca form II after 72 h.
Figure 49:
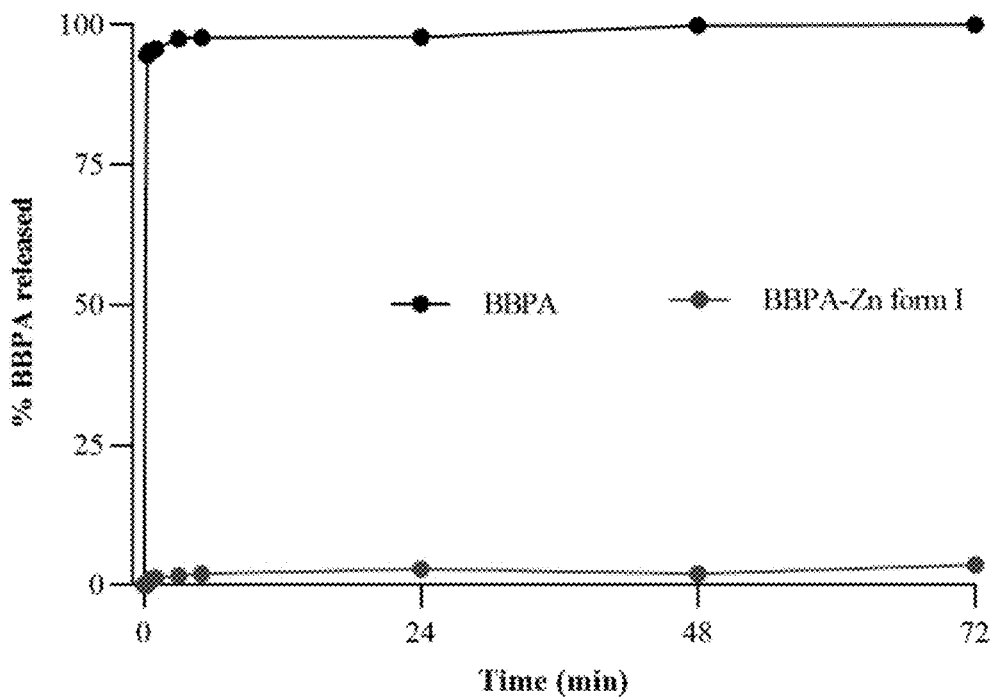
FIG. 49 shows a dissolution profile for BBPA-Zn form I (red) compared with BBPA (black) in PBS at 37° C. The experiment was performed in duplicate. About 4% of BBPA was released from the BBPA-Zn form I after 72 h.
Figure 50:
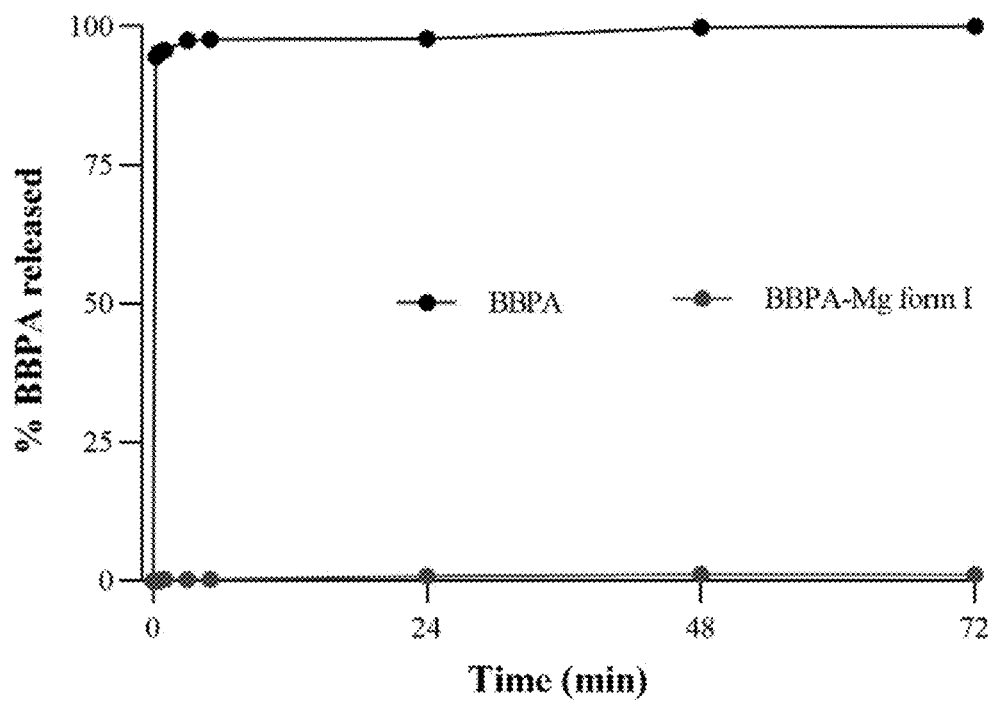
FIG. 50 shows a dissolution profile for BBPA-Mg form I (red) compared with BBPA (black) in PBS at 37° C. The experiment was performed in duplicate. About 1% of BBPA was released from the BBPA-Mg form I after 72 h.

Calibration curve—A stock solution of 1 mg/mL of BBPA in PBS was prepared. Then, 2-fold serial dilutions were performed to obtain twelve standard solutions in concentrations of 0.5, 0.25, 0.13, 0.06, 0.03, 0.016, 0.008, 0.004, 0.002, 0.001, 0.0005, 0.0002 mg/mL. Absorbance was measured using UV-Vis spectroscopy (200-500 nm) and PBS was employed as a solvent blank. The wavelength of maximum absorbance ($\lambda_{(max)}$) for BBPA was identified at 231 nm. FIG. 45 illustrates the absorption spectra for the BBPA standard solutions and FIG. 46 shows the calibration curve of BBPA in PBS.

Dissolution experiment. In a 250 mL beaker, 100 mL of PBS were transferred, the solution was left in constant stirring at 150 rpm and 37° C. An aliquot of 1 mL was taken prior to the addition of the BBPA-based metal complex to record the first time point (0 h). Subsequently, 15 mg of powder BBPA-based metal complexes were added to the buffer. Aliquots (1 mL) were taken out after each selected time point (0.25, 0.5, 1, 3, 5, 24, 48, and 72 h) and diluted with PBS in a 5 mL volumetric flask. The absorbance of BBPA released from the metal complexes was measured at 231 nm. The experiment was performed in duplicate for each BBPA-based metal complex. Dissolution profiles of BBPA-Ca forms I and II, BBPA-Zn form I, and BBPA-Mg form I are presented in FIGS. 47-50. In Table 2 is presented the percentage of the BBPA release from BBPA-based metal complexes after the dissolution experiment in PBS.

TABLE 2

Percentage (%) of BBPA released after dissolution profile experiment for BBPA-based metal complexes. The experiments were performed in duplicate (n = 2). The mean percent released and coefficient of variation (% CV) are reported.

| Time (h) | BBPA % Released | % CV | BBPA-Ca form I % Released | % CV | BBPA-Ca form II % Released | % CV | BBPA-Zn form I % Released | % CV | BBPA-Mg form I % Released | % CV |
|---|---|---|---|---|---|---|---|---|---|---|
| 0 | 0 | 0 | 0 | 0 | 0 | 0 | 0 | 0 | 0 | 0 |
| 0.25 | 95 | 3 | 7 | 2 | 47 | 1 | 0 | 0 | 0 | 0 |
| 0.5 | 95 | 2 | 8 | 3 | 48 | 1 | 1 | 2 | 0 | 0 |
| 1 | 96 | 1 | 9 | 1 | 48 | 1 | 1 | 4 | 0 | 2 |
| 3 | 98 | 3 | 9 | 2 | 48.7 | 0.4 | 2 | 2 | 0 | 5 |
| 5 | 98 | 3 | 10 | 3 | 48.9 | 0.1 | 2 | 2 | 0 | 3 |
| 24 | 98 | 2 | 11 | 1 | 48.90 | 0.03 | 3 | 2 | 1 | 1 |
| 48 | 100 | 3 | 11 | 2 | 49.9 | 0.2 | 3 | 2 | 1 | 2 |
| 72 | 100 | 4 | 14 | 3 | 50.0 | 0.1 | 4 | 4 | 1 | 2 |

Figure 51:
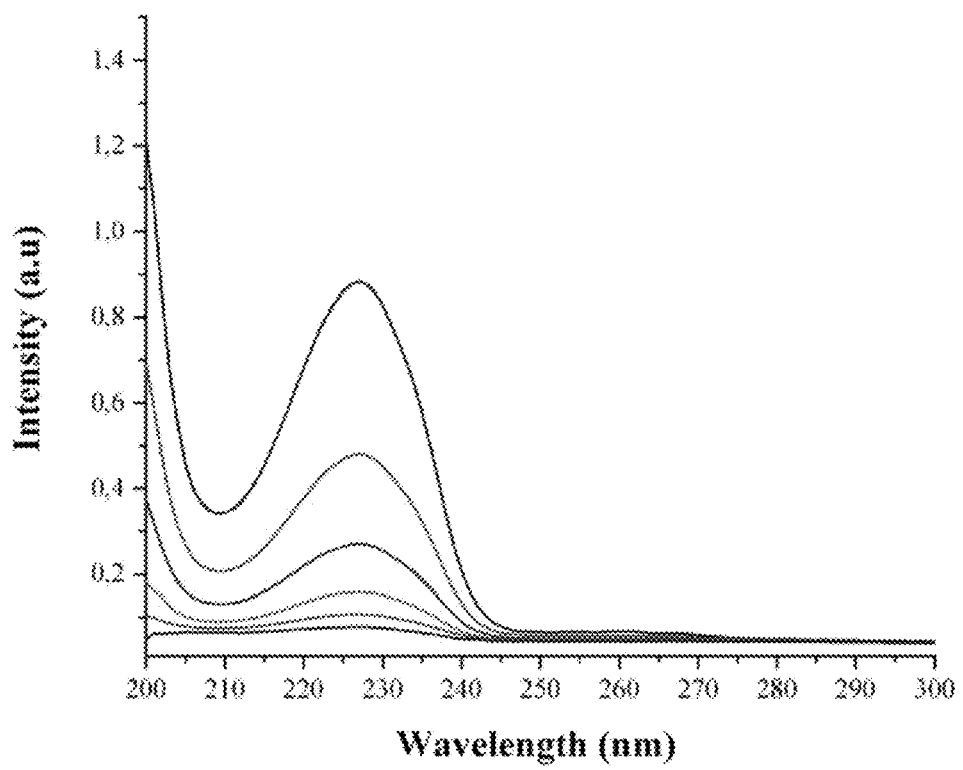
FIG. 51 shows absorption spectra (200-300 nm) for the BBPA standard solutions. The concentration range employed in the calibration curve is between 0.001-0.06 mg/mL of BBPA in FaSSGF.
Figure 52:
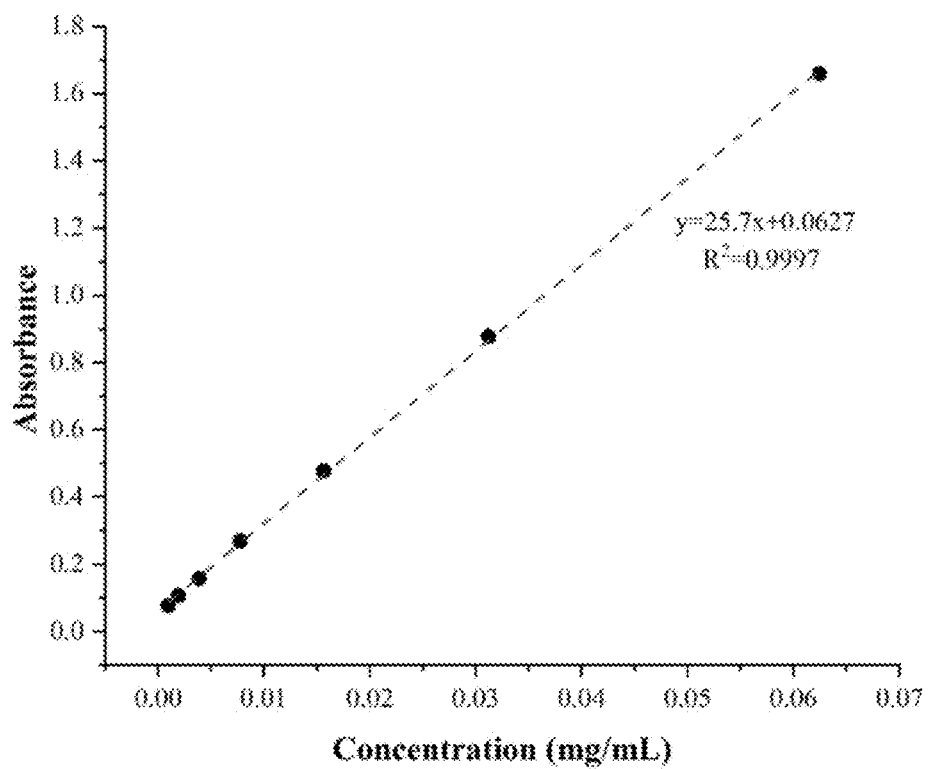
FIG. 52 shows a calibration curve of BBPA in FaSSGF. The concentration range employed in the calibration curve is between 0.0025-0.035 mg/mL of BBPA in FaSSGF.

Dissolution profiles in fasted-state simulated gastric fluid (FaSSGF) for BBPA-Ca form II. Calibration curve—A stock solution of 1 mg/mL of BBPA in FaSSGF was prepared. Then, 2-fold serial dilutions were performed to obtain ten solutions in concentrations of 0.5, 0.25, 0.13, 0.06, 0.03, 0.016, 0.008, 0.004, 0.002, 0.001 mg/mL. Absorbance was measured using UV-Vis spectroscopy (200-500 nm) and FaSSGF was employed as a solvent blank. The wavelength of maximum absorbance ($\lambda_{(max)}$) for BBPA was identified at 226 nm. FIG. 51 illustrates the absorption spectra for the BBPA standard solutions and FIG. 52 shows the calibration curve of BBPA in FaSSGF.

Figure 53:
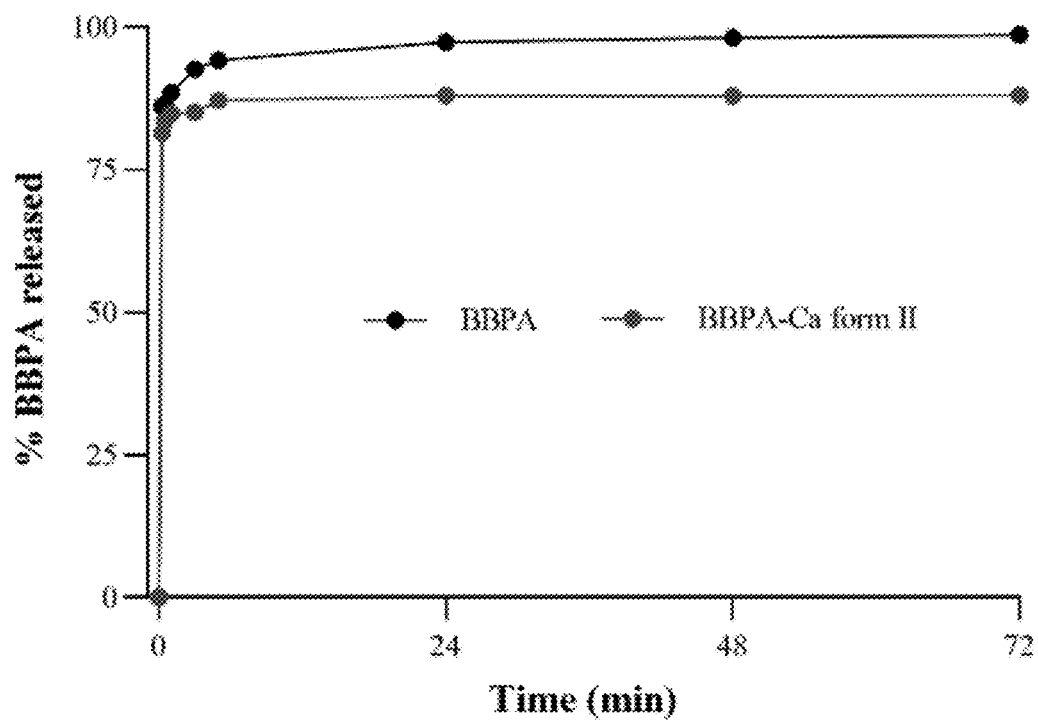
FIG. 53 shows a dissolution profile for BBPA-Ca form II (red) compared with BBPA (black) in FaSSGF at 37° C. The experiment was performed in duplicate. The percentage of BBPA released after 72 h was 88%.

Dissolution experiment. In a 250 mL beaker, 100 mL of FaSSGF were transferred, the solution was left in constant stirring at 150 rpm and 37° C. An aliquot of 1 mL was taken prior to the addition of the BBPA-Ca form II to record the first time point (0 h). Subsequently, 15 mg of powder BBPA-Ca form II were added to the FaSSGF solution. Aliquots (1 mL) were taken out after each selected time point (0.25, 0.5, 1, 3, 5, 24, 48 and 72 h) and diluted with FaSSGF in a 5 mL volumetric flask. The absorbance of BBPA released from the metal complex was measured at 226 nm. The experiment was performed in duplicate for BBPA-Ca form II. The dissolution profile for BBPA in FaSSGF was recorded for comparison. The dissolution profile of BBPA-Ca form II is presented in FIG. 53. In Table 3 is presented the percentage of BBPA released from BBPA-Ca form II after the dissolution experiment in FaSSGF.

TABLE 3

Percentage (%) of BBPA released after dissolution profile experiment for BBPA-Ca form II. The experiments were performed in duplicate (n = 2). The mean percent released and coefficient of variation (% CV) are reported.

| Time (h) | BBPA % Released | % CV | BBPA-Ca form II % Released | % CV |
|---|---|---|---|---|
| 0 | 0 | 0 | 0 | 0 |
| 0.25 | 86 | 4 | 82 | 4 |
| 0.5 | 87 | 2 | 84 | 2 |
| 1 | 88.6 | 0.2 | 85 | 1 |
| 3 | 93 | 2 | 85 | 3 |
| 5 | 94 | 2 | 87 | 4 |

TABLE 3-continued

Percentage (%) of BBPA released after dissolution profile experiment for BBPA-Ca form II. The experiments were performed in duplicate (n = 2). The mean percent released and coefficient of variation (% CV) are reported.

| Time (h) | BBPA % Released | % CV | BBPA-Ca form II % Released | % CV |
|---|---|---|---|---|
| 24 | 98 | 3 | 88 | 1 |
| 48 | 98 | 3 | 88 | 4 |
| 72 | 99 | 2 | 88 | 2 |

Phase inversion temperature (PIT) and PIT-nano-emulsion synthesis of nano-Ca@BBPA The BBPA-Ca form II complex was selected for further analysis because this 3D framework offers the possibility to be used as a drug carrier (channels 12×8 Å), as it can maintain its coordination in neutral and degrade in acidic media. First, a PIT-nano-emulsion method was applied to decrease the particle size of BBPA-Ca form II. For this, the PIT temperature of an aqueous emulsion composed of BBPA in heptane as an oil phase and Brij L4® as a surfactant was determined. Phase inversion was determined via conductivity measurements, when the emulsion went from an oil-in-water micro-emulsion (O/W, conductivity=1,167 µS) to a water-in-oil nano-emulsion (W/O, conductivity=0.084 µS), as it was heated from 2-40° C. (1° C./min). The phase inversion started at 10° C. and ended at 16° C., resulting in an average PIT temperature of ~13° C. for the BBPA (heptane, Brij L4®) system.

Figure 54:
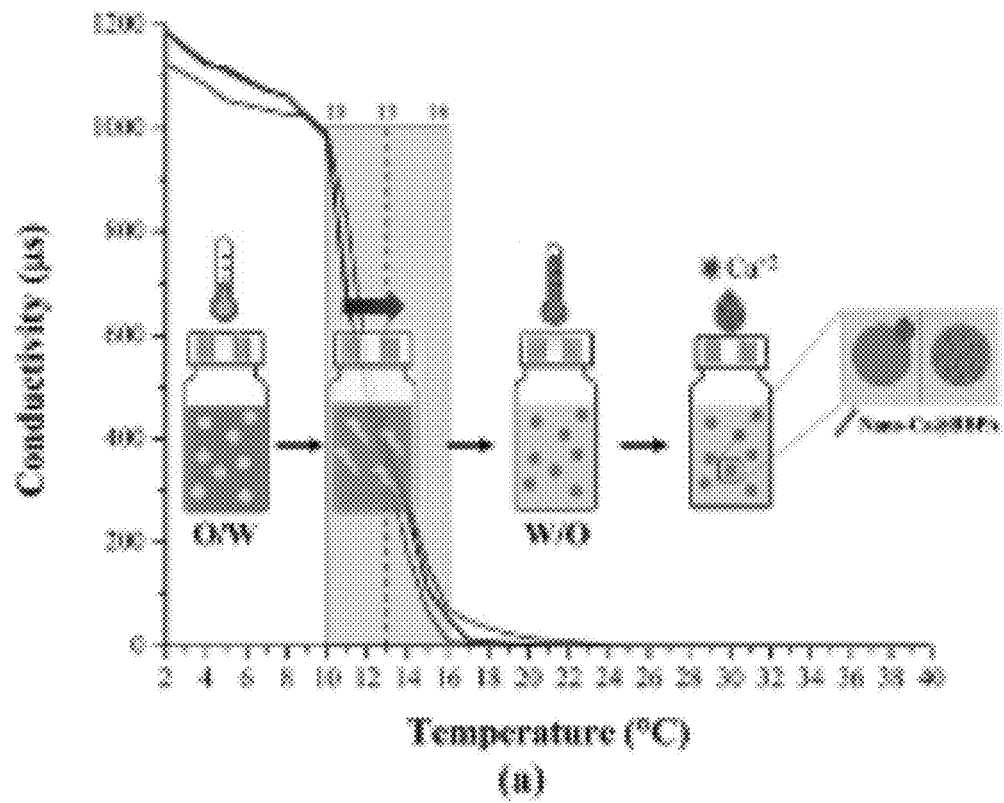
FIG. 54 shows a schematic diagram of the PIT nano-emulsion synthesis of nano-Ca@BBPA, showing the phase inversion temperature at ~13° C. (dashed line).
Figure 55:
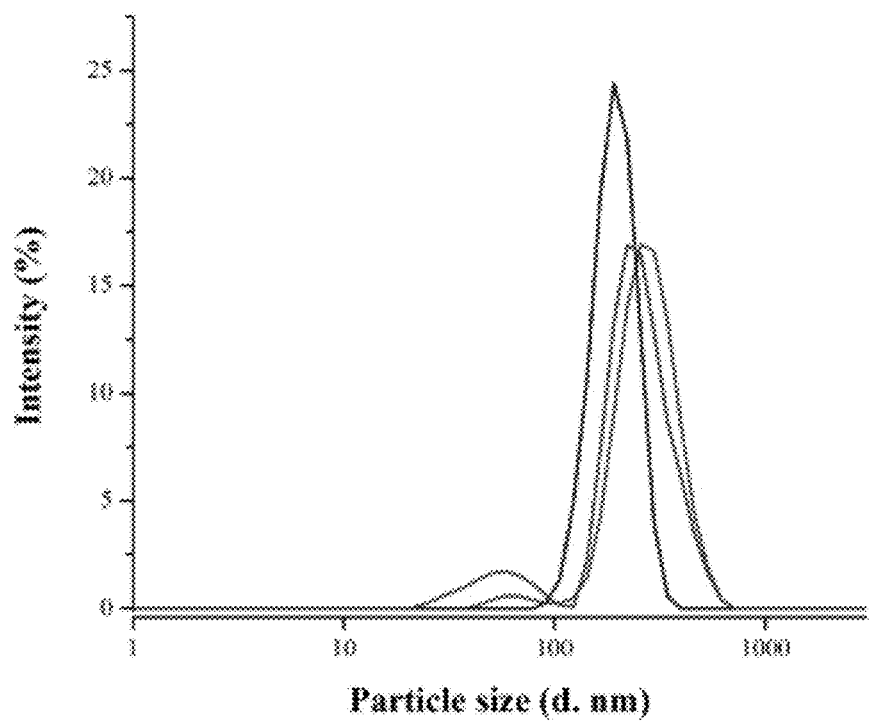
FIG. 55 shows dynamic light scattering (DLS) spectra displaying the average particle size distribution (~250 d·nm) for the replicate synthesis of nano-Ca@BBPA.

The hydrothermal synthesis of BBPA-Ca form II was carried out employing the PIT-nano-emulsion method to obtain crystals in the nanoscale range (FIG. 54). Once the W/O nano-emulsion was formed, the BBPA ligand will be trapped in aqueous nanospheres, limiting the reaction space and allowing the formation of nano-Ca@BBPA once the metal salt solution is added. To determine the particle size distribution of nano-Ca@BBPA, the aqueous supernatant from the PIT synthesis was measured by DLS. This experiment was performed in triplicate, resulting in average particle size distribution values of 195.1, 266.6, and 286.5 d. nm (FIG. 55). The polydispersity indexes (PDI) for the nano-Ca@BBPA were in the range of 0.394-0.499, demonstrating the monodispersity of this synthesized nanomaterial. These results reveal that the PIT-nano-emulsion method designed with the hydrothermal conditions allowed the particle size reduction of this complex from the microscale (~500 μm, FIG. 37, (b)) to the nanoscale (~250 d. nm, FIG. 55), due to the possible decrease of the reaction space available for nucleation and crystal growth. PXRD analysis for an agglomerate of nano-Ca@BBPA crystals was carried out to identify its crystal phase. The PXRD diffractograms demonstrated that the nanocrystals obtained through this method are isostructural to the bulk BBPA-Ca form II crystals (Supporting Information).

Phase Inversion Temperature (PIT) Determination for BBPA.

Figure 56:
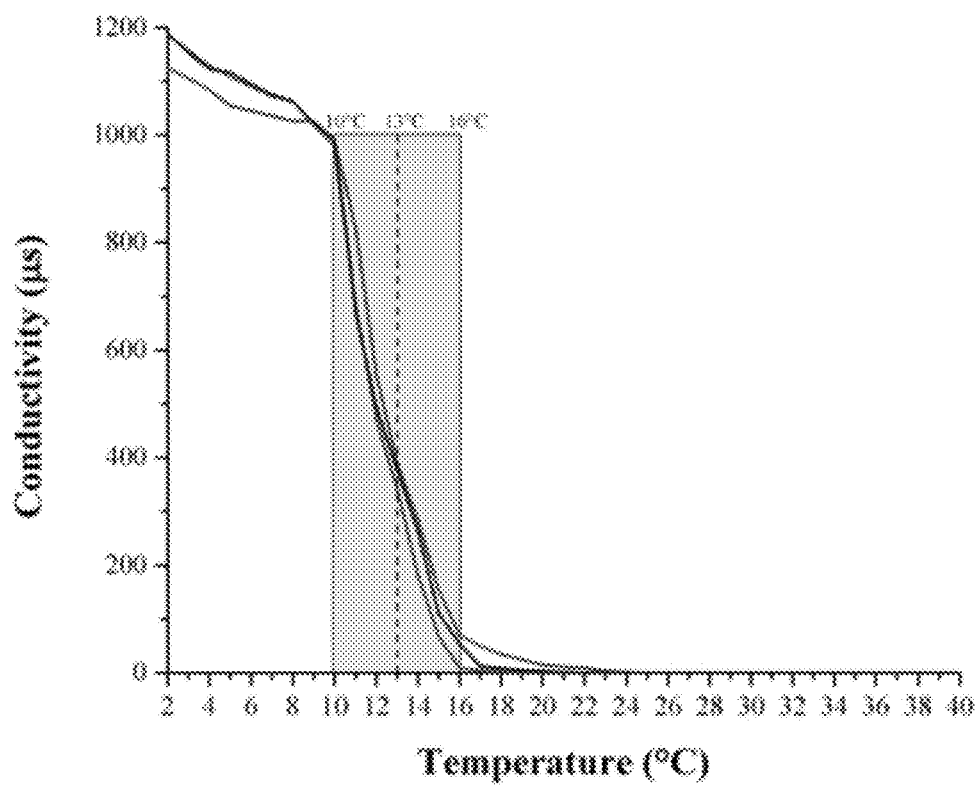
FIG. 56 shows a PIT temperature determination of BBPA. The phase inversion occurs at ~13° C. (dashed line). Phase inversion begins at 10° C. and finishes at 16° C. The experiment was performed in triplicate.

The PIT was determined for a micro-emulsion of BBPA in heptane, which employed Brij L4® as a surfactant. For this, to 11.0 mL of a BBPA solution (2.5 mg/mL) were added 3.0 mL of heptane and 0.9 mL of Brij L4®. The conductivity of the homogenized micro-emulsion was measured in the temperature range of 2-40° C. (at 1° C./min). FIG. 56 shows the PIT determination curve for BBPA in heptane using Brij L4® as a surfactant.

Synthesis and Characterization of Nano-Ca@BBPA

Synthesis of nano-Ca@BBPA—The nano-emulsion synthesis of nano-Ca@BBPA form II was carried out in a Crystalline (Technobis, Crystallization Systems, Alkmaar, Netherlands). For this, emulsions (BBPA, heptane, Brij L4®) were prepared as well as for PIT determination and employed for the synthesis of nano-Ca@BBPA. The emulsion was previously homogenized and about 3.0 mL were transferred to 8 mL reaction vials; adequate stir bars and reflux caps were employed to carry out the synthesis. Subsequently, the reaction vials were left in the Crystalline reactors at 7° C. (1,250 rpm) for 30 min. Then, the reaction vials were transferred to a second Crystalline reactor at 30° C. (1,250 rpm) and left stirring for 30 min. After this period, the reaction vials were heated at 35° C. Successively, the metal salt solution (3.0 mL) was added and left stirring for 5 h to allow the formation of nano-Ca@BBPA. When the reaction was finalized, the reaction vials were left undisturbed for 3 h, allowing them to reach room temperature and equilibrium. Finally, aliquots of the aqueous phase (supernatant) were measured by dynamic light scattering (DLS) to determine the particle size of the obtained nano-Ca@BBPA emulsion.

Figure 57:
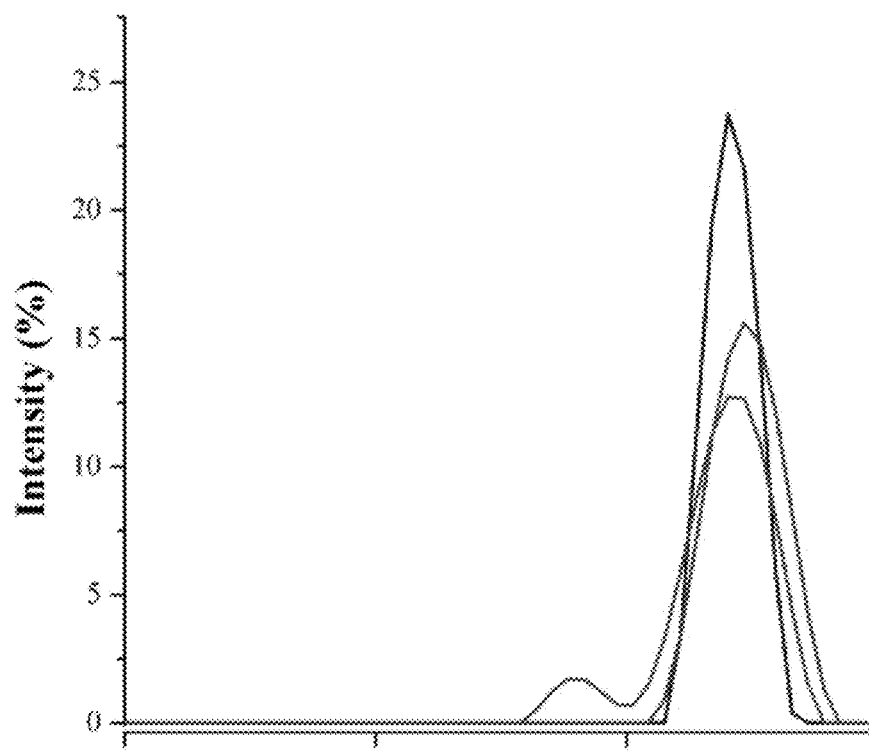
FIG. 57 shows DLS spectra of the nano-Ca@BBPA nano-emulsion, which show the particle size distribution for run 1 (blue), run 2 (red), and run 3 (green).
Figure 58:
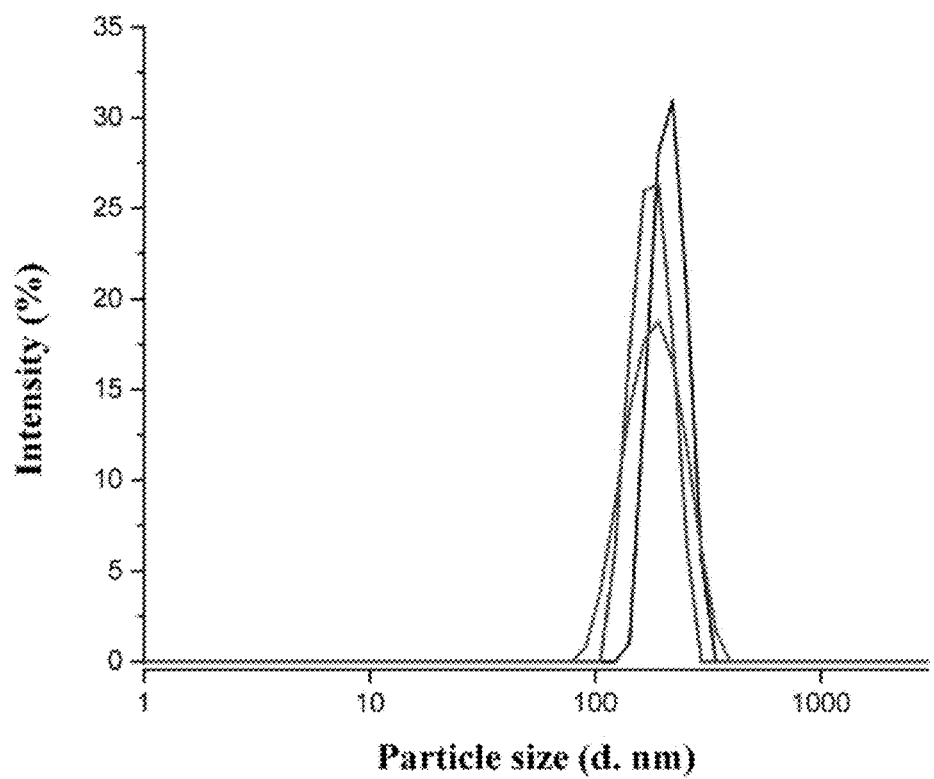
FIG. 58 shows DLS spectra of the nano-Ca@BBPA nano-emulsion, which show the particle size distribution for run 1 (blue), run 2 (red), and run 3 (green).
Figure 59:
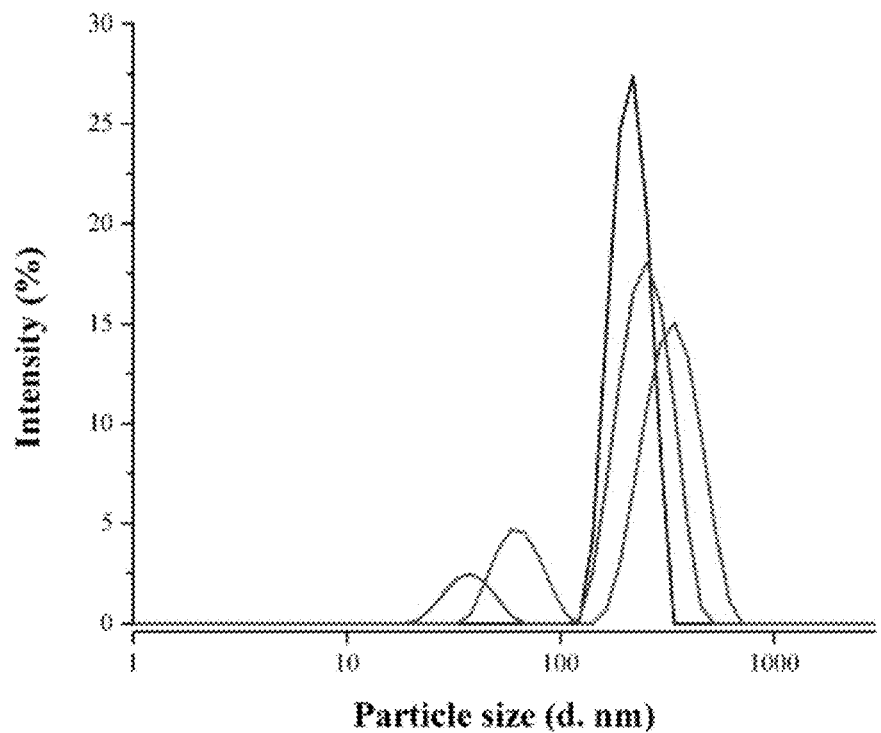
FIG. 59 shows DLS spectra of the nano-Ca@BBPA nano-emulsion, which show the particle size distribution for run 1 (blue), run 2 (red), and run 3 (green).

Dynamic light scattering (DLS) measurements for nano-Ca@BBPA—DLS was employed to analyze the particle size distribution of the supernatant from the aqueous phase of BBPA in heptane nano-emulsion. The DLS measurements for the resulting nano-emulsion of nano-Ca@BBPA were recorded in a Malvern Panalytical Zetasizer NanoZS. The instrument is supplied with a He—Ne orange laser (633 nm, max 4 mW) (Spectris PLC, Surrey, England). The Malvern software version 7.12 was employed to analyze the data. To measure the supernatant from the aqueous phase, aliquots of 50.0 μL were added to disposable polystyrol/polystyrene cuvettes (REF: 67.754 10×10×45 mm) (Sarsted, Germany). A 1:20 dilution ratio using nanopure water was applied to prepare the nano-emulsion and carried out the DLS measurements. Tables 4-6 report the particle size distribution for nano-Ca@BBPA determined by DLS. Furthermore, FIGS. 57-59 presented the particle size distribution curves for the synthesis of nano-Ca@BBPA

TABLE 4

Particle size distribution for nano-Ca@BBPA determined by DLS.
The measurements were recorded in triplicates.
The particle size distribution of nano-Ca@BBPA

| Run | Size (d · nm) | % Intensity | St. Dev (d · nm) | PDI |
|---|---|---|---|---|
| 1 | 267.8 | 100.0 | 102.5 | 0.312 |
|  | 0.000 | 0.0 | 0.000 |  |
|  | 0.000 | 0.0 | 0.000 |  |
| 2 | 315.7 | 93.1 | 137.9 | 0.347 |
|  | 5268 | 6.9 | 539.7 |  |
|  | 0.000 | 0.0 | 0.000 |  |
| 3 | 276.2 | 80.9 | 99.44 | 0.524 |
|  | 68.85 | 7.7 | 9.266 |  |
|  | 1.355 | 7.2 | 498.9 |  |
| Average | 286.5 | 91.3 | 112.3 | 0.394 |
|  | 5361 | 3.7 | 12.11 |  |
|  | 68.85 | 2.6 | 585.6 |  |

TABLE 5

Particle size distribution for nano-Ca@BBPA determined by DLS.
The measurements were recorded in triplicates.
The particle size distribution of nano-Ca@BBPA

| Run | Size (d · nm) | % Intensity | St. Dev (d · nm) | PDI |
|---|---|---|---|---|
| 1 | 214.4 | 100.0 | 42.65 | 0.406 |
|  | 0.000 | 0.0 | 3.305 |  |
|  | 0.000 | 0.0 | 0.000 |  |
| 2 | 180.5 | 100.0 | 60.47 | 0.520 |
|  | 0.000 | 0.0 | 10.11 |  |
|  | 0.000 | 0.0 | 0.000 |  |
| 3 | 190.6 | 100.0 | 217.1 | 0.401 |
|  | 0.000 | 0.0 | 24.13 |  |
|  | 0.000 | 0.0 | 712.9 |  |
| Average | 195.1 | 100.0 | 149.4 | 0.442 |

TABLE 6

Particle size distribution for nano-Ca@BBPA determined by DLS.
The measurements were recorded in triplicates.
The particle size distribution of nano-Ca@BBPA

| Run | Size (d · nm) | % Intensity | St. Dev (d · nm) | PDI |
|---|---|---|---|---|
| 1 | 215.0 | 100.0 | 202.5 | 0.515 |
|  | 0.000 | 0.0 | 0.000 |  |
|  | 0.000 | 0.0 | 0.000 |  |
| 2 | 256.7 | 89.3 | 37.98 | 0.490 |
|  | 37.94 | 10.7 | 39.64 |  |
|  | 0.000 | 0.0 | 0.000 |  |
| 3 | 343.0 | 79.1 | 79.34 | 0.494 |
|  | 64.63 | 20.9 | 10.36 |  |
|  | 0.000 | 0.0 | 0.000 |  |
| Average | 266.6 | 89.4 | 11.3 | 0.499 |
|  | 56.03 | 10.6 | 14.12 |  |
|  | 0.000 | 0.0 | 0.000 |  |

Polarized Optical Microscopy Powder X-Ray Diffraction for Nano-Ca@BBPA.

Figure 60:
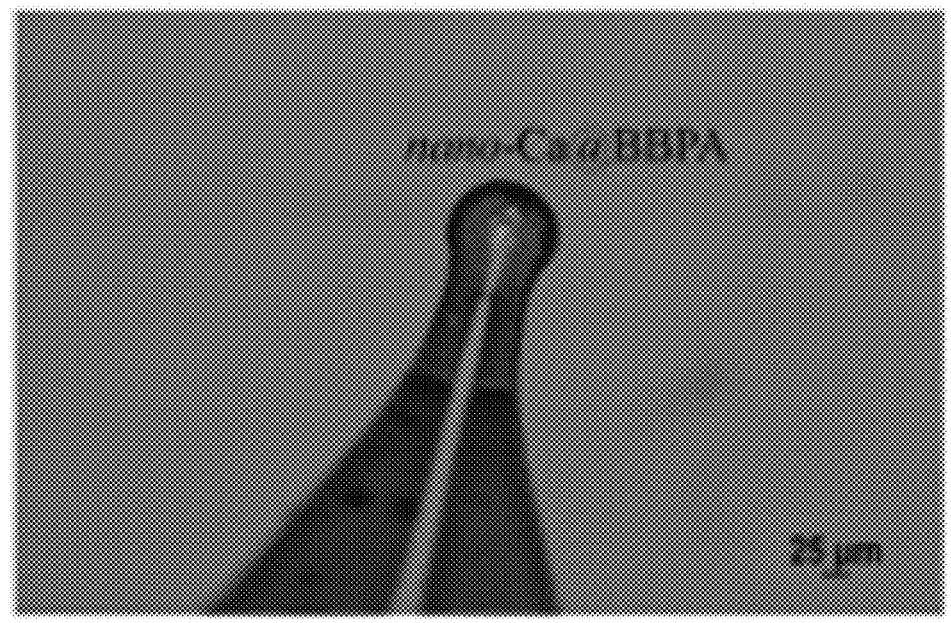
FIG. 60 shows Polarized optical micrographs of agglomerated nano-Ca@BBPA mounted in a 30 μm MiTeGen micro loop.
Figure 61:
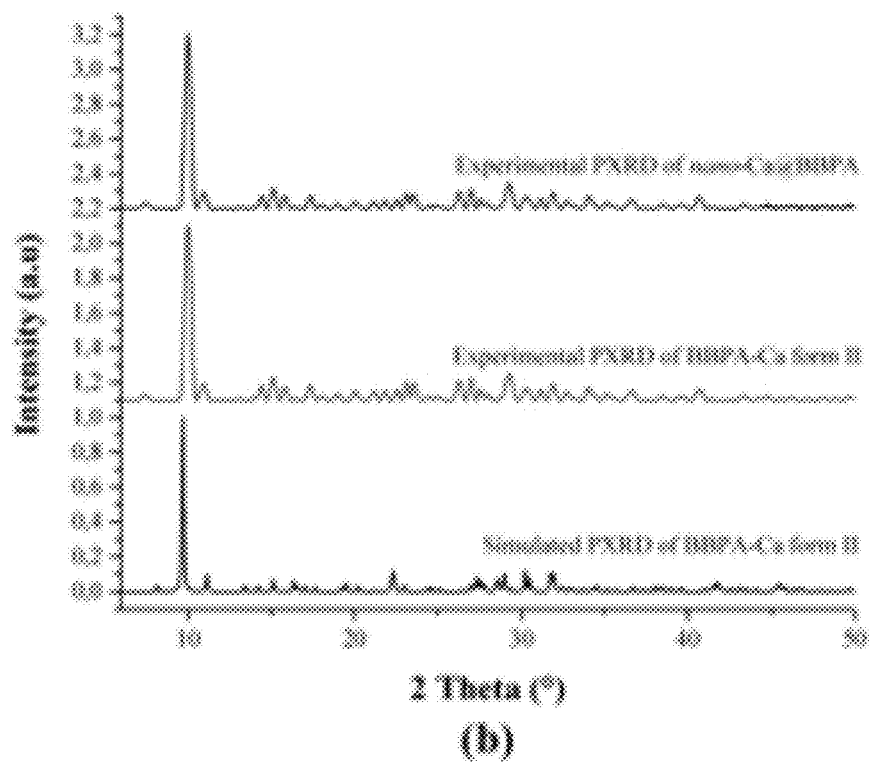
FIG. 61 shows PXRD diffractograms overlays of BBPA-Ca form II simulated from the solved crystal structure (black) and experimental (red) compared with nano-Ca@BBPA (blue).

PXRD analysis for an agglomerate of nano-Ca@BBPA was performed to identify its crystalline phase. For this, agglomerated nano-Ca@BBPA was mounted in a 30 m MiTeGen micro loop, the Nikon Eclipse Microscope LV100N POL was employed to record optical micrographs, this instrument is equipped with a Nikon DS-Fi2 camera and NIS Elements BR software version 4.30.01. PXRD analysis parameters for nano-Ca@BBPA were performed as previously described (Powder X-ray diffraction for BBPA). FIG. 60 shows the optical micrograph of nano-Ca@BBPA and FIG. 61 shows the PXRD diffractograms overlay for the agglomerated nano-Ca@BBPA compared with the ligand and the bulk BBPA-Ca form II crystal (simulated from the solved crystal structure and experimental pattern).

Binding Assays to Hydroxyapatite (HA) for BBPA-Based Metal Complexes

Figure 62:
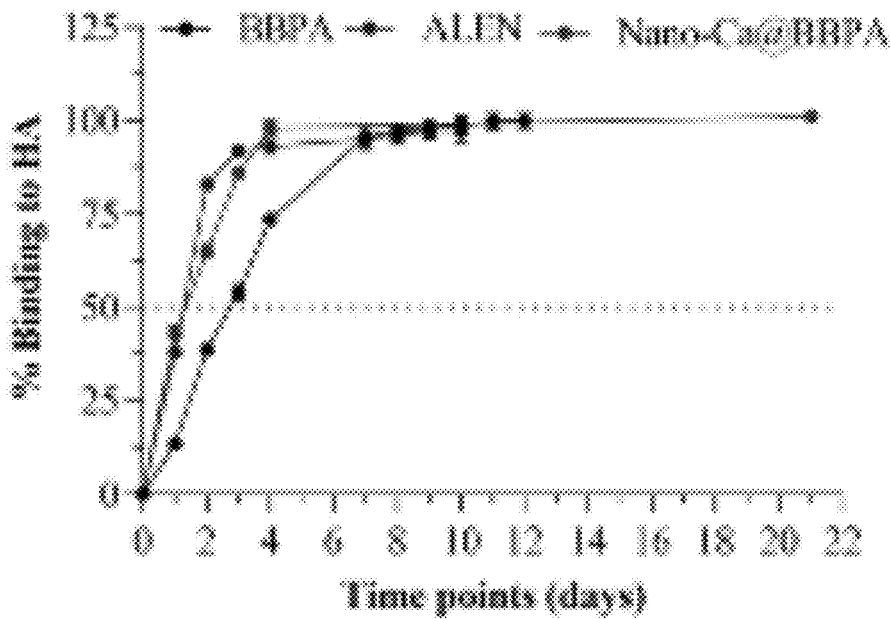
FIG. 62 shows a binding assay of BBPA (0.5 mg/mL) and nano-Ca@BBPA (0.5 mg/mL) to HA. HA was employed to investigate the affinity of BBPA to the bone microenvironment. Some error bars are not observed due to the small coefficient of variation (% CV<5%).
Figure 63:
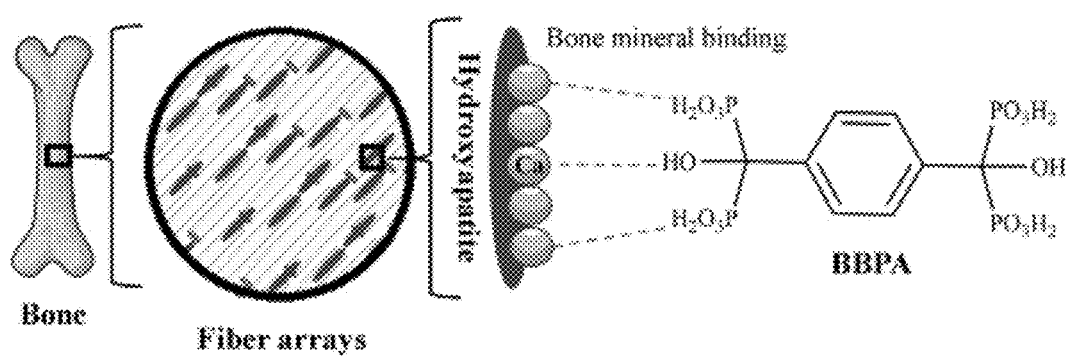
FIG. 63 shows a schematic representation of the BBPA binding to HA through the affinity of bisphosphonates groups to the calcium ions on the surface of this mineral.

The affinity to HA is crucial for BBPA and the BBPA-based metal complexes since it is the principal mineral of the bone microenvironment and is the targeted region when treating breast cancer-induced osteolytic metastases. For this experiment, synthetic HA was employed to assess the binding assay for BBPA and the BBPA-based metal complexes in physiological conditions (PBS, pH=7.40, and 37° C.). Powder HA (20 mg) was treated with solutions (0.5 mg/mL) of BBPA and BBPA-based metal complexes for 0-12 days. A suspension of HA in PBS and a solution of BBPA in PBS (without HA) were employed as control groups. After each time point, the supernatant was collected, centrifuged, and the absorbance at 231 nm was quantified to determine the fraction of BBPA bound to HA. The reduction in the BBPA concentration of the supernatant was used as an indicator of the affinity to HA. These results were employed to generate binding curves for the BBPA and the complexes (FIG. 62). The binding curves of these materials were contrasted with the one before reported for Alendronic acid (ALEN). The binding curve for BBPA showed a >50% (3 days) and 99% (10 days) binding to HA in a simulated physiological environment. Also, it was observed that BBPA presented comparable percentage of binding to HA correlated with ALEN, in which is reached >95% of binding in both compounds after 7 days. It is presumed that the bisphosphonate groups in the BBPA structure are the principal responsible for the binding to HA (FIG. 63).

Figure 64:
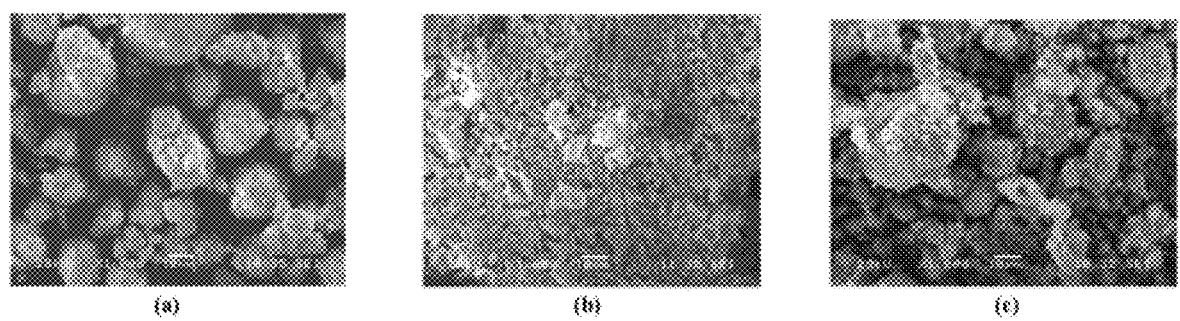
FIG. 64 shows a SEM-EDS analysis for (a) HA, (b) HA-BBPA, and (c) HA-Nano-Ca@BBPA. The SEM micrographs were recorded at 1000× magnification and samples were cover with a thin (~5 nm) layer of gold.
Figure 65:
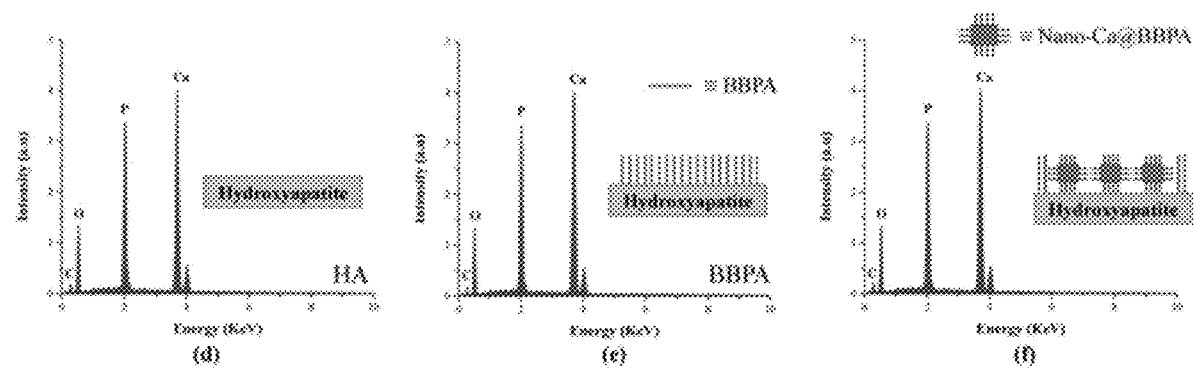
FIG. 65 shows the EDS analysis of (d) HA (control), (e) HA-BBPA (control), and (f) HA-Nano-Ca@BBPA (experimental) was performed at 3000× magnification. The EDS analysis shows the presence of carbon, oxygen, phosphorus, and calcium.

Additional characterization was performed to support and validate the ability of BBPA and the BBPA-based metal complexes to bind to HA. SEM-EDS analysis of the solid samples after the binding assay was performed and it is illustrated in FIGS. 64 and 65. The EDS analysis detected characteristic elements present in both HA [$Ca_5(OH)(PO_4)_3$] and BBPA [$C_6H_{14}O_{14}P_4$]. The elemental composition of HA (control), HA-BBPA (control), and HA-Nano-Ca@BBPA (experimental) were contrasted comparing the weight percentage of each element determined by EDS (wt. %, Table 7). The relative concentration of calcium in HA-BBPA (36.04 wt. %) decreased compared to that observed in HA (42.67 wt. %). This result can be explained because BBPA, a compound that possesses cero calcium atoms per formula unit, might forming a monolayer on the HA surface. This monolayer might shield the detection of calcium ions in the EDS spectra of the HA surface (FIG. 65, (d)). A small quantity of carbon (7.04 wt. %) is detected in the EDS spectra of HA which might originate from the conductive tape employed to perform this analysis. For HA-BBPA, the weight percentage of the carbon signal (8.88 wt. %) exhibited a small increase due to the presence of this element in the molecular structure of BBPA (6 carbon atoms per formula unit). Furthermore, only a slight increment in the phosphorous signal was observed for HA-BBPA (19.40 wt. %) which contrasted with the phosphorous signal detected in HA (18.09 wt. %). This is consistent with the relative composition of phosphorous in both materials. Additionally, the relative signal of oxygen increases from HA (30.88 wt. %) to HA-BBPA (33.39 wt. %). This result is an indication of the presence of BBPA bound into the HA surface. These results confirm that BBPA can effectively bind to the surface of HA.

TABLE 7

EDS elemental analysis of HA and HA-BBPA after the binding assay (12 days). The EDS analysis was recorded at a 3000x magnification for all samples.

| Element | HA | HA-BBPA | HA-Nano-Ca@BBPA |
|---|---|---|---|
| Calcium | 42.67 | 36.04 | 37.30 |
| Carbon | 7.04 | 8.88 | 9.20 |
| Oxygen | 30.88 | 33.39 | 39.87 |
| Phosphorous | 18.09 | 19.40 | 21.31 |

HA [$Ca_5(OH)(PO_4)_3$], BBPA [$C_6H_{14}O_{14}P_4$], Nano-Ca@BBPA [$2(CaC_4H_9O_9P_2)$, $9(H_2O)$]

Figure 66:
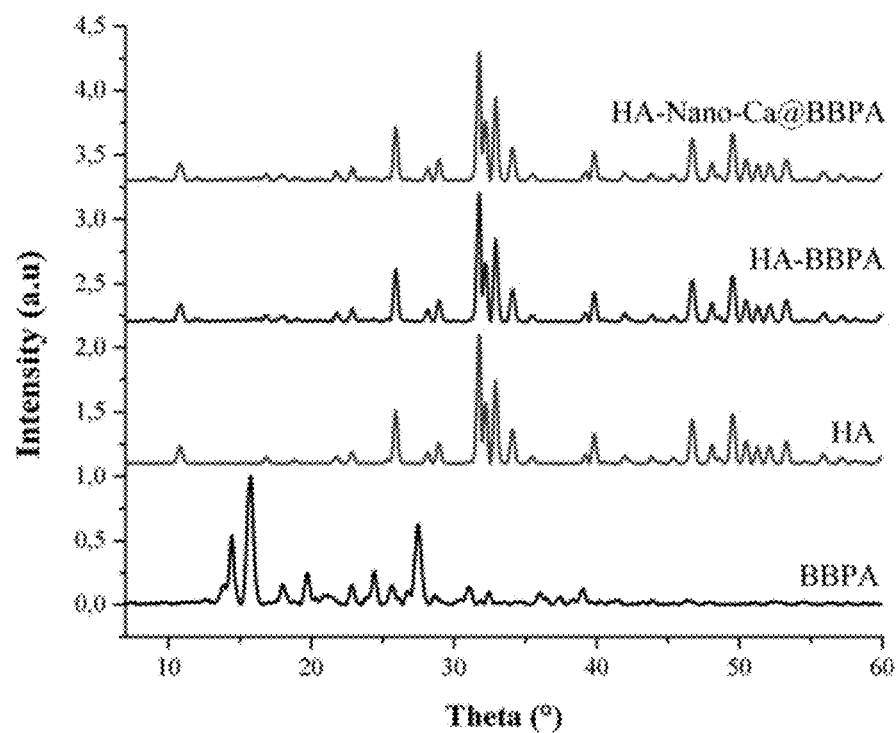
FIG. 66 shows Powder X-ray diffractograms overlay for the BBPA (black), HA (red, control), and HA-BBPA (blue, experimental) for the binding assay after 12 days.

Powder X-ray diffractograms for HA, HA-BBPA, HA-Nano-Ca@BBPA were recorded, analyzed, and contrasted with BBPA and each other to discard the possibility of recrystallization of BBPA on the HA surface. Results displayed similar powder X-ray diffractograms for HA, HA-BBPA, and the HA-Nano-Ca@BBPA (FIG. 66). This result is an indication that the instrument could not detect (LOD<5 wt. %) enough quantity to sustain that BBPA has recrystallized on the surface of HA, the same reflections (2θ) are observed for HA, HA-BBPA, and the HA-Nano-Ca@BBPA indicating that the binding to HA is not modifying its crystal structure.

Binding Assays for Nano-Ca@BBPA in PBS

Calibration curve. To determine the BBPA content during the binding assay, the same calibration curve prepared for the dissolution profile in PBS was employed (FIG. 46).

Binding Assays with Hydroxyapatite (HA)—Hydroxyapatite (HA) was used to investigate the affinity of BBPA and nano-Ca@BBPA to the bone. To perform this experiment, 20 mg of HA were exposed to 5 mL of 0.5 mg/mL of BBPA and nano-Ca@BBPA for 0-12 d (experimental groups). BBPA and nano-Ca@BBPA (5 mL, 0.5 mg/mL) and HA (20 mg in 5 mL of PBS) were employed as control groups. The experiment was carried out for 0-12 days, in constant stirring at 120 rpm. After the selected time points (0, 1, 2, 3, 4, 7, 8, 9, 10, 11, 12 d), the supernatant was collected to determine the percentage of BBPA bound to HA. The supernatant was centrifuged for 8 min (500 rcf) and the absorbance was measured at 231 nm. Solid samples were characterized by SEM-EDS and PXRD.

Figure 67:
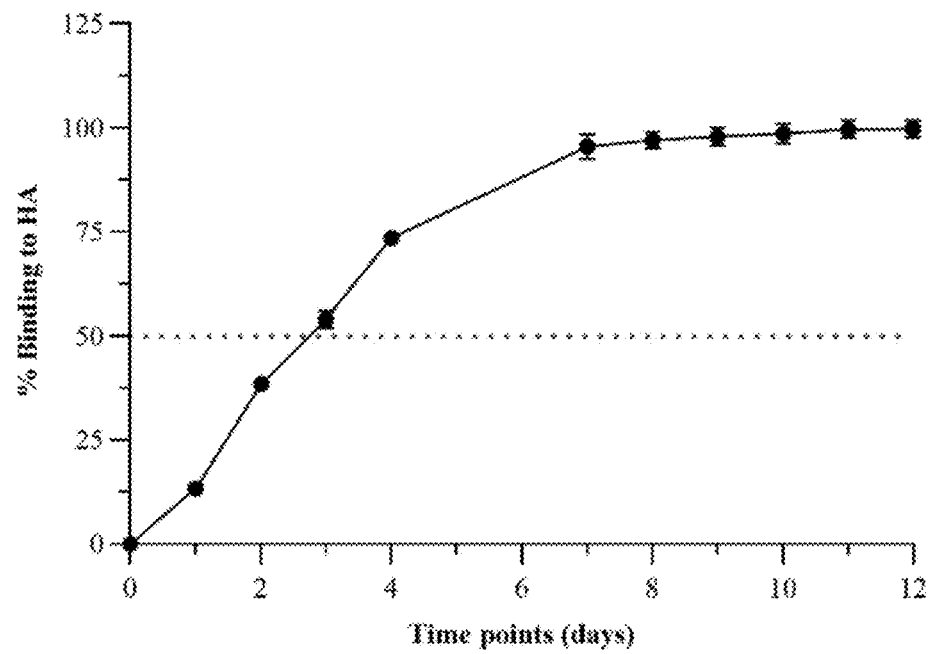
FIG. 67 shows a percentage of BBPA (0.5 mg/mL) binding to hydroxyapatite (HA). The maximum percentage of binding reached by BBPA to HA was 100% in 10 days. Some error bars are not observed due to the small value of the coefficient of variation (% CV<5%).
Figure 68:
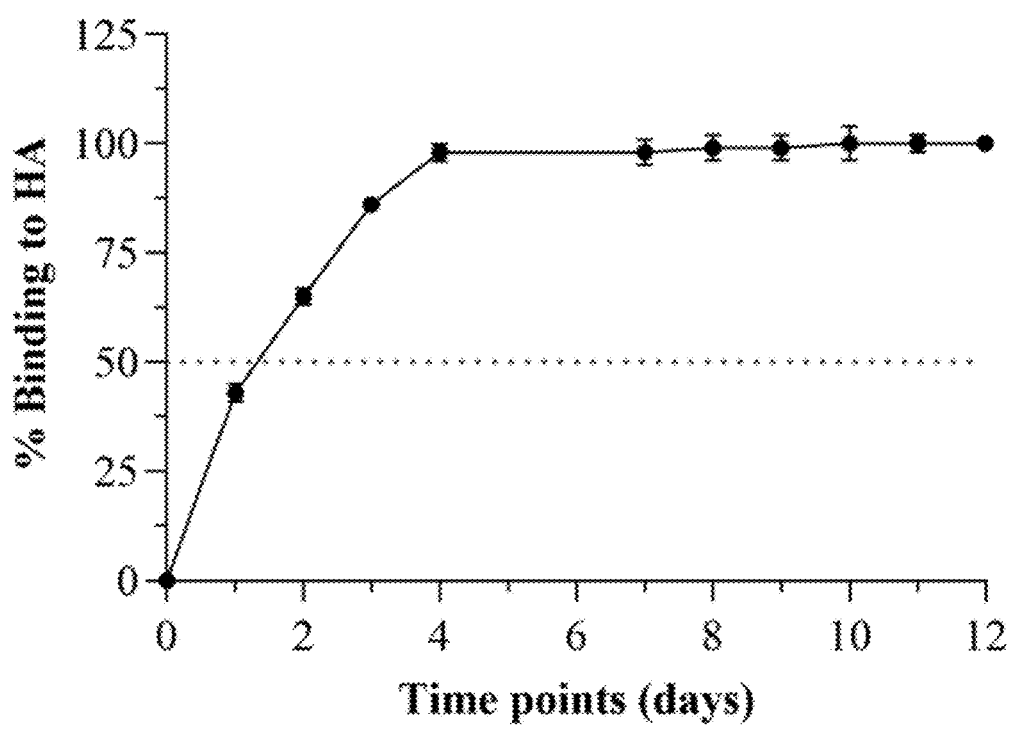
FIG. 68 shows a percentage of nano-Ca@BBPA (0.5 mg/mL) binding to hydroxyapatite (HA). The maximum percentage of binding reached by nano-Ca@BBPA to HA was 100% in 8 days. Some error bars are not observed due to the small value of the coefficient of variation (% CV<5%).
Figure 69:
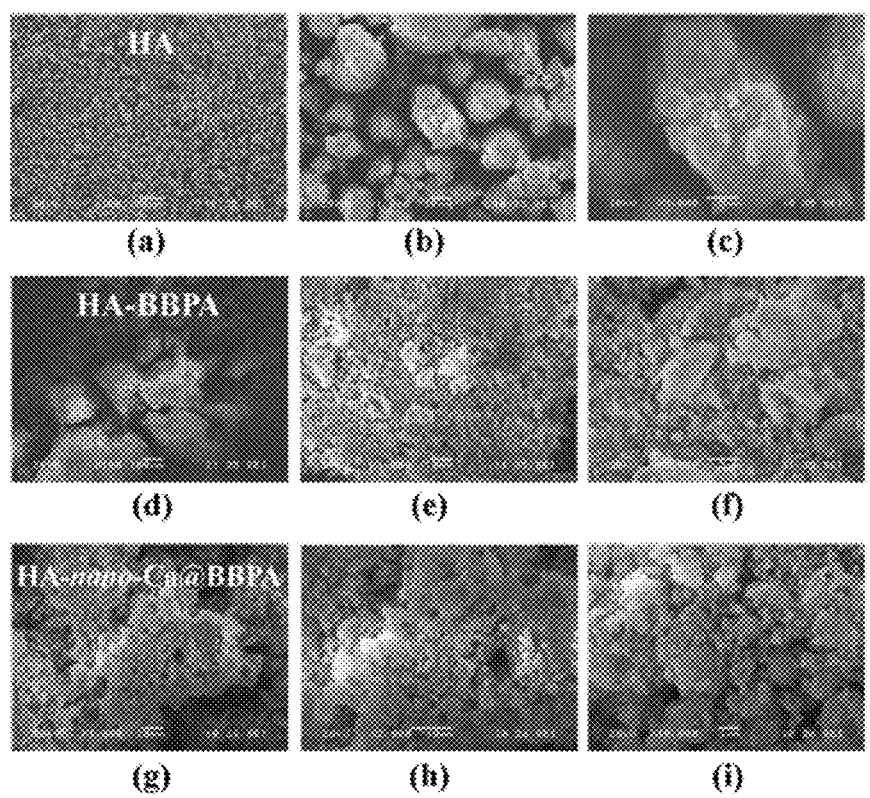
FIG. 69 shows SEM micrographs of HA (control, top) at (a) 100, (b) 1000, and (c) 3000 magnification, HA-BBPA (control, middle) at (d) 100, (e) 1000, and (f) 3000 magnification, and HA-nano-Ca@BBPA (experimental, bottom) at (a) 1000, (b) 2000, and (c) 10000 magnification. Samples were covered with a 5 nm layer of Au before SEM analysis.

Table 8 presents the percentage of binding of BBPA and nano-Ca@BBPA to HA in PBS. Additionally, FIGS. 67-68 illustrate the binding curve of BBPA and nano-Ca@BBPA in PBS to HA. SEM micrographs for HA, HA-BBPA, and HA-nano-Ca@BBPA are illustrated in FIG. 69.

TABLE 8

Percentage of binding of BBPA and nano-Ca@BBPA to HA at a concentration of 0.5 mg/mL. The experiment was carried out in duplicate, mean and % CV are reported.

| Time (d) | % Binding (BBPA) | % CV | % Binding (nano-Ca@BBPA) | % CV |
| --- | --- | --- | --- | --- |
| 0 | 0 | 0 | 0 | 0 |
| 1 | 1 | 2 | 43 | 5 |
| 2 | 39 | 4 | 65 | 3 |
| 3 | 54 | 4 | 86 | 1 |
| 4 | 74 | 2 | 98 | 2 |
| 7 | 96 | 3 | 98 | 3 |
| 8 | 97 | 2 | 99 | 3 |
| 9 | 98 | 2 | 99 | 3 |
| 10 | 99 | 2 | 100 | 4 |
| 11 | 100 | 2 | 100 | 2 |
| 12 | 100 | 2 | 100 | 1 |

BBPA-Ca form II: Loading and Release of 5-Fluorouracil

Figure 70:
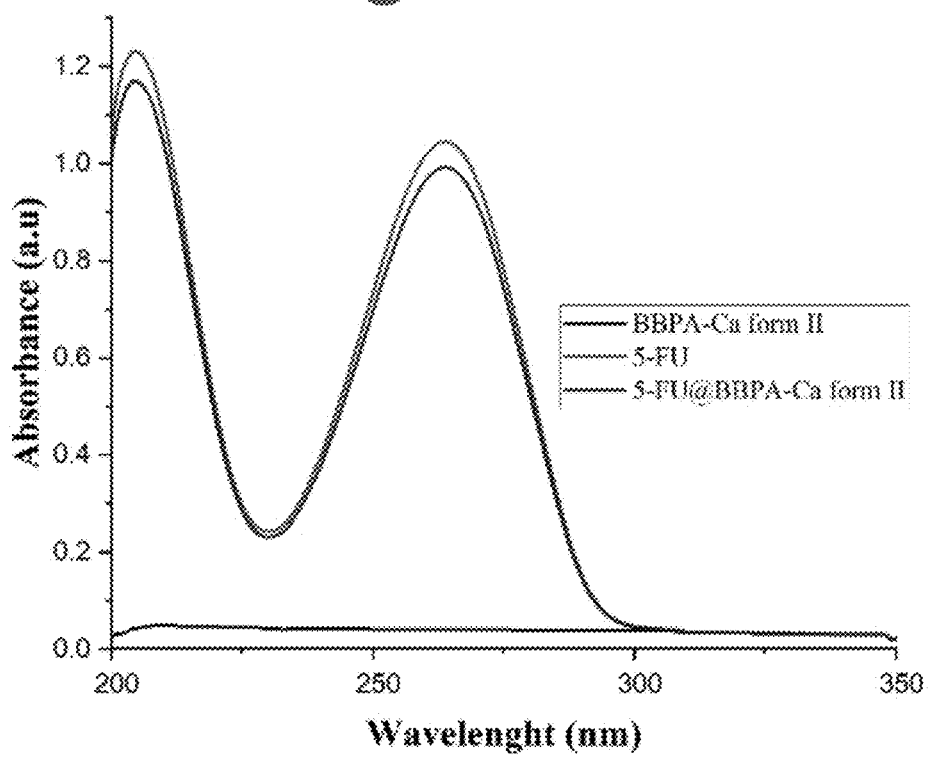
FIG. 70 shows absorption spectra (200-350 nm) for the BBPA-Ca form II (black), 5-fluorouracil (red), and 5-FU@BBPA-Ca form II (blue) after the loading experiment.
Figure 71:
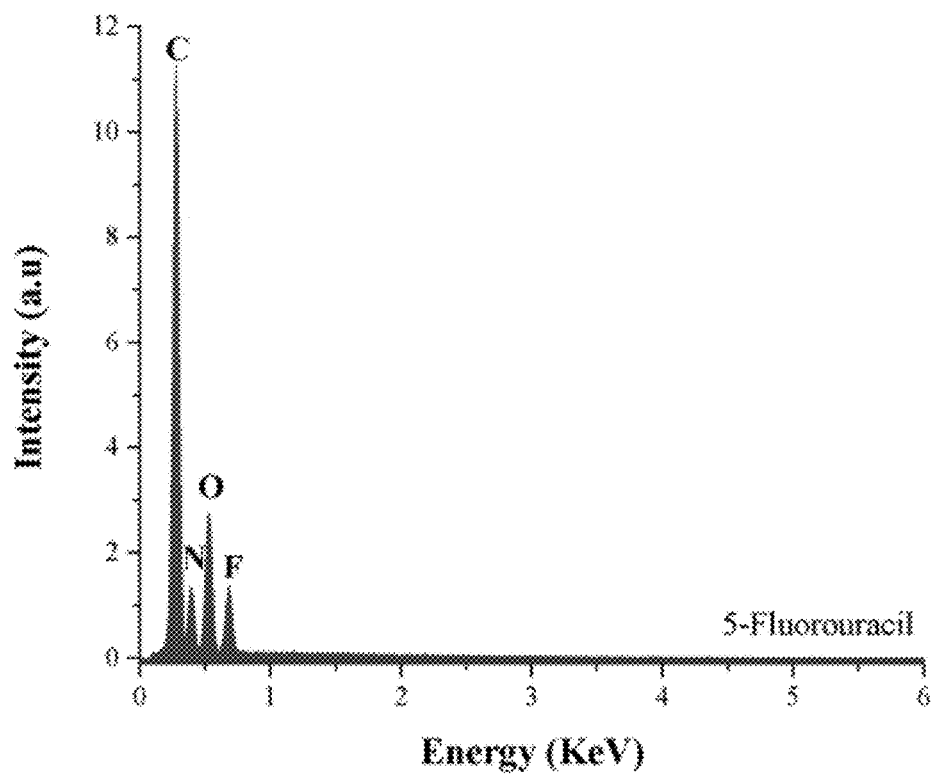
FIG. 71 shows an energy dispersive spectroscopy (EDS) analysis for 5-fluorouracil (control). The EDS analysis shows the presence of carbon, oxygen, nitrogen, and fluor.
Figure 72:
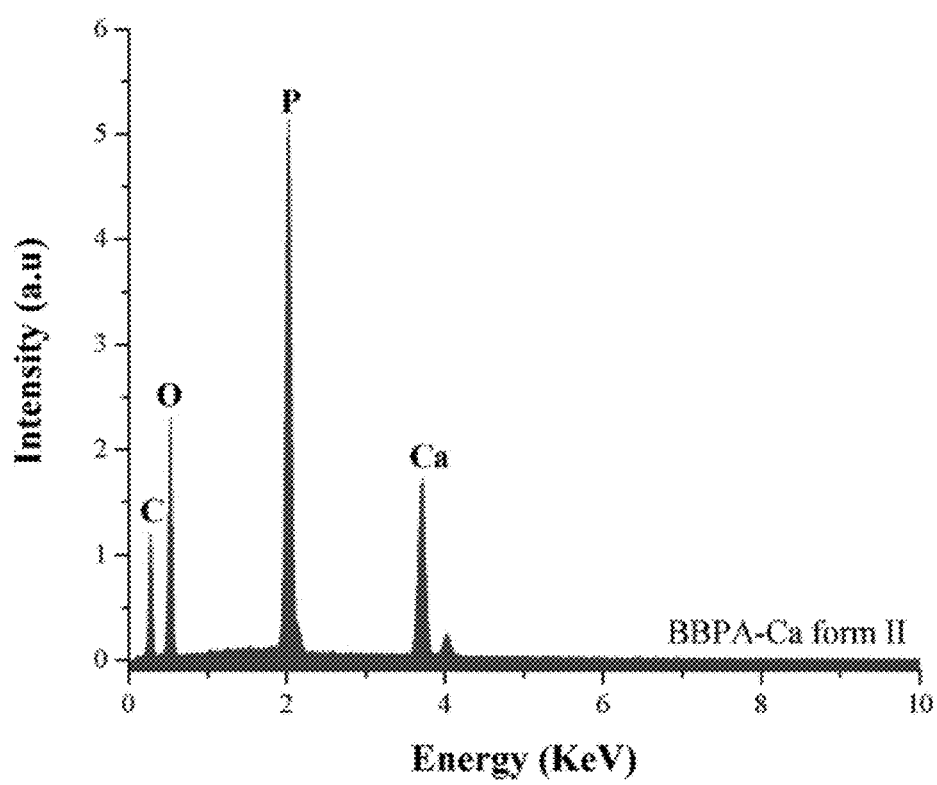
FIG. 72 shows an energy dispersive spectroscopy (EDS) analysis for BBPA-Ca form II (control). The EDS analysis shows the presence of carbon, oxygen, phosphorous, and calcium.
Figure 73:
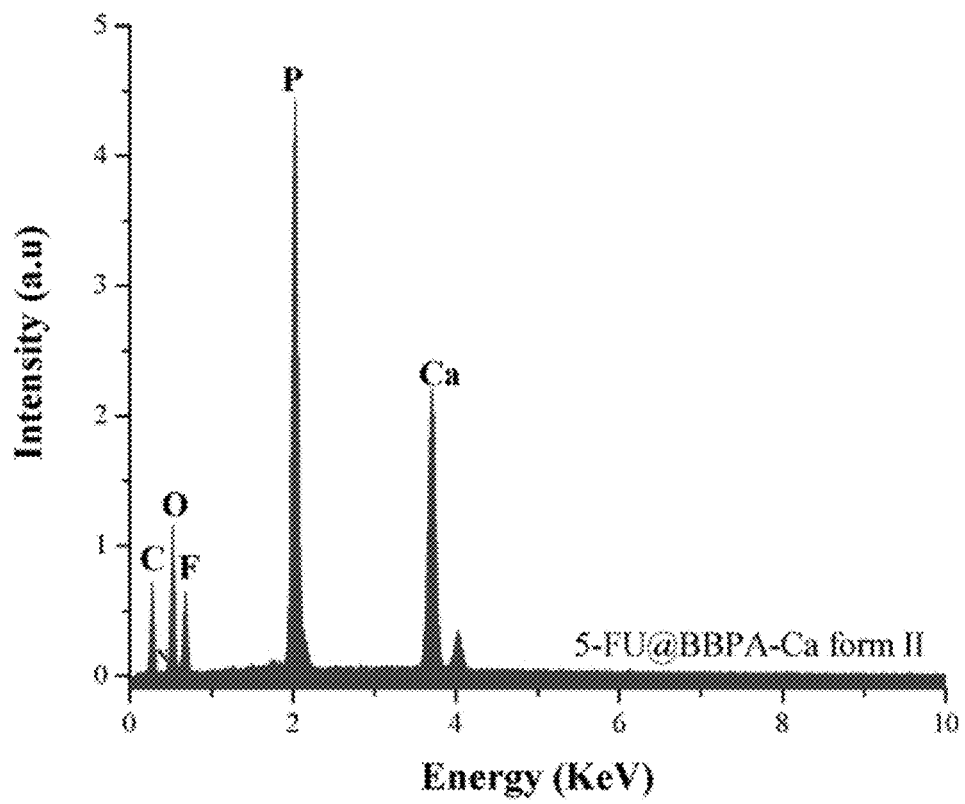
FIG. 73 shows an energy dispersive spectroscopy (EDS) analysis for 5-FU@BBPA-Ca form II (experimental). The EDS analysis shows the presence of carbon, oxygen, nitrogen, and fluor.

Loading of 5-Fluorouracil (5-FU)—The 5-FU loading into the BBPA-Ca form II (bulk) framework was carried out in ethanol. For this, in 1.5 mL vial were added 20.0 mg of BBPA-Ca form II (bulk), 7.0 mg of 5-FU, and 1 mL of ethanol. The vial was left undisturbed at 50° C. for 24 h. After this period, an additional 7.0 mg of 5-FU was added to the vial and left for 24 h to complete the loading process. As control groups were prepared two additional vials, for this was added 20.0 mg of BBPA-Ca form II (bulk) and 1 mL of ethanol in a second vial, and 7.0 mg of 5-FU with 1 mL of ethanol in the third vial. After loading was completed, the absorbance of the supernatant was measured at 400-200 nm. Solid samples were characterized by SEM-EDS, TGA, and PXRD. The absorption spectra (200-350 nm) for BBPA-Ca form II (control), 5-FU (control), and 5-FU@BBPA-Ca form II (experimental) are presented in FIG. 70. Furthermore, the EDS analysis for BBPA-Ca form II, 5-FU (red), and 5-FU@BBPA-Ca form II are illustrated in FIGS. 71-73.

Figure 74:
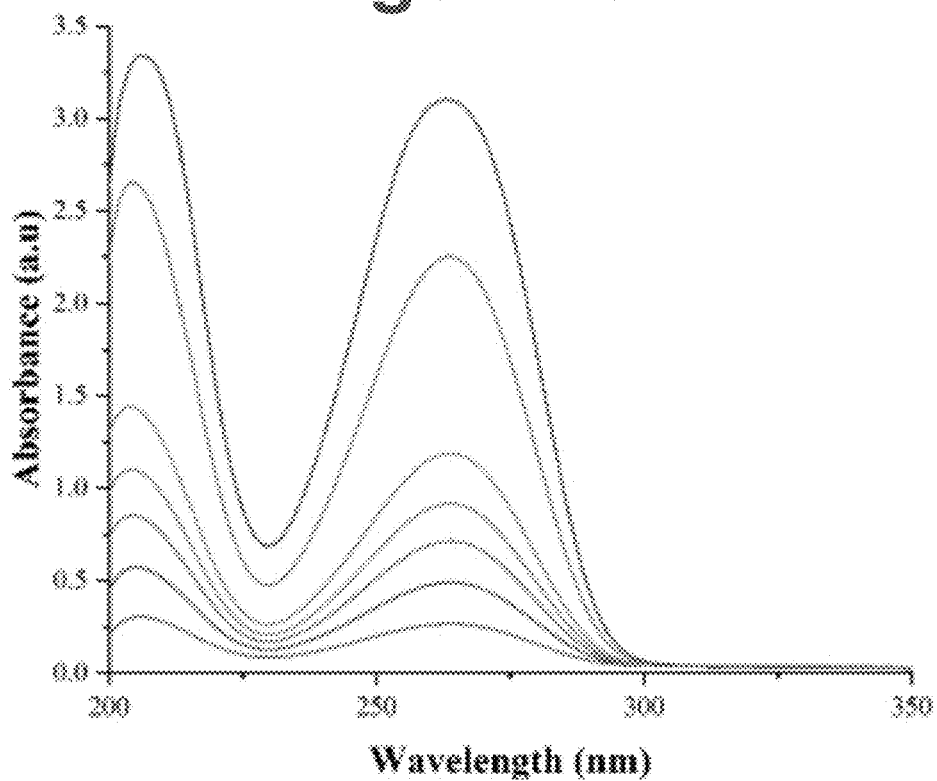
FIG. 74 shows absorption spectra (200-350 nm) for the BBPA-Ca form II (black), 5-fluorouracil (red), and 5-FU@BBPA-Ca form II (blue) after the loading experiment.
Figure 75:
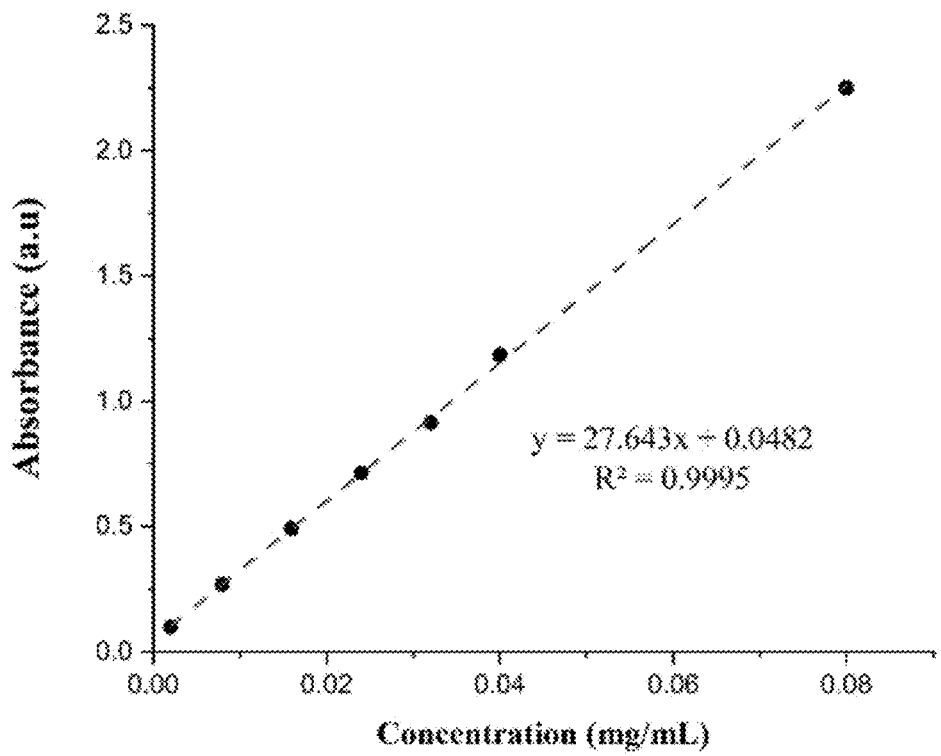
FIG. 75 shows a calibration curve of 5-fluorouracil in FaSSGF. The concentration range employed in the calibration curve is between 0.0025-0.035 mg/mL of 5-fluorouracil in FaSSGF.

Release of 5-Fluorouracil in Fasted-State Simulated Gastric Fluid from BBPA-Ca Form II Calibration curve—A stock solution of 0.2 mg/mL of 5-fluorouracil was prepared in FaSSGF. Subsequently, serial dilutions were performed to obtain concentrations of 0.08, 0.04, 0.032, 0.024, 0.016, 0.008, and 0.002 mg/mL. Absorbance was measured using UV-Vis spectroscopy (200-400 nm), FaSSGF was utilized as a solvent blank. The wavelength of maximum absorbance ($\lambda_{(max)}$) for 5-FU was detected at 263 nm. FIG. 74 shows the absorption spectra for the 5-fluorouracil standard solutions in FaSSGF and FIG. 75 illustrates the calibration curve of 5-fluorouracil in FaSSGF.

Dissolution experiment. In a 250 mL beaker, 100 mL of FaSSGF were transferred, the solution was left in constant stirring at 150 rpm and 37° C. An aliquot of 1 mL was taken before the addition of the 5-FU@BBPA-Ca form II (experimental) to record the first time point (0 h). Then, 20 mg of powder 5-FU@BBPA-Ca form II was added to the FaSSGF solution. Aliquots (1 mL) were taken out after each selected time point (0, 1, 3, 6, 24, 48, and 72 h) and diluted with FaSSGF in a 5 mL volumetric flask. The absorbance of 5-fluorouracil released from the metal complex was measured at 263 nm, the experiment was performed in duplicate. The dissolution profile for 5-fluorouracil (control) was recorded in FaSSGF for comparison.

Figure 76:
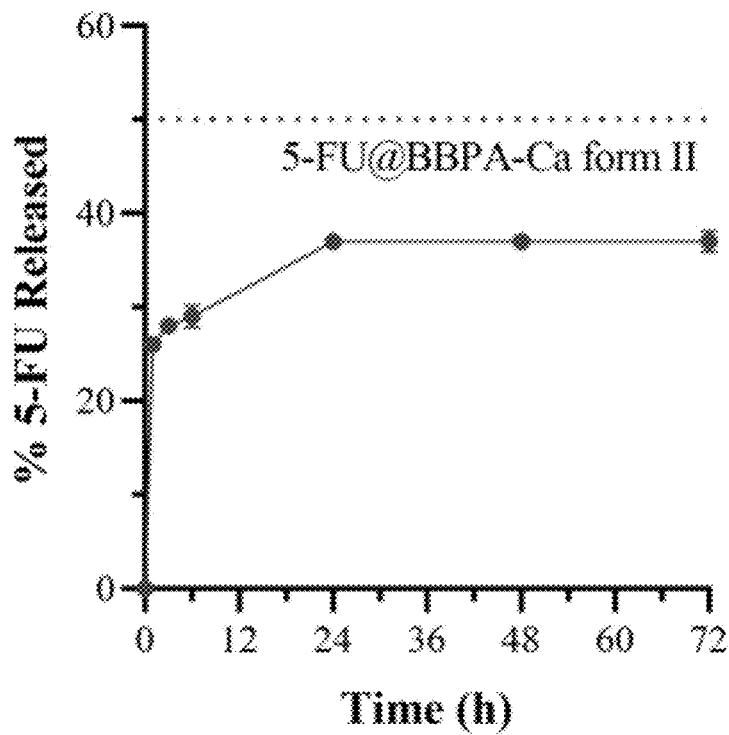
FIG. 76 shows a dissolution profile for 5-FU@BBPA-Ca form II (green) in FaSSGF at 37° C. The maximum release of 5-FU in FaSSGF from the 5-FU@BBPA-Ca form II complex was about 43%.

The dissolution profile of 5-FU@BBPA-Ca form II is presented in FIG. 76. Table 9 shows the percentage of 5-FU released from BBPA-Ca form II after the dissolution experiment in FaSSGF.

TABLE 9

Percentage (%) of 5-fluorouracil released after dissolution profile experiment from the BBPA-Ca form II complex. The experiments were performed in duplicate (n = 2). The mean percent released and coefficient of variation (% CV) are reported.

| | 5-FU@BBPA-Ca form II | |
| --- | --- | --- |
| Time (h) | % Released | % CV |
| 0 | 0 | 0 |
| 1 | 38 | 3 |
| 3 | 40 | 3 |
| 6 | 39 | 4 |
| 24 | 41 | 2 |
| 48 | 43 | 2 |
| 72 | 43 | 3 |

Cytotoxicity Assays for BBPA and Nano-Ca@BBPA

Figure 77:
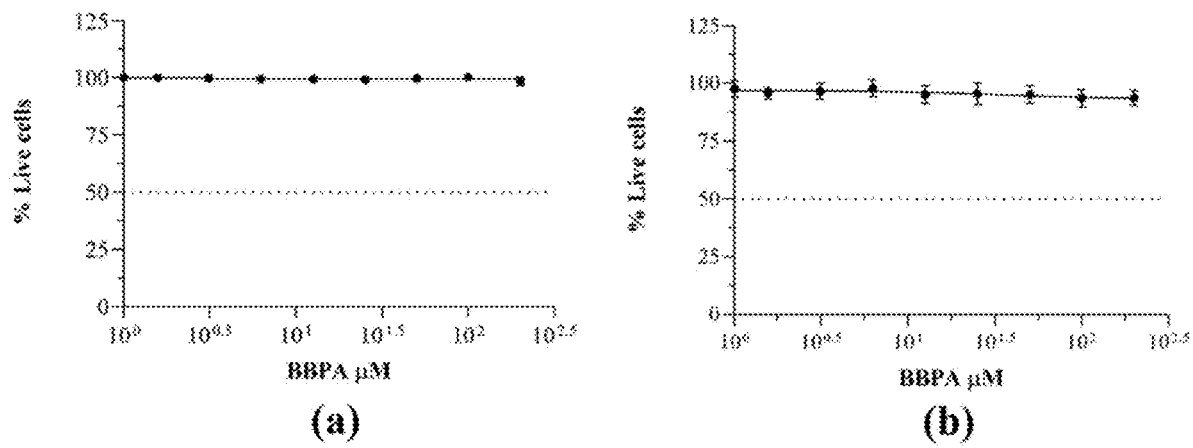
FIG. 77 shows $IC_{50}$ curves for (a) MDA-MB-231 and (b) hFOB 1.19 cell lines treated with BBPA (0-200 μM) at 72 h. Experiments were performed in triplicate for both cell lines. Some error bars are not observed due to the small value of the coefficient of variation (% CV<5%).

Cytotoxicity of BBPA (control) and nano-Ca@BBPA (experimental) was assessed using the human breast cancer MDA-MB-231 cell line, these cells represent a model of breast cancer-induced OM with micro-RNAs implicated in the progress of bone metastases. Furthermore, the cytotoxicity of these materials was also achieved using the osteoblast-like hFOB 1.19 cell line, within work, these immortalized human cells were used to simulate the human bone microenvironment (not cancerous cells). The $IC_{50}$ and the relative cell live percentage (% RCL) were used to determine their biological activity, the $IC_{50}$ values for BBPA (0-200 µM), and % RCL for nano-Ca@BBPA (0-15 µM) were determined. Cells were seeded in 96 well plates at a density of $2.5 \times 10^5$ cells/mL and treated with BBPA and nano-Ca@BBPA for 24, 48, and 72 h. Control groups were treated with media (DMEM, 1% Pen-Strep, MDA-MB-231) and (1:1 DMEM:F12, 0.3 mg/mL G418, hFOB 1.19), respectively. AlamarBlue® assay was employed to determine cell proliferation after each time point. The $IC_{50}$ curves for MDA-MB-231 and hFOB 1.19 cell lines treated with BBPA at 72 h are presented in FIG. 77. Both cell lines presented an $IC_{50}$ above 200 µM at 24, 48, and 72 h. The % RCL was >90% at each measured time for both cell lines. No cytotoxicity effect was observed for MDA-MB-231 and hFOB 1.19 cells treated with BBPA.

Moreover, to determine the cytotoxicity of nano-Ca@BBPA in cancerous and non-cancerous cells were used human breast cancer MDA-MB-231 and normal osteoblast hFOB 1.19 cell lines. For this, cells were treated with nano-Ca@BBPA (experimental) and BBPA (control) in concentrations of 1.9, 3.8, 7.5, and 15 µM, anticipating no significant cytotoxicity against both cell lines (% RCL~100%, FIGS. 78 and 79). Results demonstrate no significant cell death achieved for both BBPA and nano-Ca@BBPA at any treatment performed as was expected, the % RCL range between 98-102% in both cell lines. These results suggest the possibility that this framework will not cause cell damage to the normal cell tissue if is used as a potential drug delivery system.

Cytotoxicity Assays for Nano-Ca@BBPA

Cell Culture Methods—Media with DMEM, 5% FBS, and 1% Pen-Strep were used to incubate MDA-MB-231 cells at 37° C. with 5% $CO_2$. The osteoblast hFOB 1.19 cell line was incubated at 34° C., 5% $CO_2$ in 1:1 DMEM:F-12 supplemented with 0.3 mg/mL G418, and 10% FBS. Cell passages were performed weekly at 80.0% confluency. Media exchanges were carried out twice every 7 d.

Cell seeding—Both cells were seeded in 96 well plates at a density of $2.5 \times 10^5$ cells/mL. The 96 well plates were incubated at 37° C. (MDA-MB-231) and 34° C. (hFOB 1.19) in 5% $CO_2$ for 24 h. Three 96 well plates were prepared per point time (24, 48, and 72 h). Experiments were performed in triplicate.

Cell treatments—Two-fold serial dilution (200.0-0.0 μM) of BBPA was previously prepared for the treatment. After 24 h of seeding, cells were treated with 100 μL of BBPA solutions. Cells were incubated at 37° C. (MDA-MB-231) and 34° C. (hFOB 1.19) in 5% $CO_2$ for 24, 48, and 72 h. The control group was treated with media (MDA-MB-231 with DMEM, 1.0% Pen-Strep) and (hFOB 1.19 with 1:1 DMEM: F-12, 0.3 mg/mL G418). All experiments were accomplished in triplicate.

Figure 78:
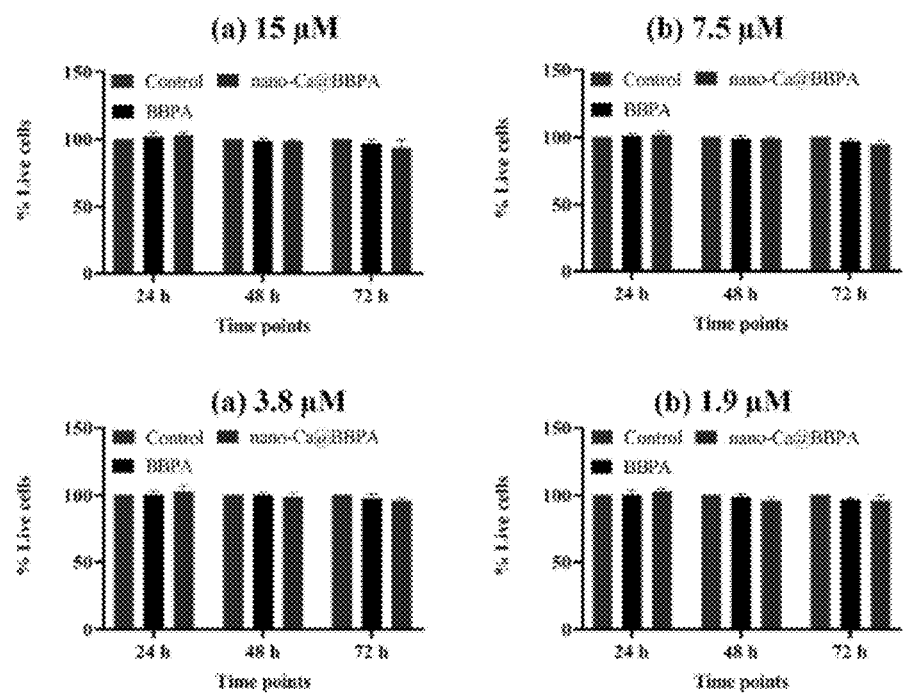
FIG. 78 shows relative cell live (% RCL) for the human breast cancer MDA-MB-231 cell line employing DMEM or DMEM:F12 (control, green), BBPA (black), and nano-Ca@BBPA (red) in concentrations of (a) 15, (b) 7.5, (c) 3.8, and (d) 1.9 μM at 24, 48, and 72 h.
Figure 79:
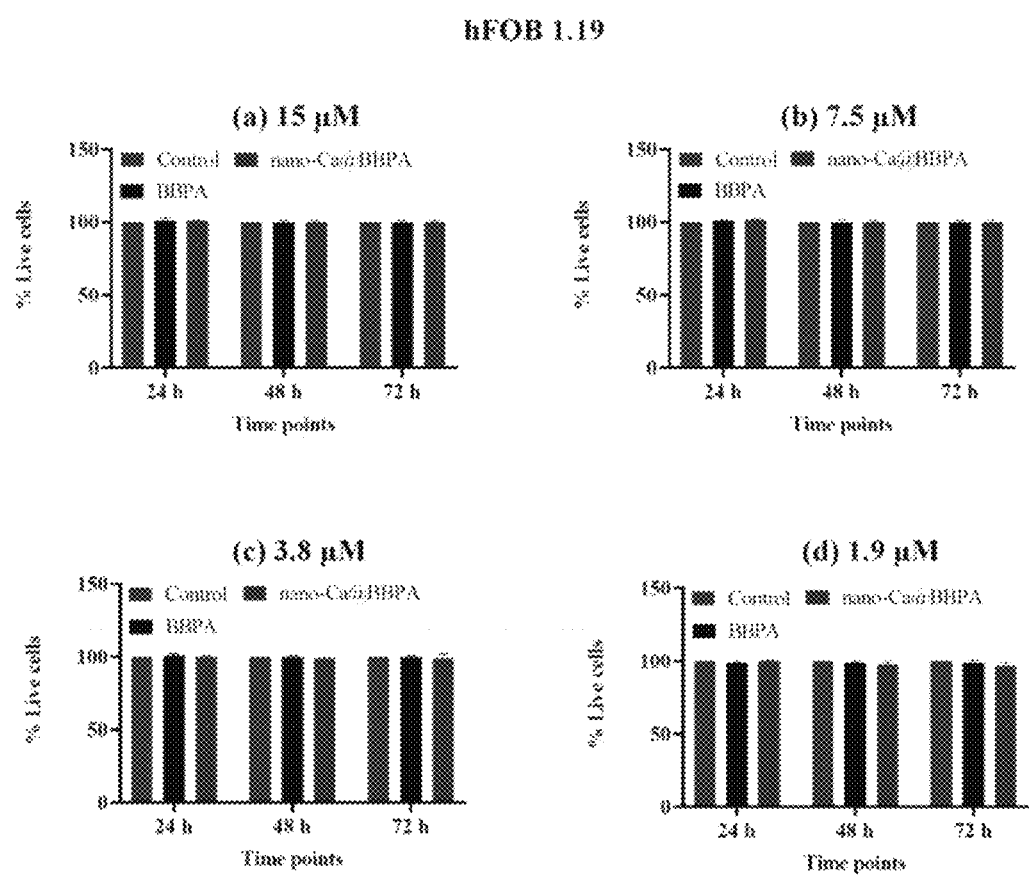
FIG. 79 shows relative cell live (% RCL) for osteoblast-like hFOB 1.19 cell line employing DMEM or DMEM:F12 (control, green), BBPA (black), and nano-Ca@BBPA (red) in concentrations of (a) 15, (b) 7.5, (c) 3.8, and (d) 1.9 μM at 24, 48, and 72 h.
Figure 80:
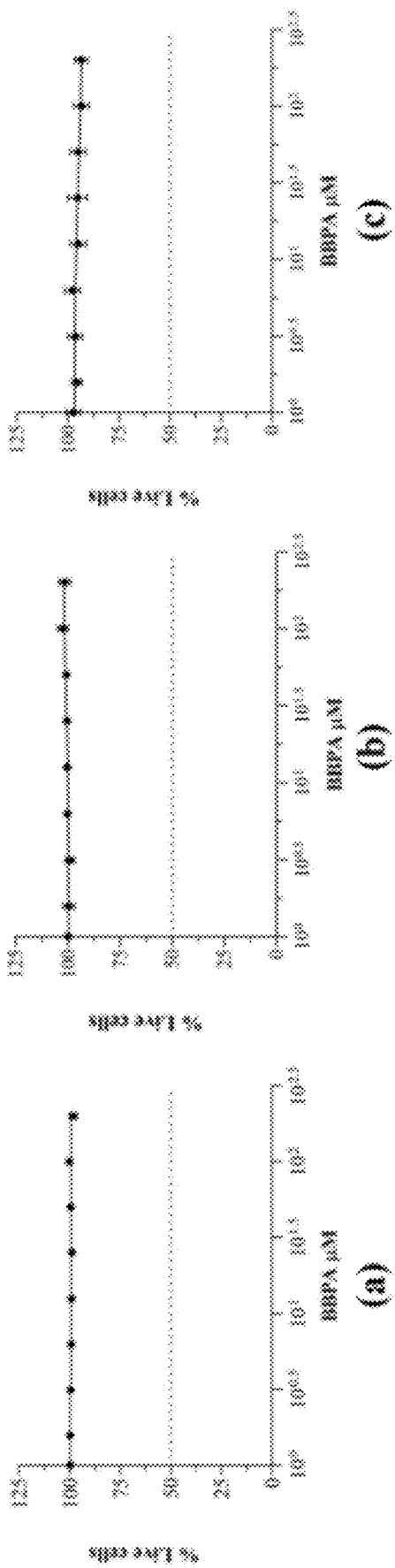
FIG. 80 shows $IC_{50}$ curve for MDA-MB-231 cells treated for (a) 24 h, (b) 48 h, and (c) 72 h with BBPA. Experiments were performed in triplicate. Some error bars are not observed due to the small value of the coefficient of variation (% CV<5%).
Figure 81:
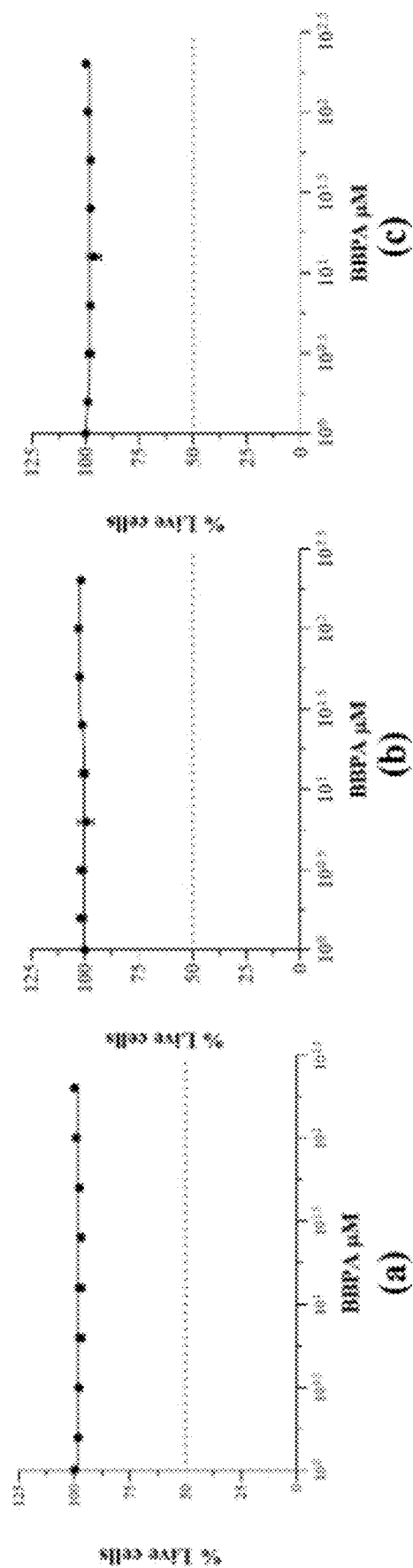
FIG. 81 shows $IC_{50}$ curve for hFOB 1.19 cells treated for (a) 24 h, (b) 48 h, and (c) 72 h with BBPA. Experiments were performed in triplicate. Some error bars are not observed due to the small value of the coefficient of variation (% CV<5%).

AlamarBlue® Assay—Cell proliferation was determined after each point time of treatment. AlamarBlue® (10.0%) was previously prepared with PBS. Media was removed from all 96 well plates and 100.0 μL of AlamarBlue® was added. The 96 well plates were incubated for 4 h at 37° C. (MDA-MB-231) and 34° C. (hFOB 1.19) in 5% $CO_2$. The fluorescence was measured at 560.0 nm of excitation and $\lambda_{(max)}$ 590.0 nm of emission. The percentage of live cells was achieved taking into consideration the viability of the control group (100%) associated with the cells treated with BBPA solutions. Finally, the dose-response curves (% cell live vs. concentration) for BBPA were utilized to determine the half-maximal effective concentration ($IC_{50}$) values. FIGS. 80-81 illustrate the $IC_{50}$ curves for BBPA against the MDA-MB-231 and hFOB 1.19 cell lines. FIGS. 78-79 show the % RCL for nano-Ca@BBPA using the MDA-MB-231 and hFOB 1.19 cell lines.

BBPA-Based Metal Complexes CIF Files Checks

The different CIF files for the BBPA-based metal complexes were verified employing the check CIF service of the international union of crystallography (https://checkcif.iucr.org/). Any of the complex structures shown alert level A (check CIF/PLATON report). However, different alert levels B were reported. For BBPA-Ca form I, two alert levels B (PLAT112, PLAT420). One suggesting a b/2 symmetry element and another reporting a missing acceptor. By the verification of the structure, it was observed that the complexes presented the P21/c space group, one of the most common space group observes, also any acceptor could be identified. Taking into account, that the calculated and simulated X-ray diffractogram overlays with the experimental X-ray diffractogram, it is concluded that this solution is correct for the BBPA-Ca form I complex.

In the case of BBPA-Ca form II one alert level B was reported (PLAT306). This alert was a result of a lattice water molecule, in which disorder was observed. Considering the small size of the crystal, the large time used to measure it, and that the X-ray diffractogram overlay (simulated vs experimental), it can be concluded that this model is a good representation for the crystal structure determination for BBPA-Ca form II.

Finally, any alert A or B was reported for BBPA-Zn form I. The X-ray diffractograms overlay each other (simulated vs experimental) for BBPA-Zn form I. It was concluded that the crystal structure elucidation for BBPA-Zn form I is correct.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A bisphosphonate-based coordination complex comprising: a mixture of benzene 1,4-bis(bisphosphonic acid) (BBPA) and a bioactive metal selected from the group consisting of: $Ca^{2+}$, $Zn^{2+}$, and $Mg^{2+}$.

2. The bisphosphonate-based coordination complex according to claim 1, wherein said metal is $Ca^{2+}$ and a single crystal form is characterized by major x-ray powder diffraction peaks at 2.theta. angles of 8.42, 12.04, 14.79, 16.87, 18.68 and 27.70.

3. The bisphosphonate-based coordination complex according to claim 1, wherein said metal is $Ca^{2+}$ and a single crystal form is characterized by major x-ray powder diffraction peaks at 2.theta. angles of 10.05, 10.98, 14.45, 15.18, 23.04 and 29.36.

4. The bisphosphonate-based coordination complex according to claim 1, wherein said metal is $Zn^{2+}$ and a single crystal form is characterized by major x-ray powder diffraction peaks at 2.theta. angles of 9.25, 14.73, 14.77, 21.63, 26.42 and 32.75.

5. The bisphosphonate-based coordination complex according to claim 1, wherein said metal is $Mg^{2+}$ and a single crystal form is characterized by major x-ray powder diffraction peaks at 2.theta. angles of 8.36, 10.69, 11.96, 12.89, 16.84 and 25.27.

6. The bisphosphonate-based coordination complex of claim 1, having an empirical formula of: $Ca_2C_8H_{14}O_{17}P_4$, $3(H_2O)$.

7. The bisphosphonate-based coordination complex of claim 1, having an empirical formula of: $2(CaC_4H_9O_9P_2)$, $9(H_2O)$.

8. The bisphosphonate-based coordination complex of claim 1, having an empirical formula of: $ZnC_4H_5O_8P_2$, $2(H_2O)$.

9. The bisphosphonate-based coordination complex of claim 1, having an empirical formula of: $Mg_3C_8H_{22}O_{11}P_4$, $8(H_2O)$.

10. The bisphosphonate-based coordination complex of claim 2, wherein the single crystal form is characterized by X-ray powder diffraction pattern of FIG. 16.

11. The bisphosphonate-based coordination complex of claim 3, wherein the single crystal form is characterized by X-ray powder diffraction pattern of FIG. 17.

12. The bisphosphonate-based coordination complex of claim 4, wherein the single crystal form is characterized by X-ray powder diffraction pattern of FIG. 18.

13. The bisphosphonate-based coordination complex of claim 5, wherein the single crystal form is characterized by X-ray powder diffraction pattern of FIG. 19.

14. The bisphosphonate-based coordination complex of claim 2, wherein the single crystal form has a monoclinic unit cell with cell parameters: a=11.65839 Å, b=12.35838 Å, c=21.9782 Å and β=138.112°.

15. The bisphosphonate-based coordination complex of claim 3, wherein the single crystal form has a monoclinic unit cell with cell parameters: a=13.1217 Å, b=10.0502 Å, c=21.74.61 Å and β=95.844°.

16. The bisphosphonate-based coordination complex of claim 4, wherein the single crystal form has a monoclinic unit cell with cell parameters: a=6.8687 Å, b=19.1708 Å, c=8.3853 Å and β=105.689°.

17. The bisphosphonate-based coordination complex of claim 5, wherein the single crystal form has a monoclinic unit cell with cell parameters: a=10.60620 Å, b=10.39300 Å, c=13.9383 Å and β=97.8330°.

18. The bisphosphonate-based coordination complex of claim 2, wherein the single crystal form has monoclinic space group of $P2_1/c$.

19. The bisphosphonate-based coordination complex of claim 3, wherein the single crystal form has monoclinic space group of I2/a.

20. The bisphosphonate-based coordination complex of claim 4, wherein the single crystal form has monoclinic space group of $P2_1/n$.

21. The bisphosphonate-based coordination complex of claim 5, wherein the single crystal form has monoclinic space group of $P2_1/c$.

* * * * *